United States Patent
Shih et al.

(10) Patent No.: US 10,067,315 B2
(45) Date of Patent: Sep. 4, 2018

(54) LENS ASSEMBLY

(71) Applicants: Sintai Optical (Shenzhen) Co., Ltd., Shenzhen, Guandong Province (CN); AO Ether Corporation, Taichung (TW)

(72) Inventors: Po-Yuan Shih, Taichung (TW); Chien-Hung Chen, Taichung (TW); Hsi-Ling Chang, Taichung (TW)

(73) Assignees: SINTAI OPTICAL (SHENZHEN) CO., LTD., Shenzhen, Guangdong Province (CN); AO ETHER CORPORATION, Taichung (TW)

( * ) Notice: Subject to any disclaimer, the term of this patent is extended or adjusted under 35 U.S.C. 154(b) by 59 days.

(21) Appl. No.: 14/696,676

(22) Filed: Apr. 27, 2015

(65) Prior Publication Data
US 2015/0331224 A1 Nov. 19, 2015

(30) Foreign Application Priority Data

May 16, 2014 (TW) ............... 103117262 A
May 23, 2014 (TW) ............... 103118017 A

(51) Int. Cl.
*G02B 13/00* (2006.01)
*G02B 9/62* (2006.01)
*G02B 13/18* (2006.01)

(52) U.S. Cl.
CPC ........ *G02B 13/0045* (2013.01); *G02B 9/62* (2013.01); *G02B 13/0015* (2013.01); *G02B 13/18* (2013.01)

(58) Field of Classification Search
CPC .. G02B 13/0045; G02B 9/62; G02B 13/0015; G02B 13/18; G02B 13/00; G02B 13/04; G02B 13/06; G02B 13/02
USPC ............... 359/749–752, 708–714, 745, 746, 359/754–757, 763, 764, 767
See application file for complete search history.

(56) References Cited

U.S. PATENT DOCUMENTS

| 8,289,628 | B2 | 10/2012 | Asami |
| 2013/0093942 | A1 | 4/2013 | Okano |
| 2014/0078603 | A1 | 3/2014 | You |

FOREIGN PATENT DOCUMENTS

JP 2013140398 A 7/2013

*Primary Examiner* — Bumsuk Won
*Assistant Examiner* — Wen Huang
(74) *Attorney, Agent, or Firm* — McClure, Qualey & Rodack, LLP

(57) ABSTRACT

A lens assembly includes a first lens, a second lens, a third lens, a fourth lens and a fifth lens, all of which are arranged in sequence from an object side to an image side along an optical axis. The first lens is with refractive power and includes a convex surface facing the object side. The second and third lenses are with refractive power. The fourth lens is with refractive power and includes a convex surface facing the image side. The fifth lens is with negative refractive power. The lens assembly satisfies: $0 \leq f_1/f_2 \leq 6$, $(Vd_1+Vd_2)/2 > 40$, $Vd_1 \geq Vd_3$, $Vd_2 \geq Vd_3$, $Vd_5 \geq Vd_3$ wherein $f_1$ is an effective focal length of the first lens, $f_2$ is an effective focal length of the second lens and $Vd_1$, $Vd_2$, $Vd_3$, $Vd_5$ are Abbe numbers of the first, second, third, fifth lenses.

9 Claims, 36 Drawing Sheets

LENS ASSEMBLY

BACKGROUND OF THE INVENTION

Field of the Invention

The invention relates to a lens assembly.

Description of the Related Art

The well-known lens assembly with five lenses usually uses a high Abbe number material for the first lens and a low Abbe number material for the second lens in order to shorten the total lens length of the lens assembly. However, electronic products have been continuously developed toward miniaturization. Therefore, lens assemblies used for the electronic products need to further shorten total lens length.

BRIEF SUMMARY OF THE INVENTION

The invention provides a lens assembly can further shorten total lens length to solve the above problem, wherein both of the first lens and the second lens are made of high Abbe number material. The lens assembly of the invention, provided with characteristics of a shortened total lens length, an increased field of view, still has a good optical performance and can meet a requirement of resolution.

The lens assembly in accordance with an exemplary embodiment of the invention includes a first lens, a second lens, a third lens, a fourth lens and a fifth lens, all of which are arranged in sequence from an object side to an image side along an optical axis. The first lens is with refractive power and includes a convex surface facing the object side. The second and third lenses are with refractive power. The fourth lens is with refractive power and includes a convex surface facing the image side. The fifth lens is with negative refractive power. The lens assembly satisfies: $0 \le f_1/f_2 \le 6$, $(Vd_1+Vd_2)/2>40$, $Vd_1 \ge Vd_3$, $Vd_2 \ge Vd_3$, $Vd_5 \ge Vd_3$ wherein $f_1$ is an effective focal length of the first lens, $f_2$ is an effective focal length of the second lens and $Vd_1$, $Vd_2$, $Vd_3$, $Vd_5$ are Abbe numbers of the first, second, third, fifth lenses.

In another exemplary embodiment, the first lens is with positive refractive power; the second lens is with positive refractive power; and the third lens is with negative refractive power.

In yet another exemplary embodiment, any two of the Abbe numbers of the third lens, the fourth lens and the fifth lens are less than the Abbe numbers of the first lens and the second lens.

In another exemplary embodiment, the lens assembly satisfies $Vd_1>40$, $Vd_2>40$, wherein $Vd_1$ is an Abbe number of the first lens and $Vd_2$ is an Abbe number of the second lens.

In yet another exemplary embodiment, the lens assembly satisfies $|Vd_1-Vd_2|<25$, wherein $Vd_1$ is an Abbe number of the first lens and $Vd_2$ is an Abbe number of the second lens.

In another exemplary embodiment, the first lens is a biconvex lens or a meniscus lens.

In yet another exemplary embodiment, the third lens is a biconcave lens or a meniscus lens.

In another exemplary embodiment, the lens assembly further includes a sixth lens disposed between the fifth lens and the image side and the lens assembly satisfies $Vd_6 \ge Vd_3$, wherein $Vd_6$ is an Abbe number of the sixth lens and $Vd_3$ is an Abbe number of the third lens.

In yet another exemplary embodiment, the lens assembly further includes a stop disposed between the object side and the second lens.

In another exemplary embodiment, the lens assembly further includes a stop disposed between the third lens and the fourth lens.

In yet another exemplary embodiment, the lens assembly satisfies $(Vd_3+Vd_4)/2 \le 45$, wherein $Vd_3$ is an Abbe number of the third lens and $Vd_4$ is an Abbe number of the fourth lens.

In another exemplary embodiment, the first lens is a convex-concave lens with negative refractive power and comprises a concave surface facing the image side; the second lens is a biconcave lens and with negative refractive power; the third lens is a biconvex lens and with positive refractive power; the fourth lens is a biconvex lens and with positive refractive power; the fifth lens is a meniscus lens and with negative refractive power; and the lens assembly further satisfies $3 \le f_1/f_2 \le 6$, wherein $f_1$ is an effective focal length of the first lens and $f_2$ is an effective focal length of the second lens.

In yet another exemplary embodiment, the lens assembly satisfies $0.01 \le f/TTL \le 0.2$, wherein f is an effective focal length of the lens assembly and TTL is a distance from the convex surface of the first lens to an image plane along the optical axis.

In another exemplary embodiment, the lens assembly satisfies $4 \le TTL/IH \le 5$, wherein TTL is a distance from the convex surface of the first lens to an image plane along the optical axis and IH is a half of an image height.

In yet another exemplary embodiment, the lens assembly satisfies $1 \le f_3/f \le 3$, wherein $f_3$ is an effective focal length of the third lens and f is an effective focal length of the lens assembly.

In another exemplary embodiment, the fourth lens satisfies $1 \le (R_{41}-R_{42})/(R_{41}+R_{42}) \le 3$, wherein $R_{41}$ is a radius of curvature of an object side surface of the fourth lens and $R_{42}$ is a radius of curvature of the convex surface of the fourth lens.

In yet another exemplary embodiment, the fifth lens satisfies $-1 \le (R_{51}-R_{52})/(R_{51}+R_{52}) \le 1$, wherein $R_{51}$ is a radius of curvature of an object side surface of the fifth lens and $R_{52}$ is a radius of curvature of an image side surface of the fifth lens.

In another exemplary embodiment, the fifth lens includes a concave surface facing the object side and a convex surface facing the image side.

In yet another exemplary embodiment, the fifth lens includes a convex surface facing the object side and a concave surface facing the image side.

The lens assembly in accordance with an another exemplary embodiment of the invention includes a first lens, a second lens, a third lens, a fourth lens and a fifth lens, all of which are arranged in sequence from an object side to an image side along an optical axis. The first lens is with refractive power and includes a convex surface facing the object side. The second lens is with refractive power. The third lens is with refractive power. The fourth lens is with refractive power and includes a convex surface facing the image side. The fifth lens is with refractive power. The lens assembly satisfies $0 \le f_1/f_2 \le 6$, $(Nd_1+Nd_2)/Nd_3 \ge 1.8$, wherein $f_1$ is an effective focal length of the first lens, $f_2$ is an effective focal length of the second lens, $Nd_1$ is an index of refraction of the first lens, $Nd_2$ is an index of refraction of the second lens and $Nd_3$ is an index of refraction of the third lens.

In another exemplary embodiment, the lens assembly further satisfies $(Nd_1+Nd_2)/Nd_3 \ge 1.9$, wherein $Nd_1$ is an index of refraction of the first lens, $Nd_2$ is an index of refraction of the second lens and $Nd_3$ is an index of refraction of the third lens.

In yet another exemplary embodiment, the first lens is with positive refractive power; the second lens is with positive refractive power; and the third lens is with negative refractive power.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
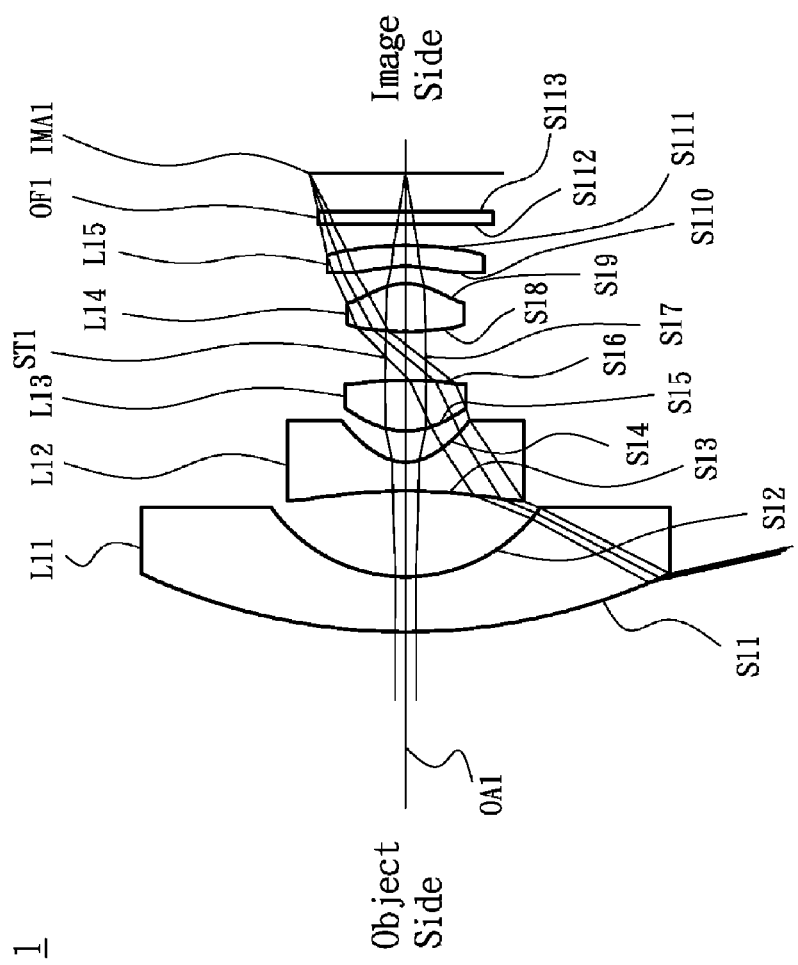
FIG. 1 is a lens layout and optical path diagram of a lens assembly in accordance with a first embodiment of the invention.

Referring to FIG. 1, FIG. 1 is a lens layout and optical path diagram of a lens assembly in accordance with a first embodiment of the invention. The lens assembly 1 includes a first lens L11, a second lens L12, a third lens L13, a stop ST1, a fourth lens L14, a fifth lens L15 and an optical filter OF1, all of which are arranged in sequence from an object side to an image side along an optical axis OA1. In operation, an image of light rays from the object side is formed on an image plane IMA1. The first lens L11 is a convex-concave lens, made of glass material and with negative refractive power, wherein the object side surface S11 is a convex surface, the image side surface S12 is a concave surface and both of the object side surface S11 and image side surface S12 are spherical surfaces. The second lens L12 is a biconcave lens, made of plastic material and with negative refractive power, wherein both of the object side surface S13 and image side surface S14 are aspheric surfaces. The third lens L13 is a biconvex lens, made of plastic material and with positive refractive power, wherein both of the object side surface S15 and image side surface S16 are aspheric surfaces. The fourth lens L14 is a biconvex lens, made of plastic material and with positive refractive power, wherein both of the object side surface S18 and image side surface S19 are aspheric surfaces. The fifth lens L15 is a concave-convex lens, made of plastic material and with negative refractive power, wherein the object side surface S110 is a concave surface, the image side surface S111 is a convex surface and both of the object side surface S110 and image side surface S111 are aspheric surfaces. Both of the object side surface S112 and image side surface S113 of the optical filter OF1 are plane surfaces.

In order to maintain excellent optical performance of the lens assembly in accordance with the first embodiment of the invention, the lens assembly 1 must satisfies the following ten conditions:

$$0.01 \leq f1/TTL1 \leq 0.2 \quad (1)$$

$$4 \leq TTL1/IH1 \leq 5 \quad (2)$$

$$3 \leq f1_1/f1_2 \leq 6 \quad (3)$$

$$1 \leq f1_3/f1 \leq 3 \quad (4)$$

$$1 \leq (R1_{41} - R1_{42})/(R1_{41} + R1_{42}) \leq 3 \quad (5)$$

$$-1 \leq (R1_{51} - R1_{52})/(R1_{51} + R1_{52}) \leq 1 \quad (6)$$

$$(Vd1_1 + Vd1_2)/2 > 40 \quad (7)$$

$$Vd1_1 \geq Vd1_3 \quad (8)$$

$$Vd1_2 \geq Vd1_3 \quad (9)$$

$$Vd1_5 \geq Vd1_3 \quad (10)$$

wherein f1 is an effective focal length of the lens assembly 1, TTL1 is a distance from the object side surface S11 of the first lens L11 to the image plane IMA1 along the optical axis OA1, IH1 is a half of an image height, $f1_1$ is an effective focal length of the first lens L11, $f1_2$ is an effective focal length of the second lens L12, $f1_3$ is an effective focal length of the third lens L13, $R1_{41}$ is a radius of curvature of the object side surface S18 of the fourth lens L14, $R1_{42}$ is a radius of curvature of the image side surface S19 of the fourth lens L14, $R1_{51}$ is a radius of curvature of the object side surface S110 of the fifth lens L15, $R1_{52}$ is a radius of curvature of the image side surface S111 of the fifth lens L15, $Vd1_1$ is an Abbe number of the first lens L11, $Vd1_2$ is an Abbe number of the second lens L12, $Vd1_3$ is an Abbe number of the third lens L13 and $Vd1_5$ is an Abbe number of the fifth lens L15.

By the above design of the lenses and stop ST1, the lens assembly 1 is provided with a shortened total lens length, an increased field of view, an effective corrected aberration and an increased resolution.

In order to achieve the above purposes and effectively enhance the optical performance, the lens assembly 1 in accordance with the first embodiment of the invention is provided with the optical specifications shown in Table 1, which include the effective focal length, F-number, field of view, total lens length, radius of curvature of each lens surface, thickness between adjacent surface, refractive index of each lens and Abbe number of each lens. Table 1 shows that the effective focal length is equal to 1.4206 mm, F-number is equal to 2.8, field of view is equal to 205.5° and total lens length is equal to 10.775 mm for the lens assembly 1 of the first embodiment of the invention.

TABLE 1

Effective Focal Length = 1.4206 mm F-number = 2.8
Field of View = 205.5° Total Lens Length = 10.775 mm

| Surface Number | Radius of Curvature (mm) | Thickness (mm) | Nd | Vd | Remark |
|---|---|---|---|---|---|
| S11 | 14.647 | 1.281 | 1.583 | 59.4 | The First Lens L11 |
| S12 | 3.820 | 2.025 | | | |
| S13 | −11.243 | 0.682 | 1.535 | 55.7 | The Second Lens L12 |
| S14 | 1.160 | 0.728 | | | |
| S15 | 1.823 | 1.185 | 1.636 | 23.9 | The Third Lens L13 |
| S16 | −7.488 | 0.557 | | | |
| S17 | ∞ | 0.601 | | | Stop ST1 |
| S18 | 6.232 | 1.123 | 1.535 | 55.7 | The Fourth Lens L14 |
| S19 | −1.320 | 0.411 | | | |
| S110 | −2.735 | 0.488 | 1.535 | 55.7 | The Fifth Lens L15 |
| S111 | −8.343 | 0.500 | | | |
| S112 | ∞ | 0.300 | 1.517 | 64.2 | Optical Filter OF1 |
| S113 | ∞ | 0.895 | | | |

The aspheric surface sag z of each lens in table 1 can be calculated by the following formula:

$$z = ch^2/\{1 + [1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the first embodiment, the conic constant k and the aspheric coefficients A, B, C, D, E of each surface are shown in Table 2.

TABLE 2

| | Surface Number | | | | | | | |
|---|---|---|---|---|---|---|---|---|
| | S13 | S14 | S15 | S16 | S18 | S19 | S110 | S111 |
| k | −2.6593E+01 | −4.7577E−01 | −9.9297E−02 | 1.4151E+01 | −5.8990E+01 | −2.2749E+00 | −1.5632E+01 | −1.3908E+00 |
| A | −3.6665E−05 | −2.1649E−02 | −4.7124E−03 | 6.0854E−02 | 1.7983E−03 | 4.3789E−03 | 1.4482E−02 | −4.2309E−03 |
| B | −6.4037E−05 | −2.0699E−02 | −1.1536E−02 | −1.0230E−01 | 4.2416E−03 | 7.0488E−03 | 3.8677E−03 | 7.6623E−04 |
| C | 1.1927E−07 | −8.0360E−04 | −1.6444E−03 | 1.2736E−01 | 1.8424E−03 | 1.5878E−03 | 1.8550E−04 | 5.5697E−04 |
| D | 3.4101E−06 | −4.1763E−04 | 9.4536E−04 | −7.9511E−02 | 3.9545E−04 | 6.5093E−04 | −2.7392E−04 | 2.9129E−05 |
| E | −2.1427E−07 | −4.0696E−04 | −1.7308E−04 | 1.8096E−02 | −6.2233E−05 | −6.2233E−05 | −6.2233E−05 | −7.8409E−05 |

For the lens assembly 1 of the first embodiment, the effective focal length f1 of the lens assembly 1 is equal to 1.4206 mm, the distance TTL1 from the object side surface S11 of the first lens L11 to the image plane IMA1 along the optical axis OA1 is equal to 10.775 mm, a half of the image height IH1 is equal to 2.25000 mm, the effective focal length $f1_1$ of the first lens L11 is equal to −9.23075 mm, the effective focal length $f1_2$ of the second lens L12 is equal to −1.91965 mm, the effective focal length $f1_3$ of the third lens L13 is equal to 2.40377 mm, the radius of curvature $R1_{41}$ of the object side surface S18 of the fourth lens L14 is equal to 6.23203 mm, the radius of curvature $R1_{42}$ of the image side surface S19 of the fourth lens L14 is equal to −1.31966 mm, the radius of curvature $R1_{51}$ of the object side surface S110 of the fifth lens L15 is equal to −2.73475 mm, the radius of curvature $R1_{52}$ of the image side surface S111 of the fifth lens L15 is equal to −8.34294 mm, the Abbe number $Vd1_1$ of the first lens L11 is equal to 59.4, the Abbe number $Vd1_2$ of the second lens L12 is equal to 55.7, the Abbe number $Vd1_3$ of the third lens L13 is equal to 23.9 and the Abbe number $Vd1_5$ of the fifth lens L15 is equal to 55.7. According to the above data, the following values can be obtained:

$$f1/TTL1=0.1318,$$

$$TTL1/IH1=4.7889,$$

$$f1_1/f1_2=4.8085,$$

$$f1_3/f1=1.6921,$$

$$(R1_{41}-R1_{42})/(R1_{41}+R1_{42})=1.5373,$$

$$(R1_{51}-R1_{52})/(R1_{51}+R1_{52})=-0.5063,$$

$$(Vd1_1+Vd1_2)/2=57.55$$

which respectively satisfy the above conditions (1)-(10).

Figure 2A:
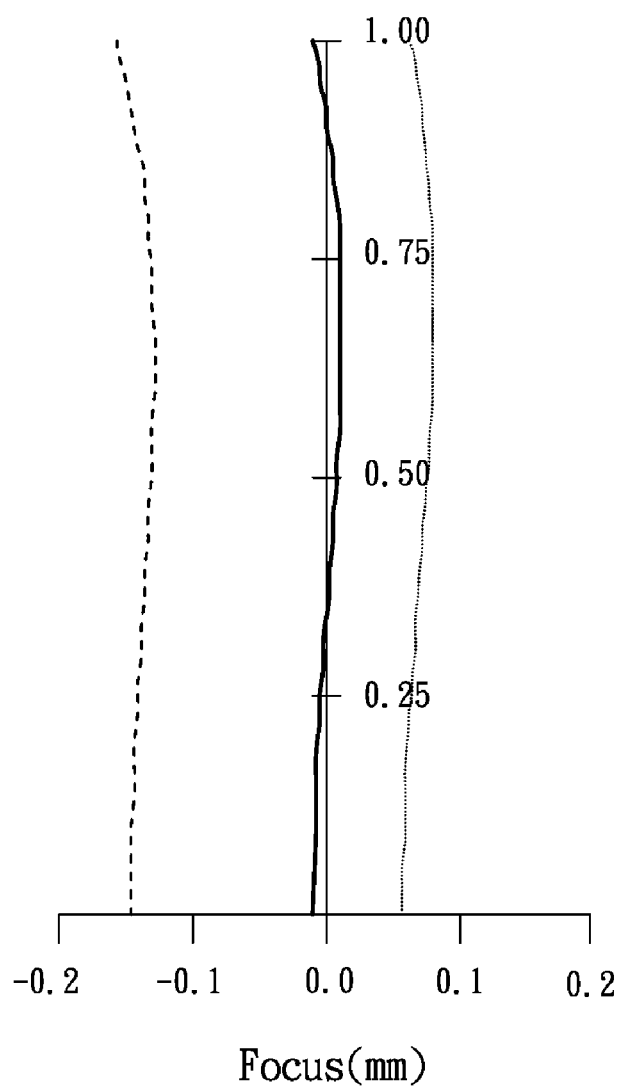
FIG. 2A depicts a longitudinal spherical aberration of the lens assembly in accordance with the first embodiment of the invention.
Figure 2B:
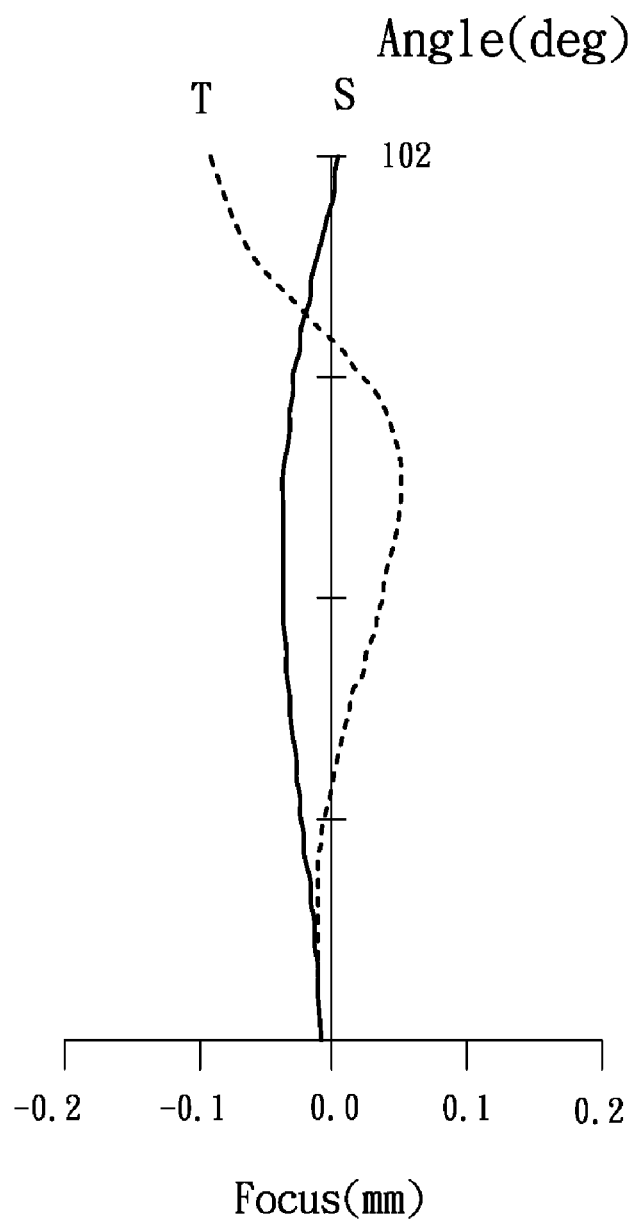
FIG. 2B is an astigmatic field curves diagram of the lens assembly in accordance with the first embodiment of the invention.
Figure 2C:
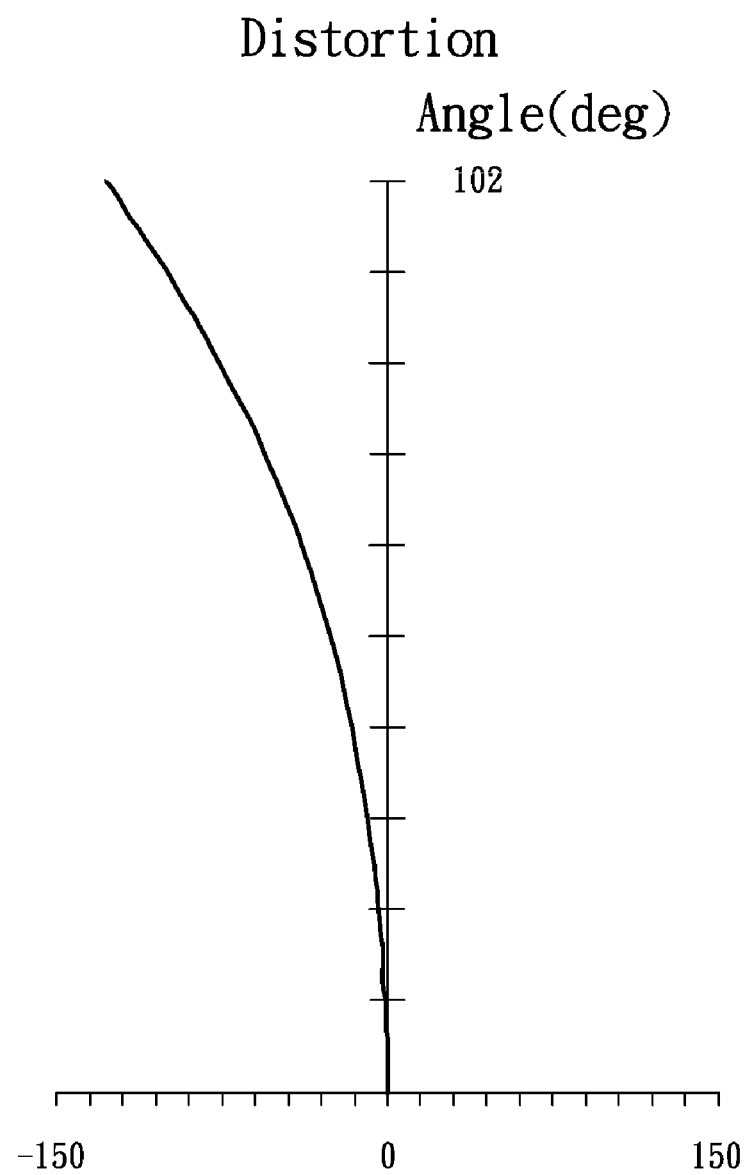
FIG. 2C is a distortion diagram of the lens assembly in accordance with the first embodiment of the invention.

By the above arrangements of the lenses and stop ST1, the lens assembly 1 of the first embodiment can meet the requirements of optical performance as seen in FIGS. 2A-2C, wherein FIG. 2A shows a longitudinal spherical aberration diagram of the lens assembly 1 in accordance with the first embodiment of the invention, FIG. 2B shows an astigmatic field curves of the lens assembly 1 in accordance with the first embodiment of the invention and FIG. 2C shows a distortion diagram of the lens assembly 1 in accordance with the first embodiment of the invention.

It can be seen from FIG. 2A that the longitudinal spherical aberration in the lens assembly 1 of the first embodiment ranges between −0.2 mm and 0.1 mm for the wavelength of 436.0000 nm, 546.0000 nm and 656.0000 nm. It can be seen from FIG. 2B that the astigmatic field curves of tangential direction and sagittal direction in the lens assembly 1 of the first embodiment ranges between −0.1 mm and 0.1 mm for the wavelength of 546.0000 nm. It can be seen from FIG. 2C that the distortion in the lens assembly 1 of the first embodiment ranges between −135% and 0% for the wavelength of 546.0000 nm. It is obvious that the longitudinal spherical aberration, the astigmatic field curves and the distortion of the lens assembly 1 of the first embodiment can be corrected effectively. Therefore, the lens assembly 1 of the first embodiment is capable of good optical performance.

Figure 3:
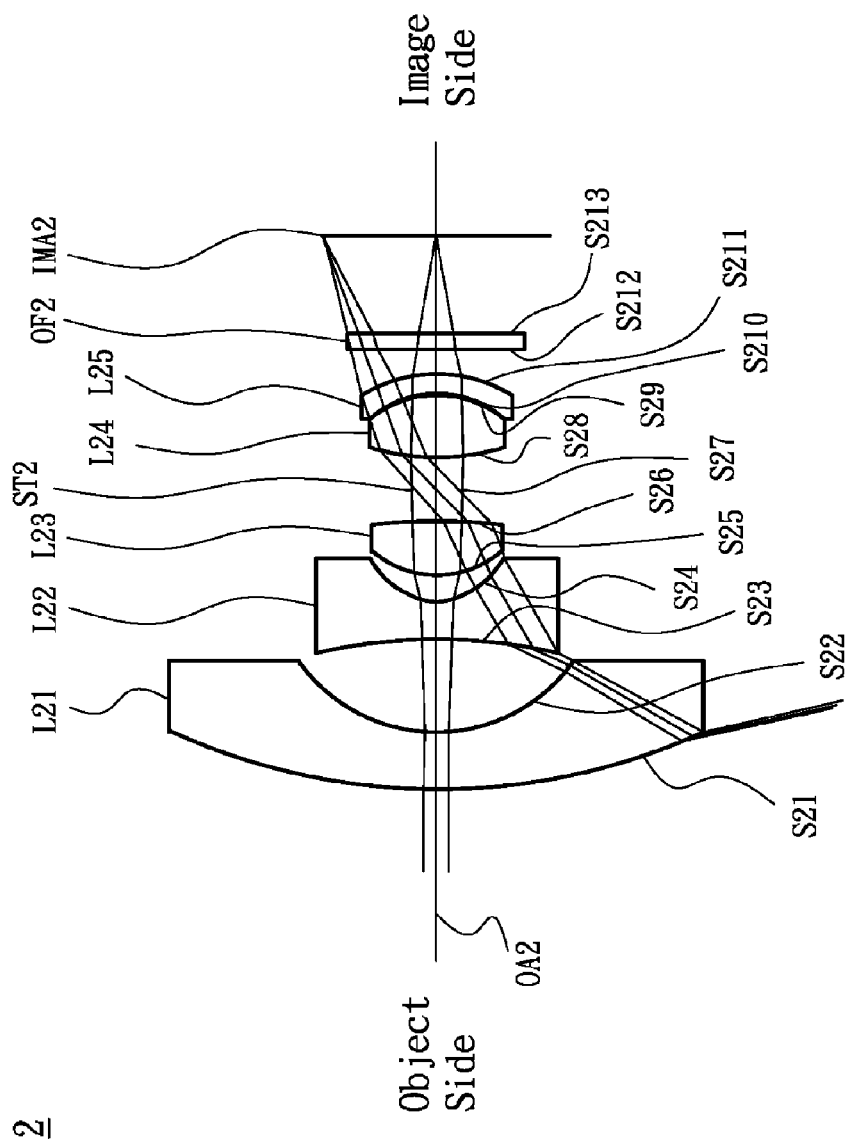
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a first lens L21, a second lens L22, a third lens L23, a stop ST2, a fourth lens L24, a fifth lens L25 and an optical filter OF2, all of which are arranged in sequence from an object side to an image side along an optical axis OA2. In operation, an image of light rays from the object side is formed on an image plane IMA2. The first lens L21 is a convex-concave lens, made of glass material and with negative refractive power, wherein the object side surface S21 is a convex surface, the image side surface S22 is a concave surface and both of the object side surface S21 and image side surface S22 are spherical surfaces. The second lens L22 is a biconcave lens, made of plastic material and with negative refractive power, wherein both of the object side surface S23 and image side surface S24 are aspheric surfaces. The third lens L23 is a biconvex lens, made of plastic material and with positive refractive power, wherein both of the object side surface S25 and image side surface S26 are aspheric surfaces. The fourth lens L24 is a biconvex lens, made of glass material and with positive refractive power, wherein both of the object side surface S28 and image side surface S29 are spherical surfaces. The fifth lens L25 is a concave-convex lens, made of plastic material and with negative refractive power, wherein the object side surface S210 is a concave surface, the image side surface S211 is a convex surface, the object side surface S210 is a spherical surface and the image side surface S211 is an aspheric surface. Both of the object side surface S212 and image side surface S213 of the optical filter OF2 are plane surfaces.

In order to maintain excellent optical performance of the lens assembly in accordance with the first embodiment of the invention, the lens assembly 2 must satisfies the following ten conditions:

$$0.01 \leq f2/TTL2 \leq 0.2 \quad (11)$$

$$4 \leq TTL2/IH2 \leq 5 \quad (12)$$

$$3 \leq f2_1/f2_2 \leq 6 \quad (13)$$

$$1 \leq f2_3/f2 \leq 3 \quad (14)$$

$$1 \leq (R2_{41}-R2_{42})/(R2_{41}+R2_{42}) \leq 3 \quad (15)$$

$$-1 \leq (R2_{51}-R2_{52})/(R2_{51}+R2_{52}) \leq 1 \quad (16)$$

$$(Vd2_1+Vd2_2)/2 > 40 \quad (17)$$

$$Vd2_1 \geq Vd2_3 \quad (18)$$

$$Vd2_2 \geq Vd2_3 \quad (19)$$

$$Vd2_5 \geq Vd2_3 \quad (20)$$

wherein f2 is an effective focal length of the lens assembly 2, TTL2 is a distance from the object side surface S21 of the first lens L21 to the image plane IMA2 along the optical axis OA2, IH2 is a half of an image height, $f2_1$ is an effective focal length of the first lens L21, $f2_2$ is an effective focal length of the second lens L22, $f2_3$ is an effective focal length of the third lens L23, $R2_{41}$ is a radius of curvature of the object side surface S28 of the fourth lens L24, $R2_{42}$ is a radius of curvature of the image side surface S29 of the fourth lens L24, $R2_{51}$ is a radius of curvature of the object side surface S210 of the fifth lens L25, $R2_{52}$ is a radius of curvature of the image side surface S211 of the fifth lens L25, $Vd2_1$ is an Abbe number of the first lens L21, $Vd2_2$ is an Abbe number of the second lens L22, $Vd2_3$ is an Abbe number of the third lens L23 and $Vd2_5$ is an Abbe number of the fifth lens L25.

By the above design of the lenses and stop ST2, the lens assembly 2 is provided with a shortened total lens length, an increased field of view, an effective corrected aberration and an increased resolution.

In order to achieve the above purposes and effectively enhance the optical performance, the lens assembly 2 in accordance with the second embodiment of the invention is provided with the optical specifications shown in Table 3, which include the effective focal length, F-number, field of view, total lens length, radius of curvature of each lens surface, thickness between adjacent surface, refractive index of each lens and Abbe number of each lens. Table 3 shows that the effective focal length is equal to 1.4204 mm, F-number is equal to 2.8, field of view is equal to 206.1° and total lens length is equal to 11.000 mm for the lens assembly 2 of the second embodiment of the invention.

TABLE 3

Effective Focal Length = 1.4204 mm F-number = 2.8
Field of View = 206.1° Total Lens Length = 11.000 mm

| Surface Number | Radius of Curvature (mm) | Thickness (mm) | Nd | Vd | Remark |
|---|---|---|---|---|---|
| S21 | 13.058 | 1.128 | 1.620 | 60.3 | The First Lens L21 |
| S22 | 3.315 | 1.832 | | | |
| S23 | −7.844 | 0.752 | 1.535 | 56.1 | The Second Lens L22 |
| S24 | 1.182 | 0.525 | | | |
| S25 | 1.952 | 1.079 | 1.632 | 23.4 | The Third Lens L23 |
| S26 | −8.242 | 0.626 | | | |
| S27 | ∞ | 0.654 | | | Stop ST2 |
| S28 | 4.840 | 1.229 | 1.647 | 55.6 | The Fourth Lens L24 |
| S29 | −2.055 | 0.010 | | | |
| S210 | −2.055 | 0.400 | 1.755 | 27.6 | The Fifth Lens L25 |
| S211 | −2.272 | 0.500 | | | |
| S212 | ∞ | 0.300 | 1.517 | 64.2 | Optical Filter OF2 |
| S213 | ∞ | 1.964 | | | |

The aspheric surface sag z of each lens in table 3 can be calculated by the following formula:

$$z = ch^2/\{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the second embodiment, the conic constant k and the aspheric coefficients A, B, C, D, E of each surface are shown in Table 4.

TABLE 4

| | Surface Number | | | | |
|---|---|---|---|---|---|
| | S23 | S24 | S25 | S26 | S211 |
| k | −1.4985E+01 | −3.9905E−01 | 7.3774E−02 | 1.3697E+00 | −1.8258E+00 |
| A | 7.0604E−04 | 8.4001E−03 | 2.3790E−02 | 6.4041E−02 | 7.2366E−04 |
| B | −3.4435E−05 | −2.0241E−02 | −1.3316E−02 | −1.0755E−01 | 2.8972E−03 |
| C | −1.1135E−05 | −2.7798E−03 | −2.1094E−03 | 1.2257E−01 | 2.2408E−04 |
| D | 3.9785E−06 | −8.0851E−04 | 3.9456E−04 | −7.6027E−02 | 1.0448E−04 |
| E | −2.5300E−07 | −4.0696E−04 | −1.7308E−04 | 1.8096E−02 | −7.8409E−05 |

For the lens assembly 2 of the second embodiment, the effective focal length f2 of the lens assembly 2 is equal to 1.4204 mm, the distance TTL2 from the object side surface S21 of the first lens L21 to the image plane IMA2 along the optical axis OA2 is equal to 11.000 mm, a half of the image height IH2 is equal to 2.25000 mm, the effective focal length $f2_1$ of the first lens L21 is equal to −7.46512 mm, the effective focal length $f2_2$ of the second lens L22 is equal to −1.85907 mm, the effective focal length $f2_3$ of the third lens L23 is equal to 2.57614 mm, the radius of curvature $R2_{41}$ of the object side surface S28 of the fourth lens L24 is equal to 4.83984 mm, the radius of curvature $R2_{42}$ of the image side surface S29 of the fourth lens L24 is equal to −2.05460 mm, the radius of curvature $R2_{51}$ of the object side surface S210 of the fifth lens L25 is equal to −2.05460 mm, the radius of curvature $R2_{52}$ of the image side surface S211 of the fifth lens L25 is equal to −2.27177 mm, the Abbe number $Vd2_1$ of the first lens L21 is equal to 60.3, the Abbe number $Vd2_2$ of the second lens L22 is equal to 56.1, the Abbe number $Vd2_3$ of the third lens L23 is equal to 23.4 and the Abbe number $Vd2_5$ of the fifth lens L25 is equal to 27.6. According to the above data, the following values can be obtained:

$f2/TTL2 = 0.1291$, $TTL2/IH2 = 4.8891$, $f2_1/f2_2 = 4.0155$, $f2_3/f2 = 1.8137$, $(R2_{41} - R2_{42})/(R2_{41} + R2_{42}) = 2.4754$, $(R2_{51} - R2_{52})/(R2_{51} + R2_{52}) = -0.0502$, $(Vd2_1 + Vd2_2)/2 = 58.1$ which respectively satisfy the above conditions (11)-(20).

Figure 4A:
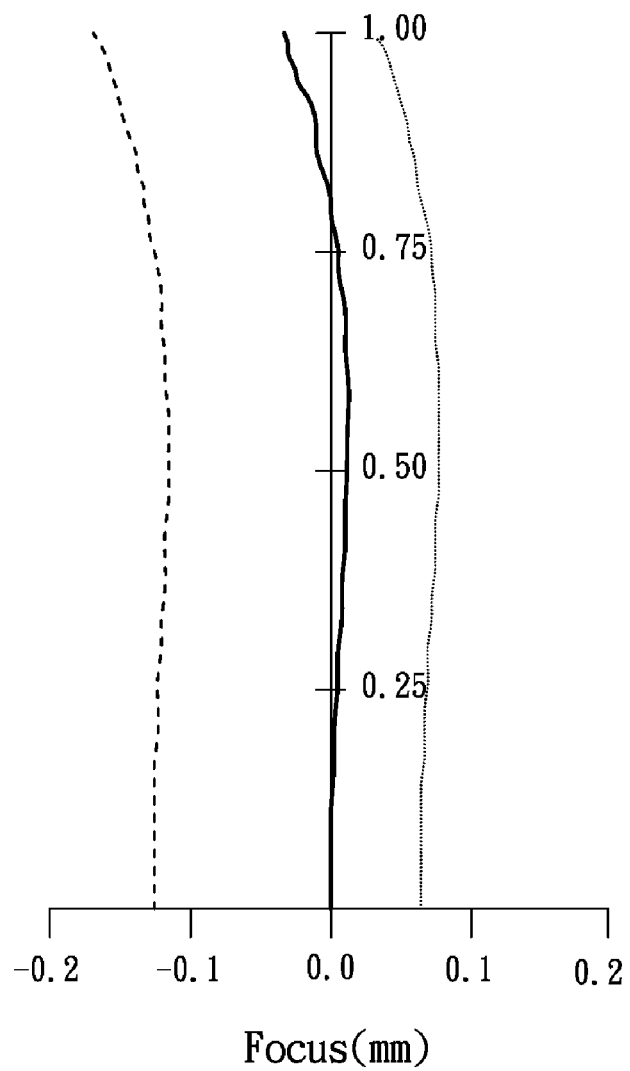
FIG. 4A depicts a longitudinal spherical aberration of the lens assembly in accordance with the second embodiment of the invention.
Figure 4B:
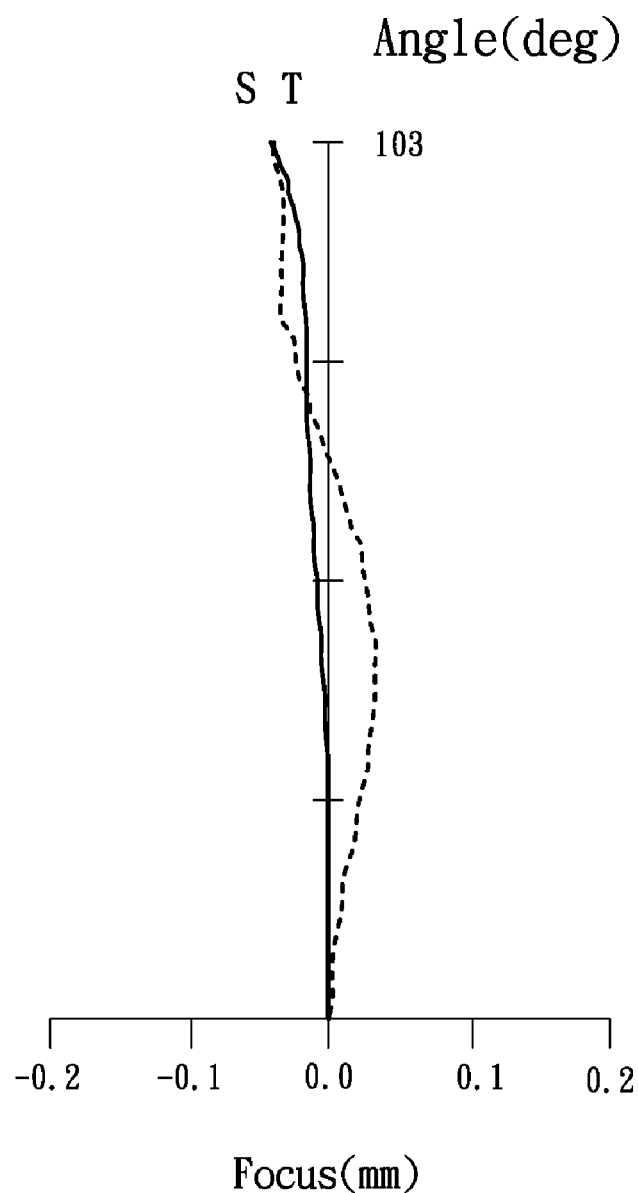
FIG. 4B is an astigmatic field curves diagram of the lens assembly in accordance with the second embodiment of the invention.
Figure 4C:
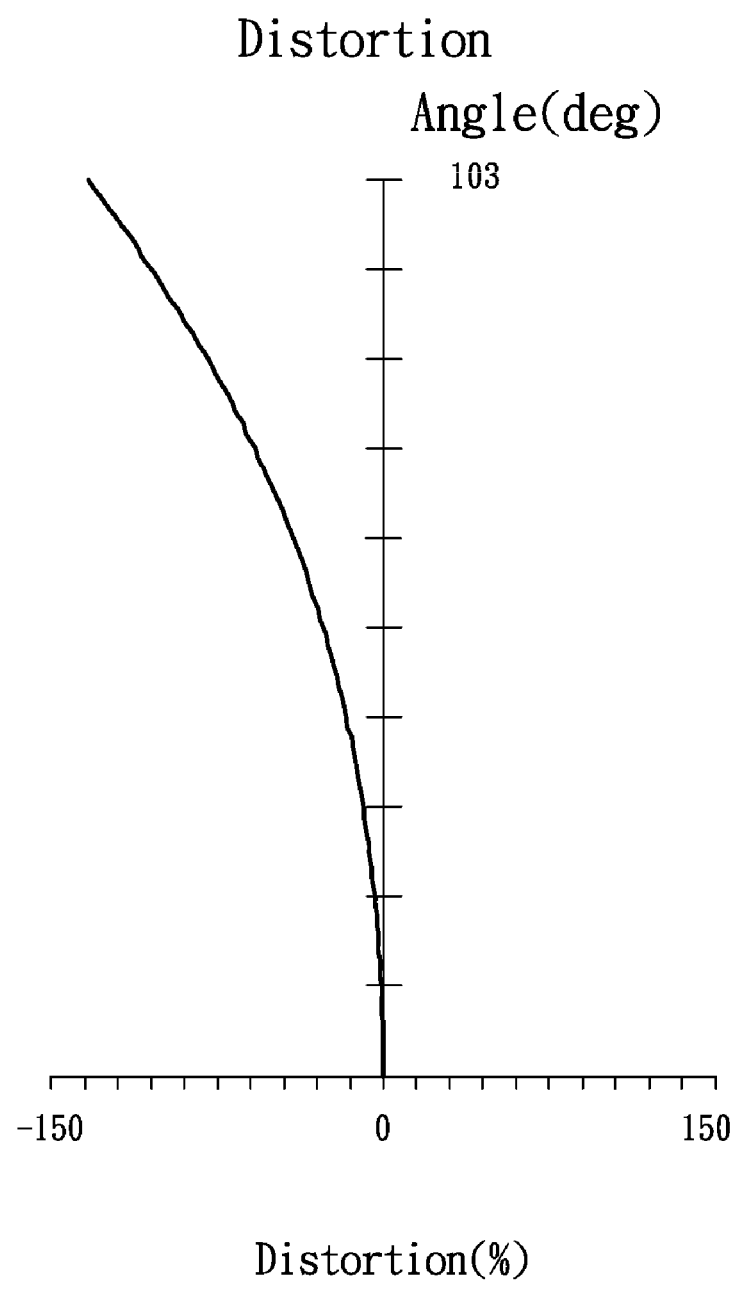
FIG. 4C is a distortion diagram of the lens assembly in accordance with the second embodiment of the invention.

By the above arrangements of the lenses and stop ST2, the lens assembly 2 of the second embodiment can meet the requirements of optical performance as seen in FIGS. 4A-4C, wherein FIG. 4A shows a longitudinal spherical aberration diagram of the lens assembly 2 in accordance with the second embodiment of the invention, FIG. 4B shows an astigmatic field curves of the lens assembly 2 in accordance with the second embodiment of the invention and FIG. 4C shows a distortion diagram of the lens assembly 2 in accordance with the second embodiment of the invention.

It can be seen from FIG. 4A that the longitudinal spherical aberration in the lens assembly 2 of the second embodiment ranges between −0.2 mm and 0.1 mm for the wavelength of 436.0000 nm, 546.0000 nm and 656.0000 nm. It can be seen from FIG. 4B that the astigmatic field curves of tangential direction and sagittal direction in the lens assembly 2 of the second embodiment ranges between 0.05 mm and 0.05 mm for the wavelength of 546.0000 nm. It can be seen from FIG. 4C that the distortion in the lens assembly 2 of the second embodiment ranges between −135% and 0% for the wavelength of 546.0000 nm. It is obvious that the longitudinal spherical aberration, the astigmatic field curves and the distortion of the lens assembly 2 of the second embodiment can be corrected effectively. Therefore, the lens assembly 2 of the second embodiment is capable of good optical performance.

Figure 5:
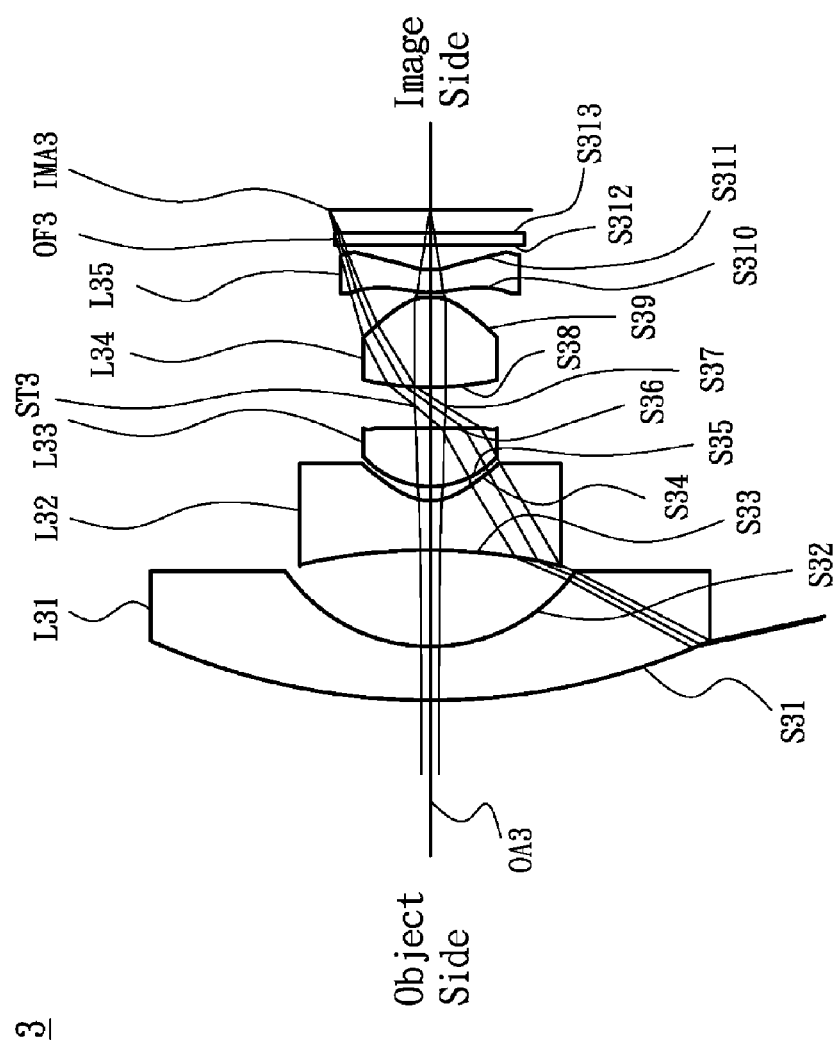
FIG. 5 is a lens layout and optical path diagram of a lens assembly in accordance with a third embodiment of the invention.

Referring to FIG. 5, FIG. 5 is a lens layout and optical path diagram of a lens assembly in accordance with a third embodiment of the invention. The lens assembly 3 includes a first lens L31, a second lens L32, a third lens L33, a stop ST3, a fourth lens L34, a fifth lens L35 and an optical filter OF3, all of which are arranged in sequence from an object side to an image side along an optical axis OA3. In operation, an image of light rays from the object side is formed on an image plane IMA3. The first lens L31 is a convex-concave lens, made of glass material and with negative refractive power, wherein the object side surface S31 is a convex surface, the image side surface S32 is a concave surface and both of the object side surface S31 and image side surface S32 are spherical surfaces. The second lens L32 is a biconcave lens, made of plastic material and with negative refractive power, wherein both of the object side surface S33 and image side surface S34 are aspheric surfaces. The third lens L33 is a biconvex lens, made of plastic material and with positive refractive power, wherein both of the object side surface S35 and image side surface S36 are aspheric surfaces. The fourth lens L34 is a biconvex lens, made of plastic material and with positive refractive power, wherein both of the object side surface S38 and image side surface S39 are aspheric surfaces. The fifth lens L35 is a convex-concave lens, made of plastic material and with negative refractive power, wherein the object side surface S310 is a convex surface, the image side surface S311 is a concave surface and both of the object side surface S310 and image side surface S311 are aspheric surfaces. Both of the object side surface S312 and image side surface S313 of the optical filter OF3 are plane surfaces.

In order to maintain excellent optical performance of the lens assembly in accordance with the third embodiment of the invention, the lens assembly 3 must satisfies the following ten conditions:

$$0.01 \le f3/TTL3 \le 0.2 \quad (21)$$

$$4 \le TTL3/IH3 \le 5 \quad (22)$$

$$3 \le f3_1/f3_2 \le 6 \quad (23)$$

$$1 \le f3_3/f3 \le 3 \quad (24)$$

$$1 \le (R3_{41} - R3_{42})/(R3_{41} + R3_{42}) \le 3 \quad (25)$$

$$-1 \le (R3_{51} - R3_{52})/(R3_{51} + R3_{52}) \le 1 \quad (26)$$

$$(Vd3_1 + Vd3_2)/2 > 40 \quad (27)$$

$$Vd3_1 \ge Vd3_3 \quad (28)$$

$$Vd3_2 \ge Vd3_3 \quad (29)$$

$$Vd3_5 \ge Vd3_3 \quad (30)$$

wherein f3 is an effective focal length of the lens assembly 3, TTL3 is a distance from the object side surface S31 of the first lens L31 to the image plane IMA3 along the optical axis OA3, IH3 is a half of an image height, $f3_1$ is an effective focal length of the first lens L31, $f3_2$ is an effective focal length of the second lens L32, $f3_3$ is an effective focal length of the third lens L33, $R3_{41}$ is a radius of curvature of the object side surface S38 of the fourth lens L34, $R3_{42}$ is a radius of curvature of the image side surface S39 of the fourth lens L34, $R3_{51}$ is a radius of curvature of the object side surface S310 of the fifth lens L35, $R3_{52}$ is a radius of curvature of the image side surface S311 of the fifth lens L35, $Vd3_1$ is an Abbe number of the first lens L31, $Vd3_2$ is an Abbe number of the second lens L32, $Vd3_3$ is an Abbe number of the third lens L33 and $Vd3_5$ is an Abbe number of the fifth lens L35.

By the above design of the lenses and stop ST3, the lens assembly 3 is provided with a shortened total lens length, an increased field of view, an effective corrected aberration and an increased resolution.

In order to achieve the above purposes and effectively enhance the optical performance, the lens assembly 3 in accordance with the third embodiment of the invention is provided with the optical specifications shown in Table 5, which include the effective focal length, F-number, field of view, total lens length, radius of curvature of each lens surface, thickness between adjacent surface, refractive index of each lens and Abbe number of each lens. Table 5 shows that the effective focal length is equal to 1.0834 mm, F-number is equal to 2.8, field of view is equal to 209.1° and total lens length is equal to 11.000 mm for the lens assembly 3 of the third embodiment of the invention.

TABLE 5

Effective Focal Length = 1.0834 mm F-number = 2.8
Field of View = 209.1° Total Lens Length = 11.000 mm

| Surface Number | Radius of Curvature (mm) | Thickness (mm) | Nd | Vd | Remark |
|---|---|---|---|---|---|
| S31 | 15.145 | 1.216 | 1.583 | 59.4 | The First Lens L31 |
| S32 | 3.931 | 2.146 | | | |
| S33 | −9.998 | 1.128 | 1.535 | 55.7 | The Second Lens L32 |
| S34 | 1.160 | 0.318 | | | |
| S35 | 1.755 | 1.303 | 1.636 | 23.9 | The Third Lens L33 |
| S36 | −10.050 | 0.511 | | | |
| S37 | ∞ | 0.413 | | | Stop ST3 |
| S38 | 5.078 | 2.001 | 1.535 | 55.7 | The Fourth Lens L34 |
| S39 | −1.024 | 0.100 | | | |
| S310 | 2.241 | 0.519 | 1.535 | 55.7 | The Fifth Lens L35 |
| S311 | 1.360 | 0.529 | | | |
| S312 | ∞ | 0.300 | 1.517 | 64.2 | Optical Filter OF3 |
| S313 | ∞ | 0.517 | | | |

The aspheric surface sag z of each lens in table 5 can be calculated by the following formula:

$$z = ch^2/\{1 + [1 - (k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the third embodiment, the conic constant k and the aspheric coefficients A, B, C, D, E of each surface are shown in Table 6.

TABLE 6

| | Surface Number | | | | | | | |
|---|---|---|---|---|---|---|---|---|
| | S33 | S34 | S35 | S36 | S38 | S39 | S310 | S311 |
| k | −2.3663E+01 | −5.1448E−01 | −6.5738E−02 | −1.7714E+01 | −5.9580E+01 | −1.2795E+00 | −2.3073E+01 | −8.3611E+00 |
| A | −2.0451E−04 | −6.1321E−02 | 4.1613E−03 | 6.9700E−02 | 1.6688E−02 | −9.2826E−03 | −2.4554E−02 | −1.7709E−03 |
| B | −1.1820E−04 | −2.0224E−02 | −1.3477E−02 | −1.0100E−01 | 2.0785E−03 | 6.3432E−03 | −3.2399E−03 | 1.1321E−03 |
| C | −1.8778E−06 | 7.3503E−04 | −2.0063E−03 | 1.2490E−01 | −6.9256E−03 | 5.0546E−04 | −7.2507E−05 | −1.5733E−03 |
| D | 3.7222E−06 | 2.1153E−04 | 1.1410E−03 | −8.0046E−02 | 1.9944E−03 | 2.7226E−04 | −4.1094E−05 | −1.5623E−04 |
| E | −2.1427E−07 | −4.0696E−04 | −1.7308E−04 | 1.8096E−02 | −6.2233E−05 | −6.2233E−05 | 7.8409E−05 | 6.2233E−05 |

For the lens assembly 3 of the third embodiment, the effective focal length f3 of the lens assembly 3 is equal to 1.0834 mm, the distance TTL3 from the object side surface S31 of the first lens L31 to the image plane IMA3 along the optical axis OA3 is equal to 11.000 mm, a half of the image height IH3 is equal to 2.25000 mm, the effective focal length $f3_1$ of the first lens L31 is equal to −9.44488 mm, the effective focal length $f3_2$ of the second lens L32 is equal to −1.86884 mm, the effective focal length $f3_3$ of the third lens L33 is equal to 2.43312 mm, the radius of curvature $R3_{41}$ of the object side surface S38 of the fourth lens L34 is equal to 5.07884 mm, the radius of curvature $R3_{42}$ of the image side surface S39 of the fourth lens L34 is equal to −1.02410 mm, the radius of curvature $R3_{51}$ of the object side surface S310 of the fifth lens L35 is equal to 2.24061 mm, the radius of curvature $R3_{52}$ of the image side surface S311 of the fifth lens L35 is equal to 1.36043 mm, the Abbe number $Vd3_1$ of the first lens L31 is equal to 59.4, the Abbe number $Vd3_2$ of the second lens L32 is equal to 55.7, the Abbe number $Vd3_3$ of the third lens L33 is equal to 23.9 and the Abbe number $Vd3_5$ of the fifth lens L35 is equal to 55.7. According to the above data, the following values can be obtained:

$$f3/TTL3=0.0985,$$

$$TTL3/IH3=4.8890,$$

$$f3_1/f3_2=5.0539,$$

$$f3_3/f3=2.2458,$$

$$(R3_{41}-R3_{42})/(R3_{41}+R3_{42})=1.5052,$$

$$(R3_{51}-R3_{52})/(R3_{51}+R3_{52})=0.2444,$$

$$(Vd3_1+Vd3_2)/2=57.55$$

which respectively satisfy the above conditions (21)-(30).

Figure 6A:
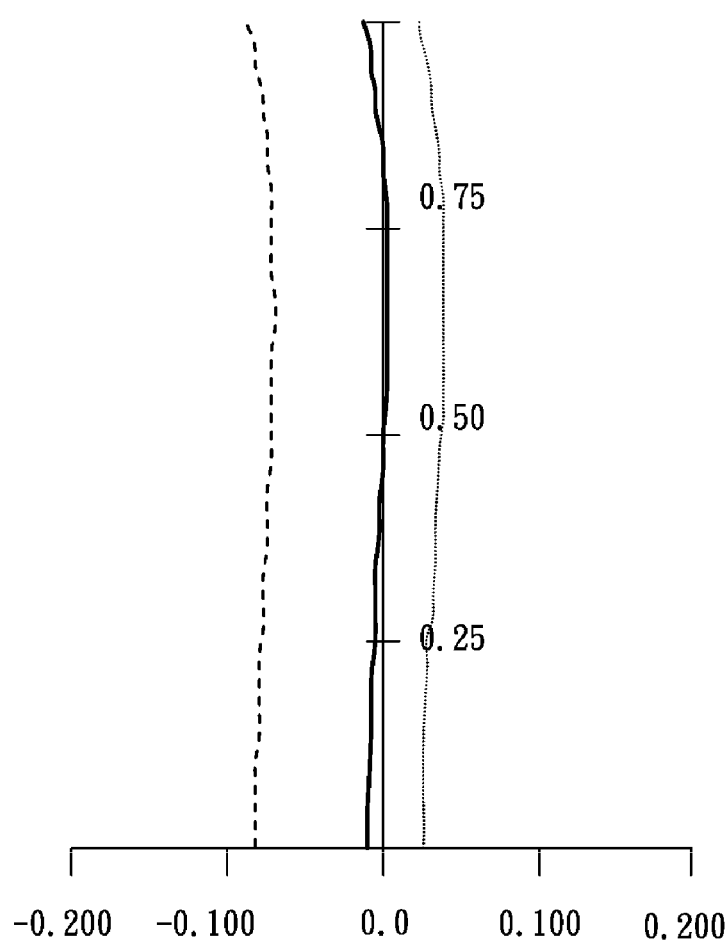
FIG. 6A depicts a longitudinal spherical aberration of the lens assembly in accordance with the third embodiment of the invention.
Figure 6B:
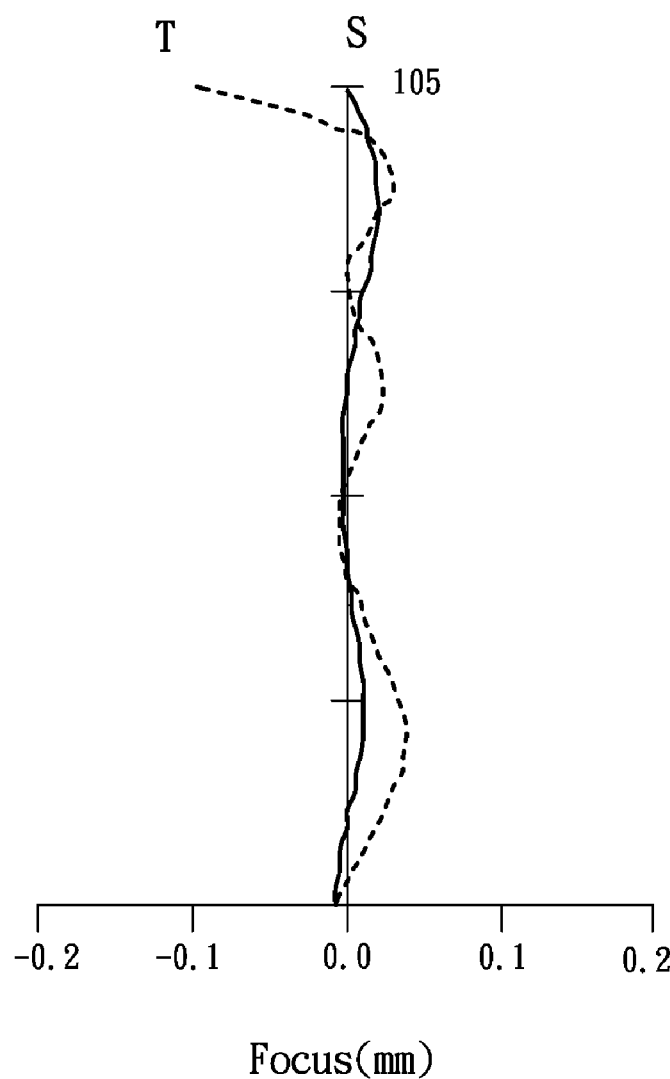
FIG. 6B is an astigmatic field curves diagram of the lens assembly in accordance with the third embodiment of the invention.
Figure 6C:
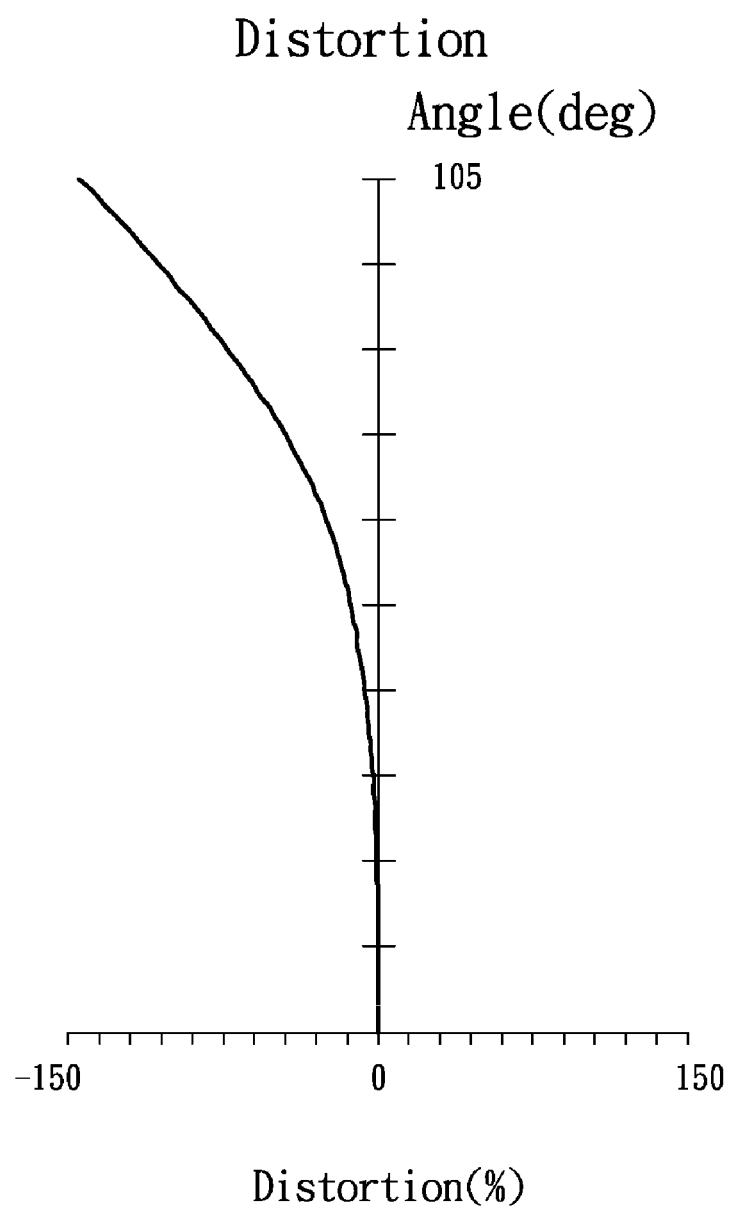
FIG. 6C is a distortion diagram of the lens assembly in accordance with the third embodiment of the invention.

By the above arrangements of the lenses and stop ST3, the lens assembly 3 of the third embodiment can meet the requirements of optical performance as seen in FIGS. 6A-6C, wherein FIG. 6A shows a longitudinal spherical aberration diagram of the lens assembly 3 in accordance with the third embodiment of the invention, FIG. 6B shows an astigmatic field curves of the lens assembly 3 in accordance with the third embodiment of the invention and FIG. 6C shows a distortion diagram of the lens assembly 3 in accordance with the third embodiment of the invention.

It can be seen from FIG. 6A that the longitudinal spherical aberration in the lens assembly 3 of the third embodiment ranges between −0.10 mm and 0.05 mm for the wavelength of 436.0000 nm, 546.0000 nm and 656.0000 nm. It can be seen from FIG. 6B that the astigmatic field curves of tangential direction and sagittal direction in the lens assembly 3 of the third embodiment ranges between −0.15 mm and 0.05 mm for the wavelength of 546.0000 nm. It can be seen from FIG. 6C that the distortion in the lens assembly 3 of the third embodiment ranges between −150% and 0% for the wavelength of 546.0000 nm. It is obvious that the longitudinal spherical aberration, the astigmatic field curves and the distortion of the lens assembly 3 of the third embodiment can be corrected effectively. Therefore, the lens assembly 3 of the third embodiment is capable of good optical performance.

Figure 7:
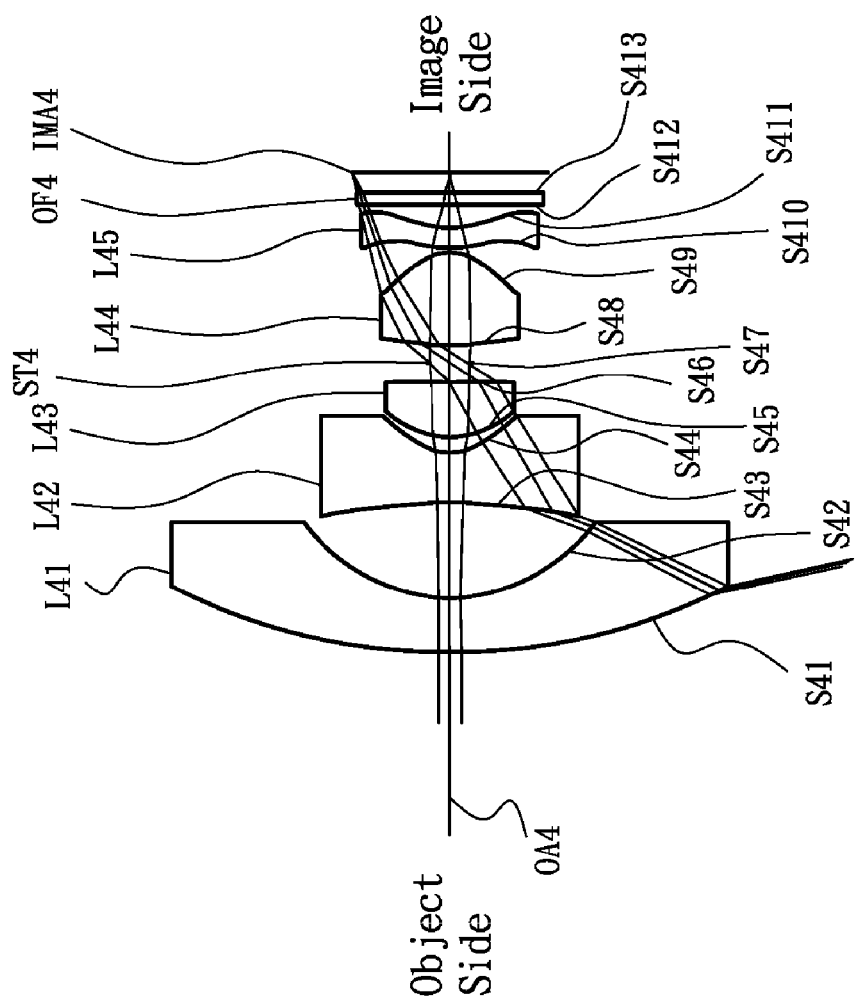
FIG. 7 is a lens layout and optical path diagram of a lens assembly in accordance with a fourth embodiment of the invention.

Referring to FIG. 7, FIG. 7 is a lens layout and optical path diagram of a lens assembly in accordance with a fourth embodiment of the invention. The lens assembly 4 includes a first lens L41, a second lens L42, a third lens L43, a stop ST4, a fourth lens L44, a fifth lens L45 and an optical filter OF4, all of which are arranged in sequence from an object side to an image side along an optical axis OA4. In operation, an image of light rays from the object side is formed on an image plane IMA4. The first lens L41 is a convex-concave lens, made of glass material and with negative refractive power, wherein the object side surface S41 is a convex surface, the image side surface S42 is a concave surface and both of the object side surface S41 and image side surface S42 are spherical surfaces. The second lens L42 is a biconcave lens, made of plastic material and with negative refractive power, wherein both of the object side surface S43 and image side surface S44 are aspheric surfaces. The third lens L43 is a biconvex lens, made of plastic material and with positive refractive power, wherein both of the object side surface S45 and image side surface S46 are aspheric surfaces. The fourth lens L44 is a biconvex lens, made of plastic material and with positive refractive power, wherein both of the object side surface S48 and image side surface S49 are aspheric surfaces. The fifth lens L45 is a convex-concave lens, made of plastic material and with negative refractive power, wherein the object side surface S410 is a convex surface, the image side surface S411 is a concave surface and both of the object side surface S410 and image side surface S411 are aspheric surfaces. Both of the object side surface S412 and image side surface S413 of the optical filter OF4 are plane surfaces.

In order to maintain excellent optical performance of the lens assembly in accordance with the fourth embodiment of the invention, the lens assembly 4 must satisfies the following ten conditions:

$$0.01 \leq f4/TTL4 \leq 0.2 \quad (31)$$

$$4 \leq TTL4/IH4 \leq 5 \quad (32)$$

$$3 \leq f4_1/f4_2 \leq 6 \quad (33)$$

$$1 \leq f4_3/f4 \leq 3 \quad (34)$$

$$1 \leq (R4_{41}-R4_{42})/(R4_{41}+R4_{42}) \leq 3 \quad (35)$$

$$-1 \leq (R4_{51}-R4_{52})/(R4_{51}+R4_{52}) \leq 1 \quad (36)$$

$$(Vd4_1+Vd4_2)/2 > 40 \quad (37)$$

$$Vd4_1 \geq Vd4_3 \quad (38)$$

$$Vd4_2 \geq Vd4_3 \quad (39)$$

$$Vd4_5 \geq Vd4_3 \quad (40)$$

wherein f4 is an effective focal length of the lens assembly 4, TTL4 is a distance from the object side surface S41 of the first lens L41 to the image plane IMA4 along the optical axis OA4, IH4 is a half of an image height, $f4_1$ is an effective focal length of the first lens L41, $f4_2$ is an effective focal length of the second lens L42, $f4_3$ is an effective focal length of the third lens L43, $R4_{41}$ is a radius of curvature of the object side surface S48 of the fourth lens L44, $R4_{42}$ is a radius of curvature of the image side surface S49 of the fourth lens L44, $R4_{51}$ is a radius of curvature of the object side surface S410 of the fifth lens L45, $R4_{52}$ is a radius of curvature of the image side surface S411 of the fifth lens L45, $Vd4_1$ is an Abbe number of the first lens L41, $Vd4_2$ is an Abbe number of the second lens L42, $Vd4_3$ is an Abbe number of the third lens L43 and $Vd4_5$ is an Abbe number of the fifth lens L45.

By the above design of the lenses and stop ST4, the lens assembly 4 is provided with a shortened total lens length, an increased field of view, an effective corrected aberration and an increased resolution.

In order to achieve the above purposes and effectively enhance the optical performance, the lens assembly 4 in accordance with the fourth embodiment of the invention is provided with the optical specifications shown in Table 7, which include the effective focal length, F-number, field of view, total lens length, radius of curvature of each lens surface, thickness between adjacent surface, refractive index of each lens and Abbe number of each lens. Table 7 shows that the effective focal length is equal to 1.0127 mm, F-number is equal to 2.8, field of view is equal to 209.8° and total lens length is equal to 11.003 mm for the lens assembly 4 of the fourth embodiment of the invention.

TABLE 7

Effective Focal Length = 1.0127 mm F-number = 2.8
Field of View = 209.8° Total Lens Length = 11.003 mm

| Surface Number | Radius of Curvature (mm) | Thickness (mm) | Nd | Vd | Remark |
|---|---|---|---|---|---|
| S41 | 14.512 | 1.227 | 1.583 | 59.4 | The First Lens L41 |
| S42 | 4.074 | 2.196 | | | |
| S43 | −9.877 | 1.131 | 1.535 | 55.7 | The Second Lens L42 |
| S44 | 1.164 | 0.359 | | | |
| S45 | 1.810 | 1.260 | 1.636 | 23.9 | The Third Lens L43 |

TABLE 7-continued

Effective Focal Length = 1.0127 mm F-number = 2.8
Field of View = 209.8° Total Lens Length = 11.003 mm

| Surface Number | Radius of Curvature (mm) | Thickness (mm) | Nd | Vd | Remark |
|---|---|---|---|---|---|
| S46 | −10.125 | 0.454 | | | |
| S47 | ∞ | 0.419 | | | Stop ST4 |
| S48 | 4.305 | 2.127 | 1.535 | 55.7 | The Fourth Lens L44 |
| S49 | −1.063 | 0.100 | | | |
| S410 | 2.138 | 0.467 | 1.535 | 55.7 | The Fifth Lens L45 |
| S411 | 1.686 | 0.509 | | | |
| S412 | ∞ | 0.300 | 1.517 | 64.2 | Optical Filter OF4 |
| S413 | ∞ | 0.453 | | | |

The aspheric surface sag z of each lens in table 7 can be calculated by the following formula:

$$z = ch^2 / \{1 + [1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D and E are aspheric coefficients.

In the fourth embodiment, the conic constant k and the aspheric coefficients A, B, C, D, E of each surface are shown in Table 8.

TABLE 8

| | Surface Number | | | | | | | |
|---|---|---|---|---|---|---|---|---|
| | S43 | S44 | S45 | S46 | S48 | S49 | S410 | S411 |
| k | −4.8038E+01 | −5.0968E−01 | −5.5547E−02 | −3.6371E+00 | −6.4015E+01 | −1.2540E+00 | −1.3710E+01 | −1.1102E+01 |
| A | −6.1938E−04 | −5.6331E−02 | 2.3674E−03 | 6.7639E−02 | 1.5483E−02 | −1.3189E−02 | −2.0340E−02 | 7.6055E−03 |
| B | −1.2647E−04 | −2.1117E−02 | −1.1668E−02 | −1.0009E−01 | 4.5530E−03 | 4.9595E−03 | −3.7299E−03 | 4.5033E−04 |
| C | −1.8048E−06 | 6.1287E−04 | −1.9075E−03 | 1.2567E−01 | −4.1206E−03 | 6.9072E−04 | −3.4246E−04 | −1.5931E−03 |
| D | 3.8228E−06 | 1.8181E−04 | 1.0866E−03 | −8.0240E−02 | 2.2282E−04 | 4.1304E−04 | −6.4514E−05 | −1.7098E−04 |
| E | −2.1427E−07 | −4.0696E−04 | −1.7308E−04 | 1.8096E−02 | −6.2233E−05 | −6.2233E−05 | 7.8409E−05 | 6.2233E−05 |

For the lens assembly 4 of the fourth embodiment, the effective focal length f4 of the lens assembly 4 is equal to 1.0127 mm, the distance TTL4 from the object side surface S41 of the first lens L41 to the image plane IMA4 along the optical axis OA4 is equal to 11.003 mm, a half of the image height IH4 is equal to 2.25000 mm, the effective focal length $f4_1$ of the first lens L41 is equal to −10.11420 mm, the effective focal length $f4_2$ of the second lens L42 is equal to −1.87042 mm, the effective focal length $f4_3$ of the third lens L43 is equal to 2.49610 mm, the radius of curvature $R4_{41}$ of the object side surface S48 of the fourth lens L44 is equal to 4.30529 mm, the radius of curvature $R4_{42}$ of the image side surface S49 of the fourth lens L44 is equal to −1.06324 mm, the radius of curvature $R4_{51}$ of the object side surface S410 of the fifth lens L45 is equal to 2.13788 mm, the radius of curvature $R4_{52}$ of the image side surface S411 of the fifth lens L45 is equal to 1.68571 mm, the Abbe number $Vd4_1$ of the first lens L41 is equal to 59.4, the Abbe number $Vd4_2$ of the second lens L42 is equal to 55.7, the Abbe number $Vd4_3$ of the third lens L43 is equal to 23.9 and the Abbe number $Vd4_5$ of the fifth lens L45 is equal to 55.7. According to the above data, the following values can be obtained:

$$f4/TTL4 = 0.0920,$$

$$TTL4/IH4 = 4.8903,$$

$f4_1/f4_2=5.4075$, $f4_3/f4=2.4648$, $(R4_{41}-R4_{42})/(R4_{41}+R4_{42})=1.6559$, $(R4_{51}-R4_{52})/(R4_{51}+R4_{52})=0.1183$, $(Vd4_1+Vd4_2)/2=57.55$ which respectively satisfy the above conditions (31)-(40).

Figure 8A:
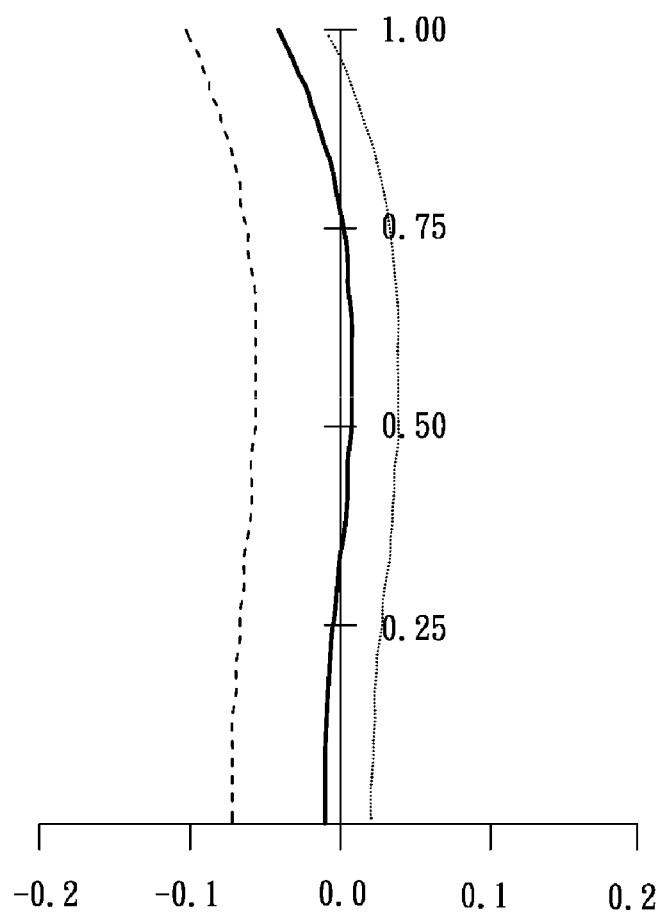
FIG. 8A depicts a longitudinal spherical aberration of the lens assembly in accordance with the fourth embodiment of the invention.
Figure 8B:
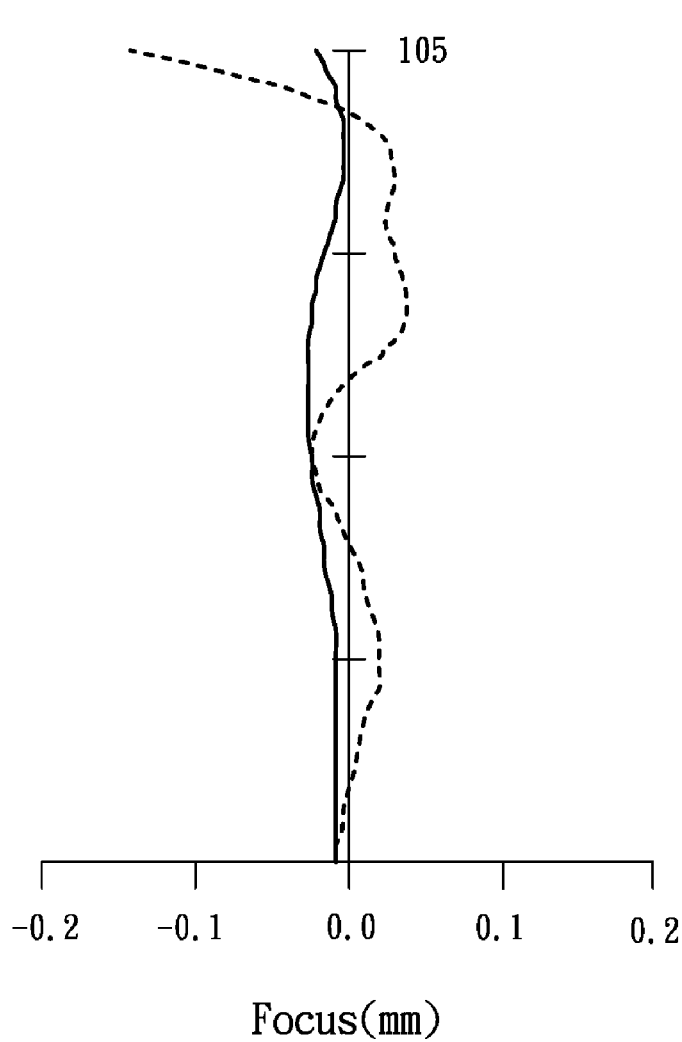
FIG. 8B is an astigmatic field curves diagram of the lens assembly in accordance with the fourth embodiment of the invention.
Figure 8C:
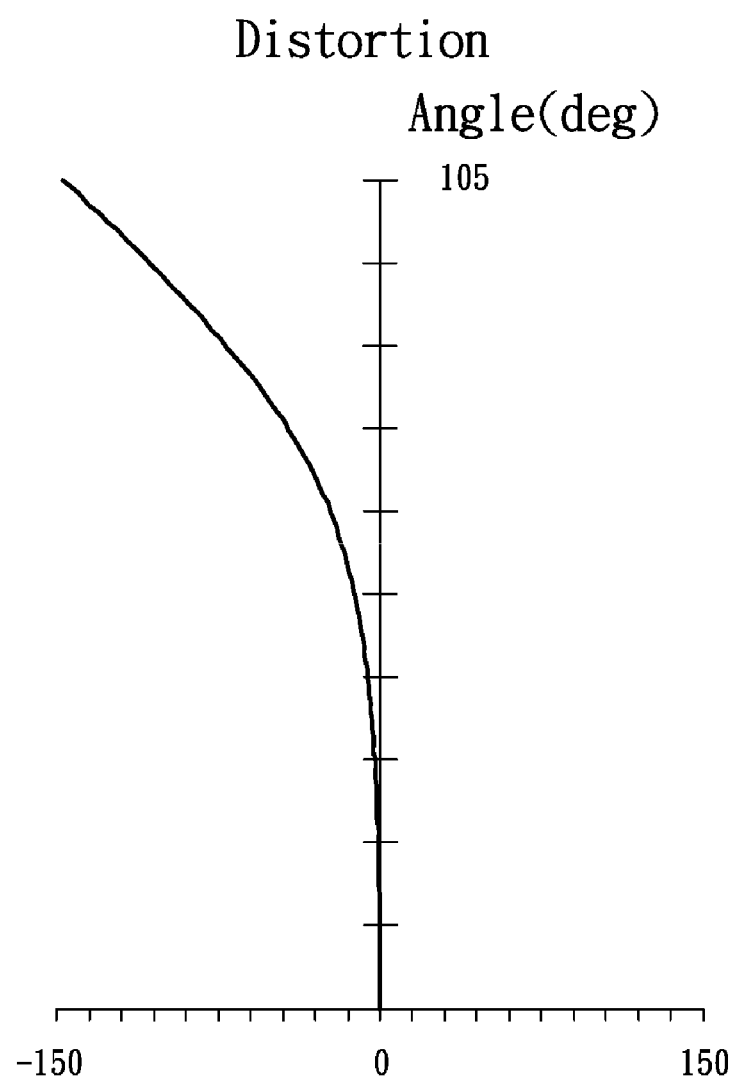
FIG. 8C is a distortion diagram of the lens assembly in accordance with the fourth embodiment of the invention.

By the above arrangements of the lenses and stop ST4, the lens assembly 4 of the fourth embodiment can meet the requirements of optical performance as seen in FIGS. 8A-8C, wherein FIG. 8A shows a longitudinal spherical aberration diagram of the lens assembly 4 in accordance with the fourth embodiment of the invention, FIG. 8B shows an astigmatic field curves of the lens assembly 4 in accordance with the fourth embodiment of the invention and FIG. 8C shows a distortion diagram of the lens assembly 4 in accordance with the fourth embodiment of the invention.

It can be seen from FIG. 8A that the longitudinal spherical aberration in the lens assembly 4 of the fourth embodiment ranges between −0.10 mm and 0.05 mm for the wavelength of 436.0000 nm, 546.0000 nm and 656.0000 nm. It can be seen from FIG. 8B that the astigmatic field curves of tangential direction and sagittal direction in the lens assembly 4 of the fourth embodiment ranges between −0.15 mm and 0.05 mm for the wavelength of 546.0000 nm. It can be seen from FIG. 8C that the distortion in the lens assembly 4 of the fourth embodiment ranges between −150% and 0% for the wavelength of 546.0000 nm. It is obvious that the longitudinal spherical aberration, the astigmatic field curves and the distortion of the lens assembly 4 of the fourth embodiment can be corrected effectively. Therefore, the lens assembly 4 of the fourth embodiment is capable of good optical performance.

Figure 9:
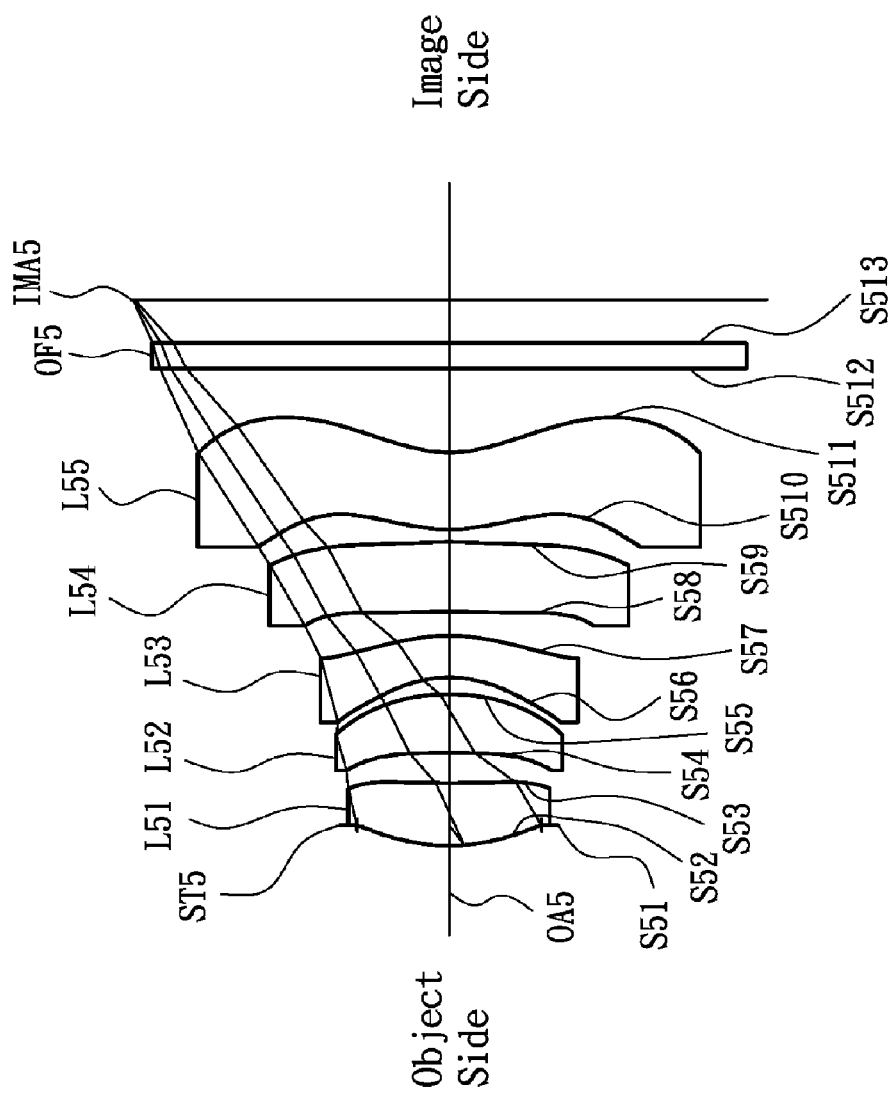
FIG. 9 is a lens layout and optical path diagram of a lens assembly in accordance with a fifth embodiment of the invention.

Referring to FIG. 9, FIG. 9 is a lens layout and optical path diagram of a lens assembly in accordance with a fifth embodiment of the invention. The lens assembly 5 includes a stop ST5, a first lens L51, a second lens L52, a third lens L53, a fourth lens L54, a fifth lens L55 and an Optical filter OF5, all of which are arranged in sequence from an object side to an image side along an optical axis OA5. In operation, an image of light rays from the object side is formed on an image plane IMA5. The first lens L51 is a meniscus lens, made of plastic material and with positive refractive power, wherein the object side surface S52 is a convex surface, the image side surface S53 is a concave surface and both of the object side surface S52 and image side surface S53 are aspheric surfaces. The second lens L52 is a concave-convex lens, made of plastic material and with positive refractive power, wherein the object side surface S54 is a concave surface, the image side surface S55 is a convex surface and both of the object side surface S54 and image side surface S55 are aspheric surfaces. The third lens L53 is a meniscus lens, made of plastic material and with negative refractive power, wherein the object side surface S56 is a concave surface, the image side surface S57 is a convex surface and both of the object side surface S56 and image side surface S57 are aspheric surfaces. The fourth lens L54 is a concave-convex lens, made of plastic material and with negative refractive power, wherein the object side surface S58 is a concave surface, the image side surface S59 is a convex surface and both of the object side surface S58 and image side surface S59 are aspheric surfaces. The fifth lens L55 is a convex-concave lens, made of plastic material and with positive refractive power, wherein the object side surface S510 is a convex surface, the image side surface S511 is a concave surface and both of the object side surface S510 and image side surface S511 are aspheric surfaces. Both of the object side surface S512 and image side surface S513 of the optical filter OF5 are plane surfaces.

In order to maintain excellent optical performance of the lens assembly in accordance with the fifth embodiment of the invention, the lens assembly 5 must satisfies the following ten conditions:

$$0 \leq f5_1/f5_2 \leq 6 \quad (41)$$

$$(Vd5_1+Vd5_2)/2 > 40 \quad (42)$$

$$Vd5_1 \geq Vd5_3 \quad (43)$$

$$Vd5_2 \geq Vd5_3 \quad (44)$$

$$Vd5_5 \geq Vd5_3 \quad (45)$$

$$(Vd5_3+Vd5_4)/2 \leq 45 \quad (46)$$

$$Vd5_1 > 40 \quad (47)$$

$$Vd5_2 > 40 \quad (48)$$

$$|Vd5_1-Vd5_2| < 25 \quad (49)$$

$$(Nd5_1+Nd5_2)/Nd5_3 \geq 1.8 \quad (50)$$

wherein $f5_1$ is an effective focal length of the first lens L51, $f5_2$ is an effective focal length of the second lens L52, $Vd5_1$ is an Abbe number of the first lens L51, $Vd5_2$ is an Abbe number of the second lens L52, $Vd5_3$ is an Abbe number of the third lens L53, $Vd5_4$ is an Abbe number of the fourth lens L54, $Vd5_5$ is an Abbe number of the fifth lens L55, $Nd5_1$ is an index of refraction of the first lens L51, $Nd5_2$ is an index of refraction of the second lens L52, and $Nd5_3$ is an index of refraction of the third lens L53.

By the above design of the lenses and stop ST5, the lens assembly 5 is provided with a shortened total lens length, an effective corrected aberration, a good optical performance and a satisfied resolution.

In order to achieve the above purposes and effectively enhance the optical performance, the lens assembly 5 in accordance with the fifth embodiment of the invention is provided with the optical specifications shown in Table 9, which include the effective focal length, F-number, field of view, radius of curvature of each lens surface, thickness between adjacent surface, refractive index of each lens and Abbe number of each lens. Table 9 shows that the effective focal length is equal to 3.2 mm, F-number is equal to 2.2 and field of view is equal to 74° for the lens assembly 5 of the fifth embodiment of the invention.

TABLE 9

| | Effective Focal Length = 3.2 mm F-number = 2.2 Field of View = 74° | | | | |
|---|---|---|---|---|---|
| Surface Number | Radius of Curvature (mm) | Thickness (mm) | Nd | Vd | Remark |
| S51 | ∞ | −0.1582 | | | Stop ST5 |
| S52 | 1.533554 | 0.481694 | 1.54 | 56.1 | The First Lens L51 |
| S53 | 8.382931 | 0.235752 | | | |
| S54 | −8.50937 | 0.446919 | 1.54 | 56.1 | The Second Lens L52 |

TABLE 9-continued

Effective Focal Length = 3.2 mm F-number = 2.2 Field of View = 74°

| Surface Number | Radius of Curvature (mm) | Thickness (mm) | Nd | Vd | Remark |
|---|---|---|---|---|---|
| S55 | −1.91292 | 0.131829 | | | |
| S56 | −0.99264 | 0.322135 | 1.63 | 23.8 | The Third Lens L53 |
| S57 | −1.50114 | 0.188623 | | | |
| S58 | −3.78133 | 0.534136 | 1.63 | 23.8 | The Fourth Lens L54 |
| S59 | −4.20063 | 0.096952 | | | |
| S510 | 1.351909 | 0.593273 | 1.54 | 56.1 | The Fifth Lens L55 |
| S511 | 0.978318 | 0.649114 | | | |
| S512 | ∞ | 0.194734 | 1.5168 | 64.1673 | Optical Filter OF5 |
| S513 | ∞ | 0.333561 | | | |

The aspheric surface sag z of each lens in table 9 can be calculated by the following formula:

$$z = c^2/\{1+[1-(k+1)c^2h^2]^{1/2}\} + Ah^4 + Bh^6 + Ch^8 + Dh^{10} + Eh^{12} + Fh^{14} + Gh^{16} + Hh^{18} + Ih^{20}$$

where c is curvature, h is the vertical distance from the lens surface to the optical axis, k is conic constant and A, B, C, D, E, F, G, H and I are aspheric coefficients.

In the fifth embodiment, the conic constant k and the aspheric coefficients A, B, C, D, E, F, G, H, I of each surface are shown in Table 10.

TABLE 10

| Surface Number | k<br>E | A<br>F | B<br>G | C<br>H | D<br>I |
|---|---|---|---|---|---|
| S52 | 0 | −0.03363086 | 0.086911439 | −0.55270889 | 0.90803715 |
| | −0.69049607 | −0.1833514 | 0 | 0 | 0 |
| S53 | 0 | −0.13807661 | 0.33243185 | −2.3136808 | 5.3192588 |
| | −6.2174964 | 2.7665149 | 0 | 0 | 0 |
| S54 | 0 | −0.2433622 | 0.35741918 | −2.0516867 | 3.5384079 |
| | −1.7754431 | −0.31497973 | 0 | 0 | 0 |
| S55 | 0.397536 | −0.26594412 | 0.074937386 | 0.22747566 | 0.16857916 |
| | −0.48145373 | 0.000320435 | 0 | 0 | 0 |
| S56 | 0 | −0.016838548 | 0.59958934 | −0.16930693 | 0.11603325 |
| | −0.72762307 | 0.50450813 | 0 | 0 | 0 |
| S57 | 0 | 0.33344152 | −0.55612728 | 1.0489677 | −1.0205021 |
| | 0.42233982 | −0.019830442 | 0 | 0 | 0 |
| S58 | 0 | 0.65316129 | −1.5574419 | 2.0517163 | −1.6573545 |
| | 0.72674245 | −0.1361003 | 0 | 0 | 0 |
| S59 | −21.2833 | 0.31441544 | −0.59616229 | 0.54729892 | −0.29817862 |
| | 0.088158733 | −0.010715779 | 0 | 0 | 0 |
| S510 | −3.06261 | −0.25078097 | 0.052774414 | −0.000612682 | −0.007352881 |
| | 0.004943621 | −8.96E−04 | 0 | 0 | 0 |
| S511 | −4.08542 | −0.12424424 | 0.045944483 | −0.013365602 | 0.001916844 |
| | −6.06E−05 | −1.17E−05 | 0 | 0 | 0 |

For the lens assembly 5 of the fifth embodiment, the effective focal length $f5_1$ of the first lens L51 is equal to 3.35114 mm, the effective focal length $f5_2$ of the second lens L52 is equal to 4.40979 mm, the Abbe number $Vd5_1$ of the first lens L51 is equal to 56.1, the Abbe number $Vd5_2$ of the second lens L52 is equal to 56.1, the Abbe number $Vd5_3$ of the third lens L53 is equal to 23.8, the Abbe number $Vd5_4$ of the fourth lens L54 is equal to 23.8, the Abbe number $Vd5_5$ of the fifth lens L55 is equal to 56.1, the index of refraction $Nd5_1$ of the first lens L51 is equal to 1.54, the index of refraction $Nd5_2$ of the second lens L52 is equal to 1.54, and the index of refraction $Nd5_3$ of the third lens L53 is equal to 1.63. According to the above data, the following values can be obtained:

$f5_1/f5_2 = 0.76$, $(Vd5_1 + Vd5_2)/2 = 56.1$, $(Vd5_3 + Vd5_4)/2 = 23.8$, $|Vd5_1 - Vd5_2| = 0$, $(Nd5_1 + Nd5_2)/Nd5_3 = 1.89$ which respectively satisfy the above conditions (41)-(50).

Figure 10A:
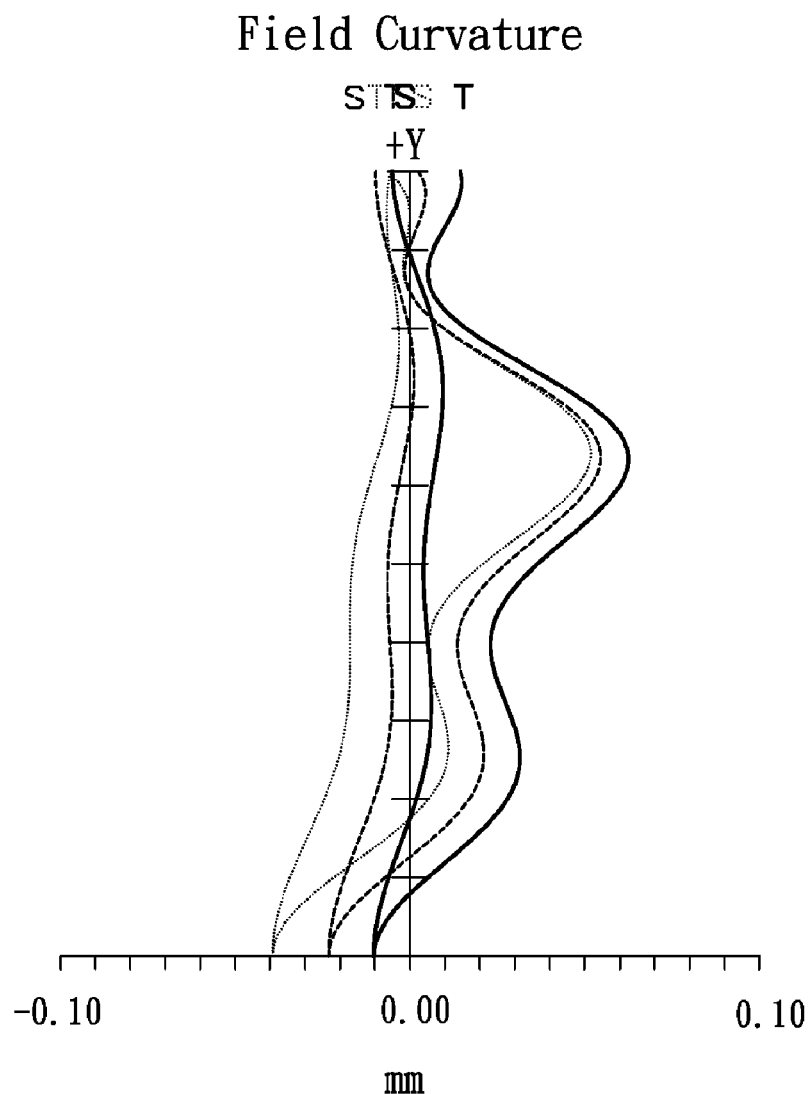
FIG. 10A depicts a field curvature diagram of the lens assembly in accordance with the fifth embodiment of the invention.
Figure 10B:
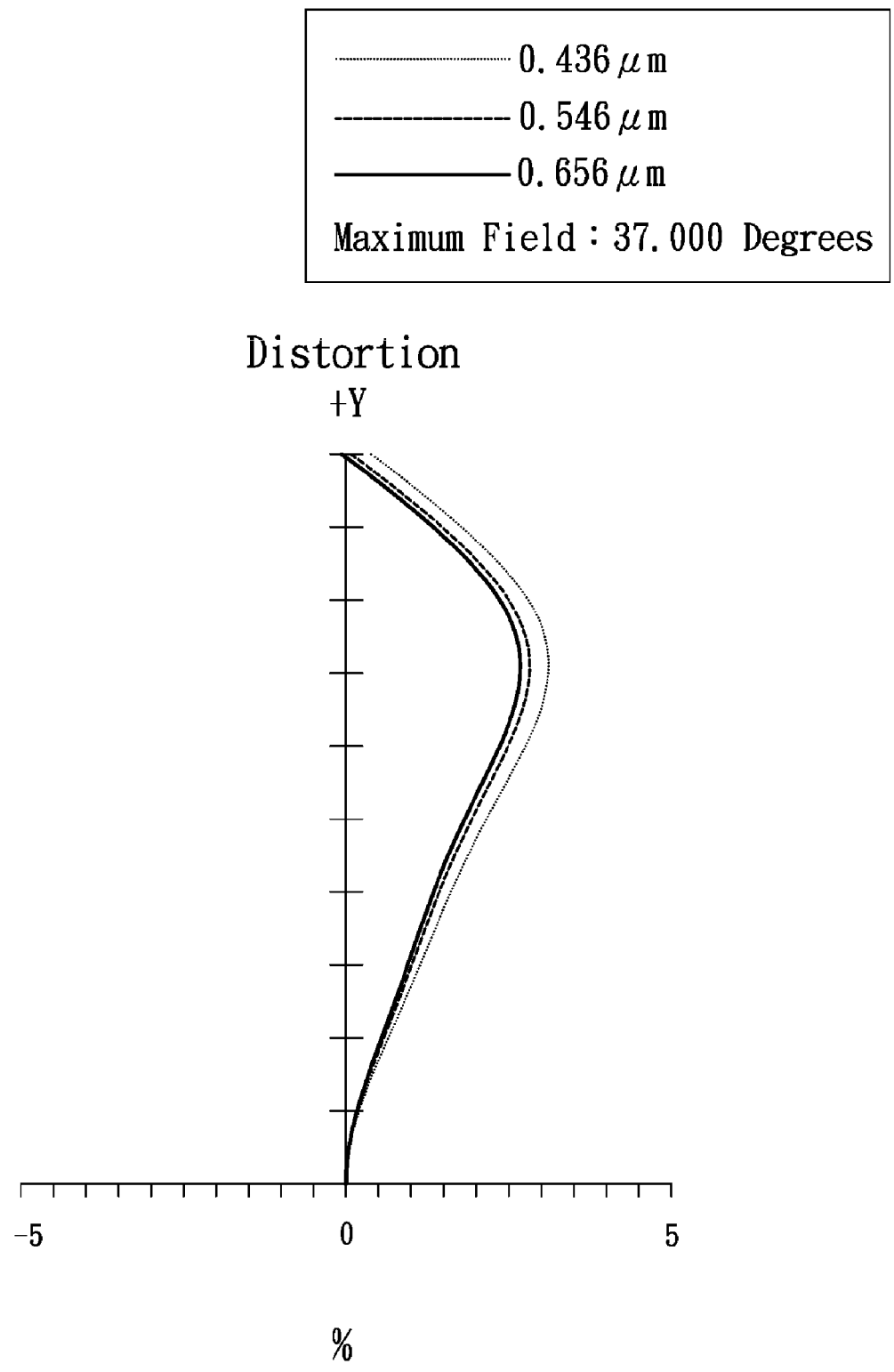
FIG. 10B is a distortion diagram of the lens assembly in accordance with the fifth embodiment of the invention.
Figure 10C:
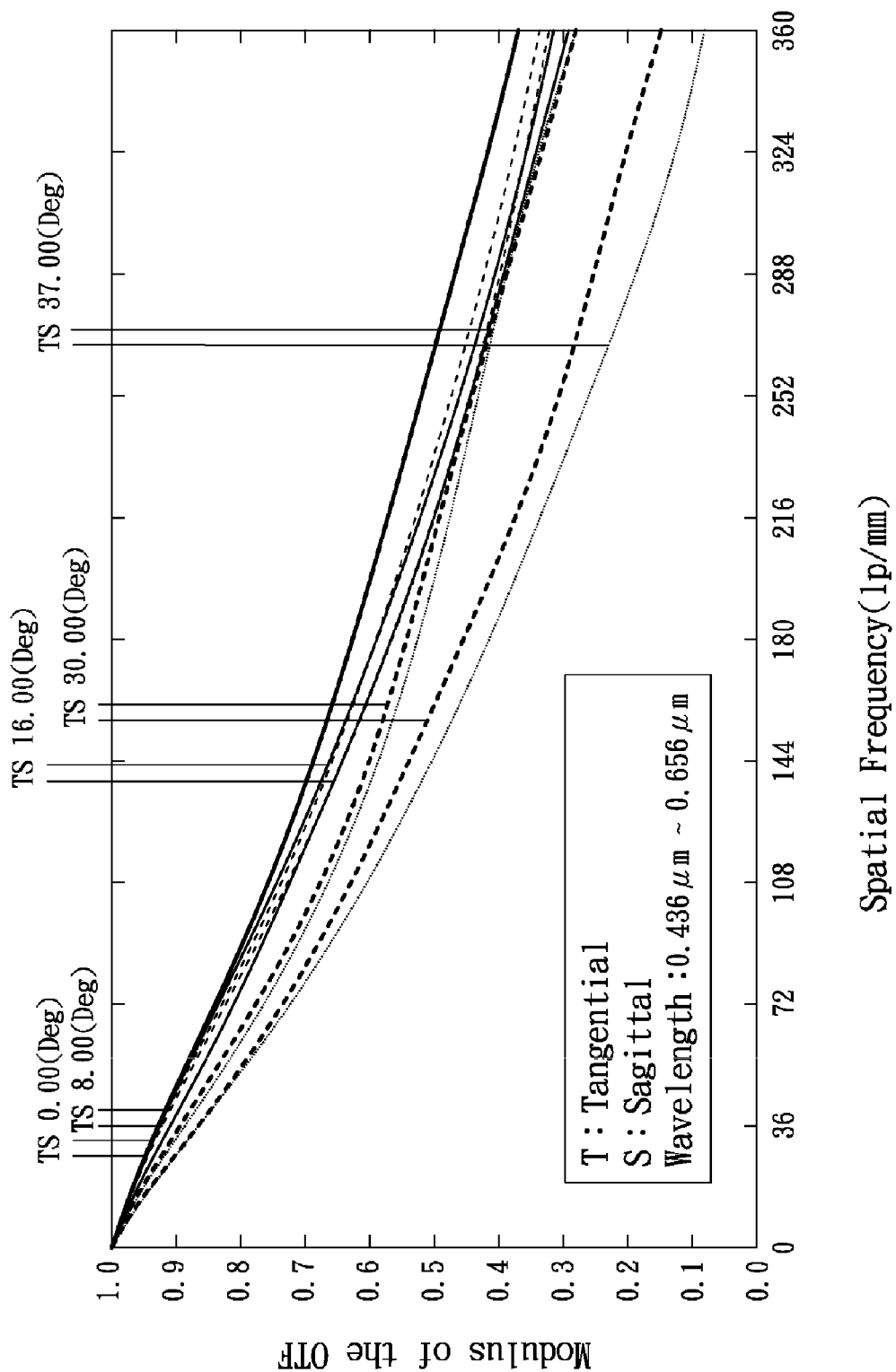
FIG. 10C is a modulation transfer function diagram of the lens assembly in accordance with the fifth embodiment of the invention.

By the above arrangements of the lenses and stop ST5, the lens assembly 5 of the fifth embodiment can meet the requirements of optical performance as seen in FIGS. 10A-10C, wherein FIG. 10A shows a field curvature diagram of the lens assembly 5 in accordance with the fifth embodiment of the invention, FIG. 10B shows a distortion diagram of the lens assembly 5 in accordance with the fifth embodiment of the invention and FIG. 10C shows a modulation transfer function diagram of the lens assembly 5 in accordance with the fifth embodiment of the invention.

It can be seen from FIG. 10A that the field curvature of tangential direction and sagittal direction in the lens assembly 5 of the fifth embodiment ranges between −0.04 mm and 0.07 mm for the wavelength of 0.436 μm, 0.546 μm and 0.656 μm. It can be seen from FIG. 10B that the distortion in the lens assembly 5 of the fifth embodiment ranges between 0.0% and 3.2% for the wavelength of 0.436 μm, 0.546 μm and 0.656 μm. It can be seen from FIG. 10C that the modulation transfer function of tangential direction and sagittal direction in the lens assembly 5 of the fifth embodiment ranges between 0.08 and 1.0 wherein the wavelength ranges between 0.436 μm and 0.656 μm, each field is 0.00 degree, 8.00 degrees, 16.00 degrees, 30.00 degrees and 37.00 degrees, spatial frequency ranges between 0 lp/mm and 360 lp/mm. It is obvious that the field curvature and the distortion of the lens assembly 5 of the fifth embodiment can be corrected effectively, and the resolution of the lens assembly 5 of the fifth embodiment can meet the requirement. Therefore, the lens assembly 5 of the fifth embodiment is capable of good optical performance.

Figure 11:
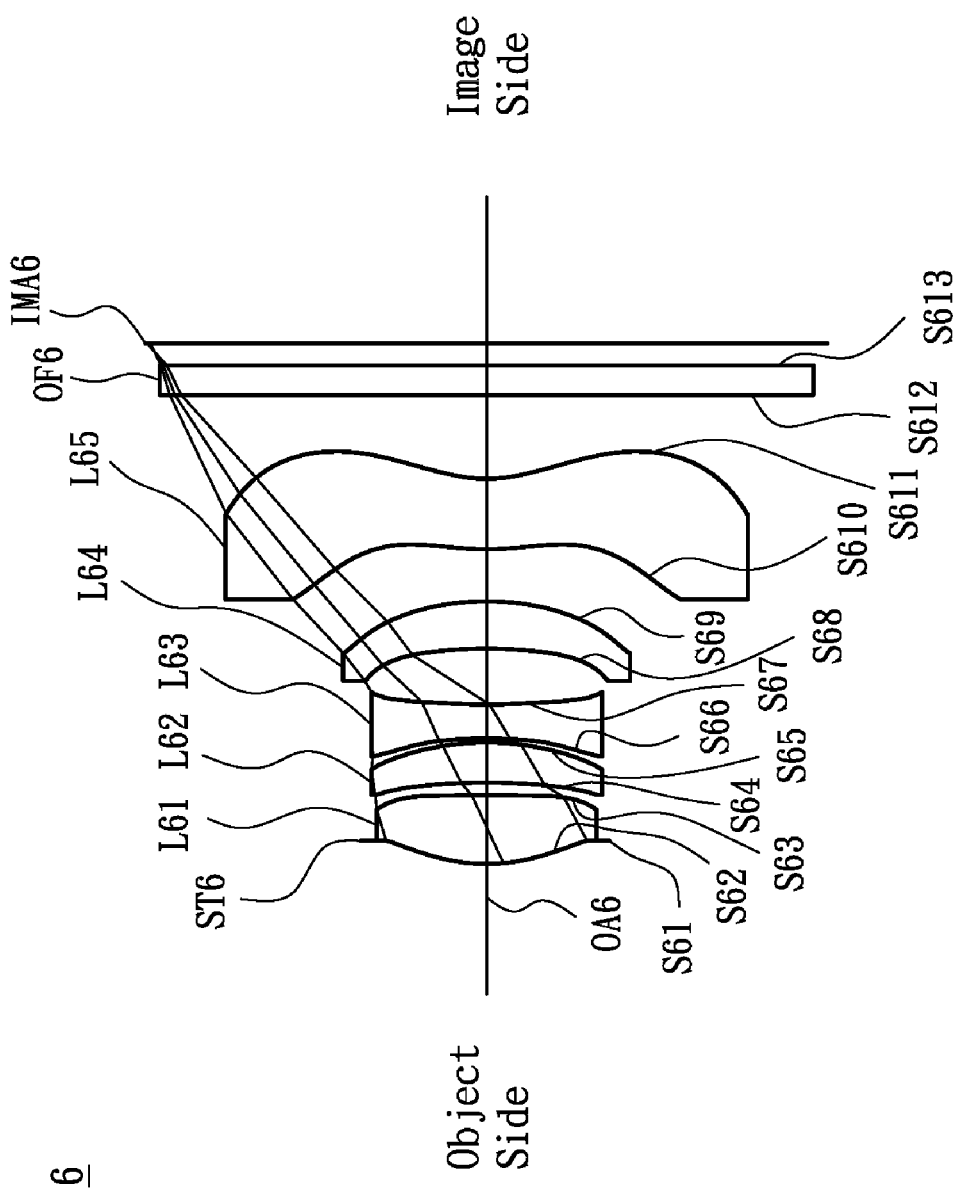
FIG. 11 is a lens layout and optical path diagram of a lens assembly in accordance with a sixth embodiment of the invention.

Referring to FIG. 11, FIG. 11 is a lens layout and optical path diagram of a lens assembly in accordance with a sixth embodiment of the invention. The lens assembly 6 includes a stop ST6, a first lens L61, a second lens L62, a third lens L63, a fourth lens L64, a fifth lens L65 and an Optical filter OF6, all of which are arranged in sequence from an object side to an image side along an optical axis OA6. In operation, an image of light rays from the object side is formed on an image plane IMA6. The first lens L61 is a biconvex lens, made of plastic material and with positive refractive power, wherein the object side surface S62 is a convex surface, the image side surface S63 is a convex surface and both of the object side surface S62 and image side surface S63 are aspheric surfaces. The second lens L62 is a concave-convex lens, made of plastic material and with positive refractive power, wherein the object side surface S64 is a concave surface, the image side surface S65 is a convex surface and both of the object side surface S64 and image side surface S65 are aspheric surfaces. The third lens L63 is a biconcave lens, made of plastic material and with negative refractive power, wherein both of the object side surface S66 and image side surface S67 are aspheric surfaces. The fourth lens L64 is a concave-convex lens, made of plastic material and with negative refractive power, wherein the object side surface S68 is a concave surface, the image side surface S69 is a convex surface and both of the object side surface S68 and image side surface S69 are aspheric surfaces. The fifth lens L65 is a convex-concave lens, made of plastic material and with positive refractive power, wherein the object side surface S610 is a convex surface, the image side surface S611 is a concave surface and both of the object side surface S610 and image side surface S611 are aspheric surfaces. Both of the object side surface S612 and image side surface S613 of the optical filter OF6 are plane surfaces.

In order to maintain excellent optical performance of the lens assembly in accordance with the sixth embodiment of the invention, the lens assembly 6 must satisfies the following ten conditions:

$$0 \leq f6_1/f6_2 \leq 6 \quad (51)$$

$$(Vd6_1+Vd6_2)/2 > 40 \quad (52)$$

$$Vd6_1 \geq Vd6_3 \quad (53)$$

$$Vd6_2 \geq Vd6_3 \quad (54)$$

$$Vd6_5 \geq Vd6_3 \quad (55)$$

$$(Vd6_3-Vd6_4)/2 \leq 45 \quad (56)$$

$$Vd6_1 > 40 \quad (57)$$

$$Vd6_2 > 40 \quad (58)$$

$$|Vd6_1-Vd6_2| < 25 \quad (59)$$

$$(Nd6_1+Nd6_2)/Nd6_3 \geq 1.8 \quad (60)$$

wherein $f6_1$ is an effective focal length of the first lens L61, $f6_2$ is an effective focal length of the second lens L62, $Vd6_1$ is an Abbe number of the first lens L61, $Vd6_2$ is an Abbe number of the second lens L62, $Vd6_3$ is an Abbe number of the third lens L63, $Vd6_4$ is an Abbe number of the fourth lens L64, $Vd6_5$ is an Abbe number of the fifth lens L65, $Nd6_1$ is an index of refraction of the first lens L61, $Nd6_2$ is an index of refraction of the second lens L62, and $Nd6_3$ is an index of refraction of the third lens L63.

By the above design of the lenses and stop ST6, the lens assembly 6 is provided with a shortened total lens length, an effective corrected aberration, a good optical performance and a satisfied resolution.

In order to achieve the above purposes and effectively enhance the optical performance, the lens assembly 6 in accordance with the sixth embodiment of the invention is provided with the optical specifications shown in Table 11 which include the effective focal length, F-number, field of view, radius of curvature of each lens surface, thickness between adjacent surface, refractive index of each lens and Abbe number of each lens. Table 11 shows that the effective focal length is equal to 3.2 mm, F-number is equal to 2.2 and field of view is equal to 74° for the lens assembly 6 of the sixth embodiment of the invention.

TABLE 11

| Effective Focal Length = 3.2 mm F-number = 2.2 Field of View = 74° | | | | | |
|---|---|---|---|---|---|
| Surface Number | Radius of Curvature (mm) | Thickness (mm) | Nd | Vd | Remark |
| S61 | ∞ | −0.16446 | | | Stop ST6 |
| S62 | 1.390516 | 0.487849 | 1.54 | 56.1 | The First Lens L61 |
| S63 | −79.4447 | 0.09181 | | | |
| S64 | −3.56598 | 0.285897 | 1.54 | 56.1 | The Second Lens L62 |
| S65 | −1.76902 | 0.028314 | | | |
| S66 | −4.35538 | 0.241094 | 1.63 | 23.8 | The Third Lens L63 |
| S67 | 3.72665 | 0.400479 | | | |
| S68 | −3.05363 | 0.337606 | 1.63 | 23.8 | The Fourth Lens L64 |
| S69 | −1.8989 | 0.371502 | | | |
| S610 | 1.964954 | 0.501398 | 1.54 | 56.1 | The Fifth Lens L65 |
| S611 | 1.0207 | 0.6 | | | |
| S612 | ∞ | 0.21 | 1.5168 | 64.1673 | Optical Filter OF6 |
| S613 | ∞ | 0.155754 | | | |

The aspheric surface sag z of each lens in table 11 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16} + Hh^{18} + Ih^{20}$$

where c is curvature, h is the vertical distance from the lens surface to the optical axis, k is conic constant and A, B, C, D, E, F, G, H and I are aspheric coefficients.

In the sixth embodiment, the conic constant k and the aspheric coefficients A, B, C, D, E, F, G, H, I of each surface are shown in Table 12.

TABLE 12

| Surface Number | k / E | A / F | B / G | C / H | D / I |
|---|---|---|---|---|---|
| S62 | 0.4049 | 0.002458196 | −0.49097435 | 1.0882743 | −1.4599659 |
|  | 0.0100759 | 0.045077316 | 9.81274E−05 | 9.81274E−05 | 9.81274E−05 |
| S63 | 0 | −0.050661444 | −0.20535471 | −0.3600415 | 0.24395555 |
|  | −0.11939759 | 0.15361728 | 0.008923164 | 0.008923164 | 0.008923164 |
| S64 | 0 | 0.15785533 | −0.099311298 | −0.7773676 | 0.96061401 |
|  | −0.28178689 | 0.1816735 | 0.003342302 | 0.003342302 | 0.003342302 |
| S65 | 0 | 0.2619886 | −0.93913037 | 1.5562111 | −0.92320406 |
|  | −0.20262701 | 0.068115243 | 0.021060733 | 0.021060733 | 0.021060733 |
| S66 | 0 | −0.26926799 | −0.27667516 | 1.2953225 | −0.65818065 |
|  | −0.1727744 | −0.057073033 | −0.040197057 | −0.040197057 | −0.040197057 |
| S67 | −56.8775 | −0.14438333 | 0.2319362 | 0.024684961 | 0.038055054 |
|  | 0.077600054 | 0.018139396 | 0.037562476 | 0.037562476 | 0.037562476 |
| S68 | −119.354 | −0.25603517 | 0.25666889 | −0.36986914 | −0.26407268 |
|  | 0.36180161 | −0.1582521 | −0.006007055 | −0.006007055 | −0.006007055 |
| S69 | −6.31637 | −0.11908488 | −0.09752362 | 0.22578591 | −0.18486801 |
|  | −0.17138155 | 0.18878522 | 0.006519527 | 0.006519527 | 0.006519527 |
| S610 | −11.0917 | −0.39584801 | 0.15194291 | −0.015019489 | −0.012039023 |
|  | 0.002081402 | 3.94E−03 | −0.00120233 | −0.00120233 | −0.00120233 |
| S611 | −4.10896 | −0.22060526 | 0.12808761 | −0.047679445 | 0.00429923 |
|  | 3.01E−03 | −1.05E−03 | 0.000101456 | 0.000101456 | 0.000101456 |

For the lens assembly 6 of the sixth embodiment, the effective focal length $f6_1$ of the first lens L61 is equal to 2.50598 mm, the effective focal length $f6_2$ of the second lens L62 is equal to 6.08175 mm, the Abbe number $Vd6_1$ of the first lens L61 is equal to 56.1, the Abbe number $Vd6_2$ of the second lens L62 is equal to 56.1, the Abbe number $Vd6_3$ of the third lens L63 is equal to 23.8, the Abbe number $Vd6_4$ of the fourth lens L64 is equal to 23.8, the Abbe number $Vd6_5$ of the fifth lens L65 is equal to 56.1, the index of refraction $Nd6_1$ of the first lens L61 is equal to 1.54, the index of refraction $Nd6_2$ of the second lens L62 is equal to 1.54, and the index of refraction $Nd6_3$ of the third lens L63 is equal to 1.63. According to the above data, the following values can be obtained:

$f6_1/f6_2 = 0.412$, $(Vd6_1 + Vd6_2)/2 = 56.1$, $(Vd6_3 + Vd6_4)/2 = 23.8$, $|Vd6_1 - Vd6_2| = 0$, $(Nd6_1 + Nd6_2)/Nd6_3 = 1.89$ which respectively satisfy the above conditions (51)-(60).

Figure 12A:
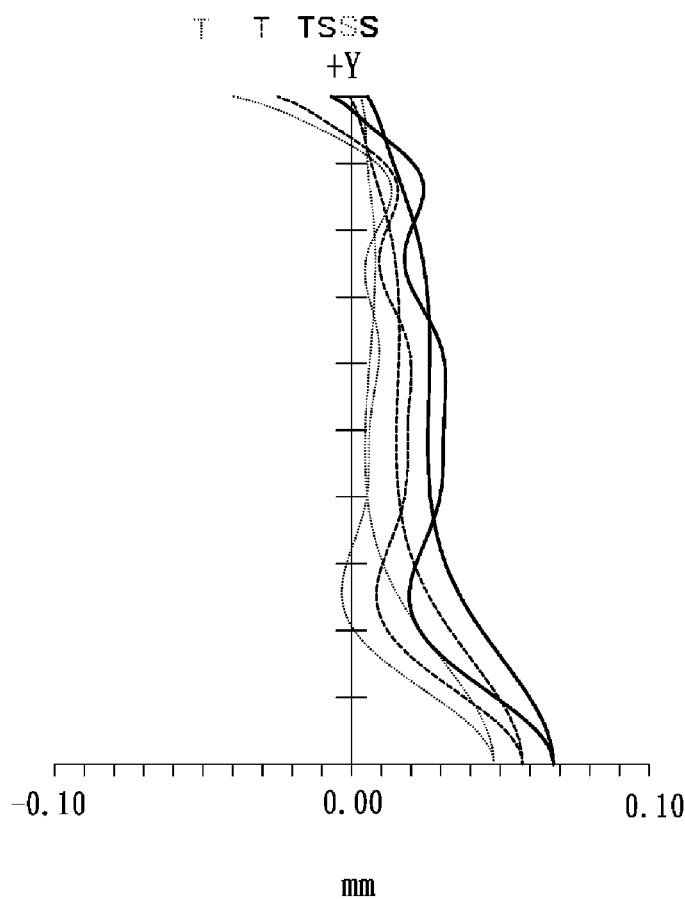
FIG. 12A depicts a field curvature diagram of the lens assembly in accordance with the sixth embodiment of the invention.
Figure 12B:
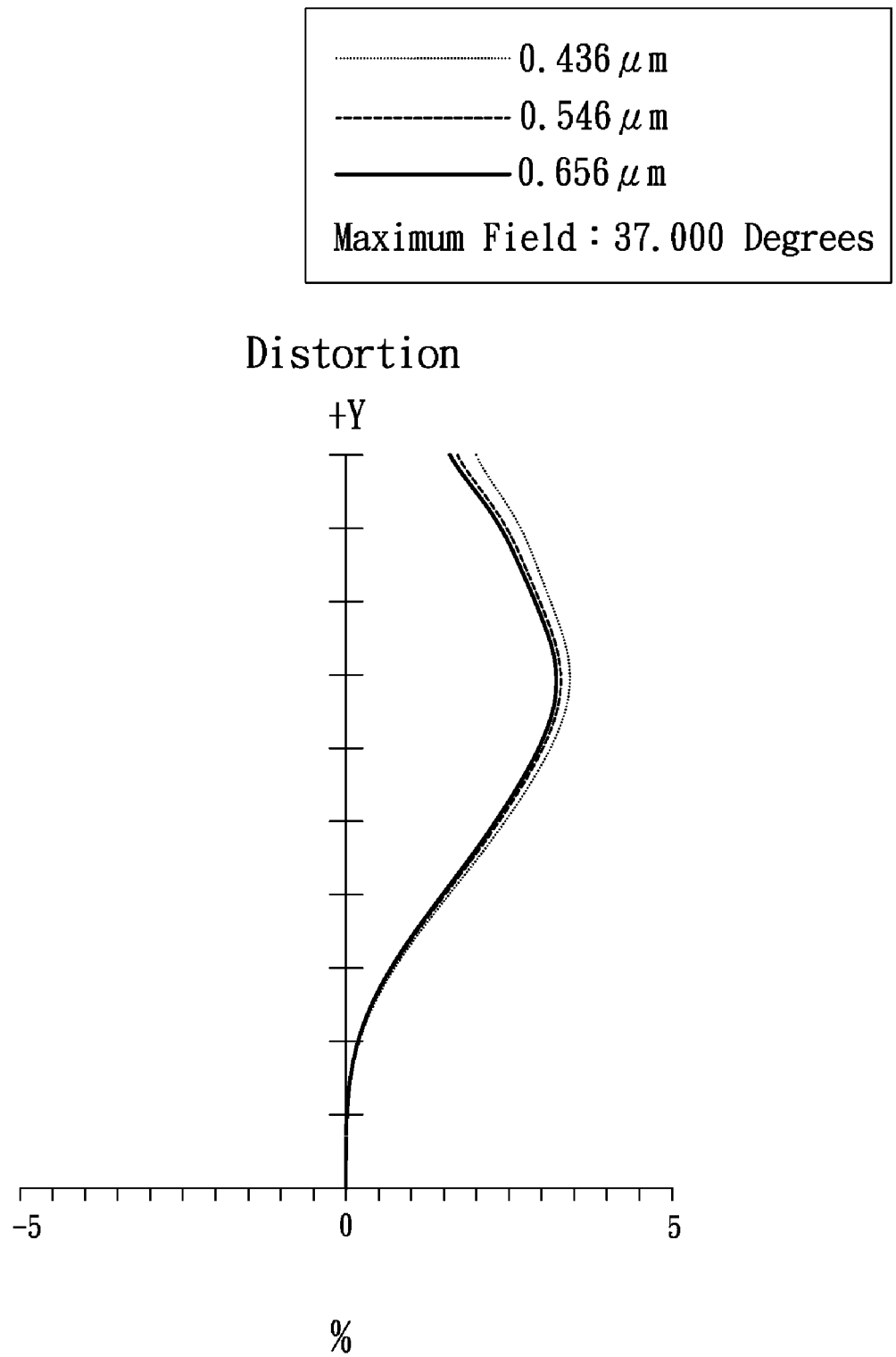
FIG. 12B is a distortion diagram of the lens assembly in accordance with the sixth embodiment of the invention.
Figure 12C:
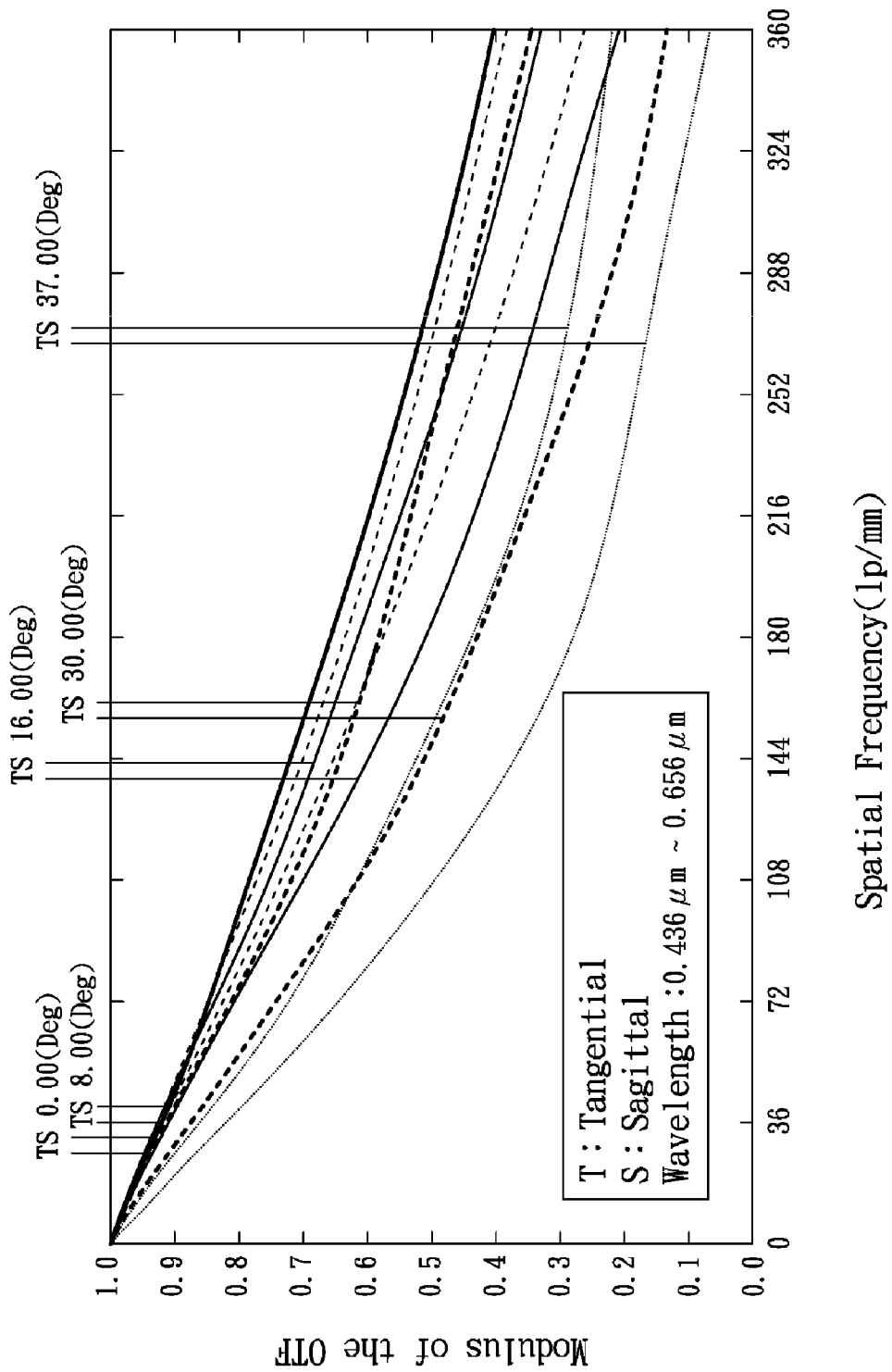
FIG. 12C is a modulation transfer function diagram of the lens assembly in accordance with the sixth embodiment of the invention.

By the above arrangements of the lenses and stop ST6, the lens assembly 6 of the sixth embodiment can meet the requirements of optical performance as seen in FIGS. 12A-12C, wherein FIG. 12A shows a field curvature diagram of the lens assembly 6 in accordance with the sixth embodiment of the invention, FIG. 12B shows a distortion diagram of the lens assembly 6 in accordance with the sixth embodiment of the invention and FIG. 12C shows a modulation transfer function diagram of the lens assembly 6 in accordance with the sixth embodiment of the invention.

It can be seen from FIG. 12A that the field curvature of tangential direction and sagittal direction in the lens assembly 6 of the sixth embodiment ranges between −0.04 mm and 0.07 mm for the wavelength of 0.436 μm, 0.546 μm and 0.656 μm. It can be seen from FIG. 12B that the distortion in the lens assembly 6 of the sixth embodiment ranges between 0.0% and 3.5% for the wavelength of 0.436 μm, 0.546 μm and 0.656 μm. It can be seen from FIG. 12C that the modulation transfer function of tangential direction and sagittal direction in the lens assembly 6 of the sixth embodiment ranges between 0.06 and 1.0 wherein the wavelength ranges between 0.436 μm and 0.656 μm, each field is 0.00 degree, 8.00 degrees, 16.00 degrees, 30.00 degrees and 37.00 degrees, spatial frequency ranges between 0 lp/mm and 360 lp/mm. It is obvious that the field curvature and the distortion of the lens assembly 6 of the sixth embodiment can be corrected effectively, and the resolution of the lens assembly 6 of the sixth embodiment can meet the requirement. Therefore, the lens assembly 6 of the sixth embodiment is capable of good optical performance.

Figure 13:
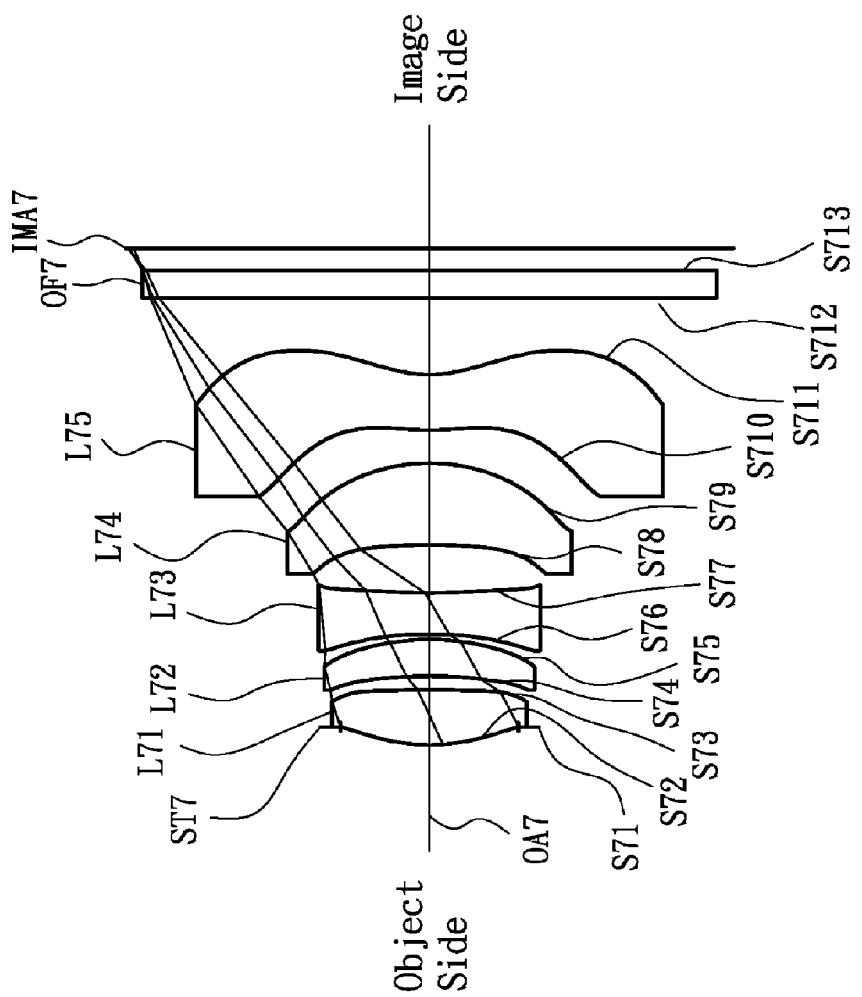
FIG. 13 is a lens layout and optical path diagram of a lens assembly in accordance with a seventh embodiment of the invention.

Referring to FIG. 13, FIG. 13 is a lens layout and optical path diagram of a lens assembly in accordance with a seventh embodiment of the invention. The lens assembly 7 includes a stop ST7, a first lens L71, a second lens L72, a third lens L73, a fourth lens L74, a fifth lens L75 and an Optical filter OF7, all of which are arranged in sequence from an object side to an image side along an optical axis OA7. In operation, an image of light rays from the object side is formed on an image plane IMA7. The first lens L71 is a biconvex lens, made of plastic material and with positive refractive power, wherein both of the object side surface S72 and image side surface S73 are aspheric surfaces. The second lens L72 is a concave-convex lens, made of plastic material and with positive refractive power, wherein the object side surface S74 is a concave surface, the image side surface S75 is a convex surface and both of the object side surface S74 and image side surface S75 are aspheric surfaces. The third lens L73 is a biconcave lens, made of plastic material and with negative refractive power, wherein both of the object side surface S76 and image side surface S77 are aspheric surfaces. The fourth lens L74 is a concave-convex lens, made of plastic material and with positive refractive power, wherein the object side surface S78 is a concave surface, the image side surface S79 is a convex surface and both of the object side surface S78 and image side surface S79 are aspheric surfaces. The fifth lens L75 is a convex-concave lens, made of plastic material and with positive refractive power, wherein the object side surface S710 is a convex surface, the image side surface S711 is a concave surface and both of the object side surface S710 and image side surface S711 are aspheric surfaces. Both of the object side surface S712 and image side surface S713 of the optical filter OF7 are plane surfaces.

In order to maintain excellent optical performance of the lens assembly in accordance with the seventh embodiment of the invention, the lens assembly 7 must satisfies the following ten conditions:

$$0 \le f7_1/f7_2 \le 6 \quad (61)$$

$$(Vd7_1+Vd7_2)/2 > 40 \quad (62)$$

$$Vd7_1 \ge Vd7_3 \quad (63)$$

$$Vd7_2 \ge Vd7_3 \quad (64)$$

$$Vd7_5 \ge Vd7_3 \quad (65)$$

$$(Vd7_3+Vd7_4)/2 \le 45 \quad (66)$$

$$Vd7_1 > 40 \quad (67)$$

$$Vd7_2 > 40 \quad (68)$$

$$|Vd7_1 - Vd7_2| < 25 \quad (69)$$

$$(Nd7_1+Nd7_2)/Nd7_3 \ge 1.8 \quad (70)$$

wherein $f7_1$ is an effective focal length of the first lens L71, $f7_2$ is an effective focal length of the second lens L72, $Vd7_1$ is an Abbe number of the first lens L71, $Vd7_2$ is an Abbe number of the second lens L72, $Vd7_3$ is an Abbe number of the third lens L73, $Vd7_4$ is an Abbe number of the fourth lens L74, $Vd7_5$ is an Abbe number of the fifth lens L75, $Nd7_1$ is an index of refraction of the first lens L71, $Nd7_2$ is an index of refraction of the second lens L72, and $Nd7_3$ is an index of refraction of the third lens L73.

By the above design of the lenses and stop ST7, the lens assembly 7 is provided with a shortened total lens length, an effective corrected aberration, a good optical performance and a satisfied resolution.

In order to achieve the above purposes and effectively enhance the optical performance, the lens assembly 7 in accordance with the seventh embodiment of the invention is provided with the optical specifications shown in Table 13 which include the effective focal length, F-number, field of view, radius of curvature of each lens surface, thickness between adjacent surface, refractive index of each lens and Abbe number of each lens. Table 13 shows that the effective focal length is equal to 3.15 mm, F-number is equal to 2.2 and field of view is equal to 74° for the lens assembly 7 of the seventh embodiment of the invention.

TABLE 13

Effective Focal Length = 3.15 mm F-number = 2.2 Field of View = 74°

| Surface Number | Radius of Curvature (mm) | Thickness (mm) | Nd | Vd | Remark |
|---|---|---|---|---|---|
| S71 | ∞ | −0.13815 | | | Stop ST7 |
| S72 | 1.513243 | 0.426825 | 1.54 | 56.1 | The First Lens L71 |
| S73 | −23.7116 | 0.108129 | | | |
| S74 | −3.02764 | 0.285897 | 1.54 | 56.1 | The Second Lens L72 |
| S75 | −1.68068 | 0.037329 | | | |
| S76 | −4.66339 | 0.324157 | 1.63 | 23.8 | The Third Lens L73 |
| S77 | 3.971605 | 0.373093 | | | |
| S78 | −5.41946 | 0.637873 | 1.54 | 56.1 | The Fourth Lens L74 |
| S79 | −1.43648 | 0.258136 | | | |
| S710 | 2.576681 | 0.429535 | 1.54 | 56.1 | The Fifth Lens L75 |
| S711 | 0.896297 | 0.6 | | | |
| S712 | ∞ | 0.21 | 1.5168 | 64.1673 | Optical Filter OF7 |
| S713 | ∞ | 0.17594 | | | |

The aspheric surface sag z of each lens in table 13 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16} + Hh^{18} + Ih^{20}$$

where c is curvature, h is the vertical distance from the lens surface to the optical axis, k is conic constant and A, B, C, D, E, F, G, H and I are aspheric coefficients.

In the seventh embodiment, the conic constant k and the aspheric coefficients A, B, C, D, E, F, G, H, I of each surface are shown in Table 14.

TABLE 14

| Surface Number | k | A | B | C | D |
|---|---|---|---|---|---|
| | E | F | G | H | I |
| S72 | 0.365364 | −0.00125219 | −0.46630127 | 1.0594429 | −1.5286365 |
| | −0.005938898 | 0.26426433 | −0.3149198 | −0.3149198 | −0.3149198 |
| S73 | 0 | −0.04254775 | −0.16745608 | −0.34953848 | 0.15546849 |
| | −0.29316261 | 0.032412884 | 0.24418751 | 0.24418751 | 0.24418751 |
| S74 | 0 | 0.15872262 | −0.098236268 | −0.79795507 | 0.92169016 |
| | −0.33901987 | 0.089703083 | −0.21265375 | −0.21265375 | −0.21265375 |
| S75 | 0 | 0.26143775 | −0.91739689 | 1.5684245 | −0.98223127 |
| | −0.29285477 | −0.039813512 | 0.029058105 | 0.029058105 | 0.029058105 |
| S76 | 0 | −0.2396959 | −0.26301591 | 1.2527195 | −0.7423217 |
| | −0.22073812 | −0.068770433 | 0.027545717 | 0.027545717 | 0.027545717 |
| S77 | −63.6237 | −0.17301371 | 0.17609377 | 0.01702111 | 0.036356138 |
| | 0.07554325 | 0.045386365 | −0.10615025 | −0.10615025 | −0.10615025 |
| S78 | −382.412 | −0.24061744 | 0.19542388 | −0.37566712 | −0.22106451 |
| | 0.39426579 | −0.14592485 | 0.16673999 | 0.16673999 | 0.16673999 |
| S79 | −3.40126 | −0.12932846 | −0.093695518 | 0.21114414 | −0.16457686 |
| | −0.14347242 | 0.18617989 | −0.027382104 | −0.027382104 | −0.027382104 |
| S710 | −32.6539 | −0.48686415 | 0.18971259 | −0.011038051 | −0.018776515 |
| | 0.000286581 | 3.97E−03 | −3.39303E−05 | −3.39303E−05 | −3.39303E−05 |

TABLE 14-continued

| Surface Number | k<br>E | A<br>F | B<br>G | C<br>H | D<br>I |
|---|---|---|---|---|---|
| S711 | −4.60418<br>2.88E−03 | −0.23205683<br>−1.04E−03 | 0.12888925<br>0.00010882 | −0.045346238<br>0.00010882 | 0.003753063<br>0.00010882 |

For the lens assembly 7 of the seventh embodiment, the effective focal length $f7_1$ of the first lens L71 is equal to 2.1852 mm, the effective focal length $f7_2$ of the second lens L72 is equal to 6.43034 mm, the Abbe number $Vd7_1$ of the first lens L71 is equal to 56.1, the Abbe number $Vd7_2$ of the second lens L72 is equal to 56.1, the Abbe number $Vd7_3$ of the third lens L73 is equal to 23.8, the Abbe number $Vd7_4$ of the fourth lens L74 is equal to 56.1, the Abbe number $Vd7_5$ of the fifth lens L75 is equal to 56.1, the index of refraction $Nd7_1$ of the first lens L71 is equal to 1.54, the index of refraction $Nd7_2$ of the second lens L72 is equal to 1.54, and the index of refraction $Nd7_3$ of the third lens L73 is equal to 1.63. According to the above data, the following values can be obtained:

$$f7_1/f7_2 = 0.34,$$

$$(Vd7_1 + Vd7_2)/2 = 56.1,$$

$$(Vd7_3 + Vd7_4)/2 = 39.95,$$

$$|Vd7_1 - Vd7_2| = 0,$$

$$(Nd7_1 + Nd7_2)/Nd7_3 = 1.89$$

which respectively satisfy the above conditions (61)-(70).

Figure 14A:
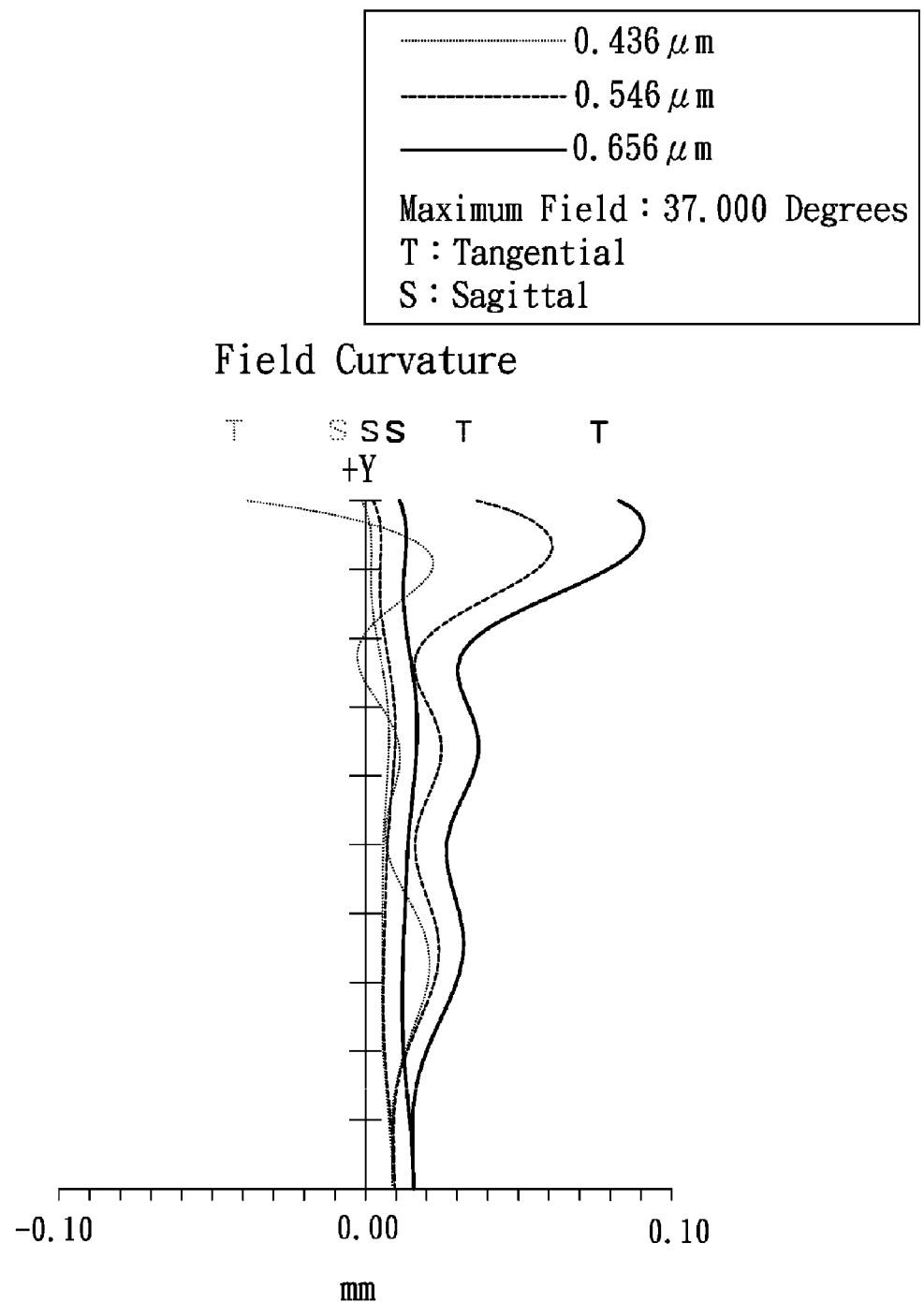
FIG. 14A depicts a field curvature diagram of the lens assembly in accordance with the seventh embodiment of the invention.
Figure 14B:
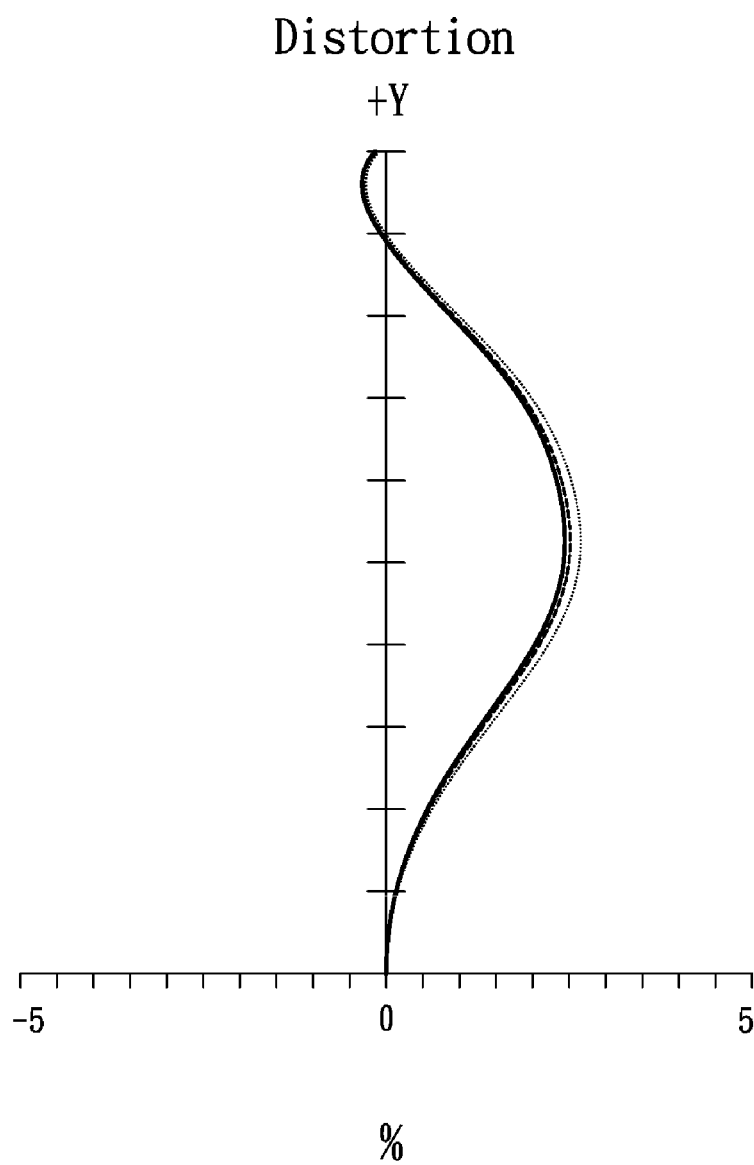
FIG. 14B is a distortion diagram of the lens assembly in accordance with the seventh embodiment of the invention.
Figure 14C:
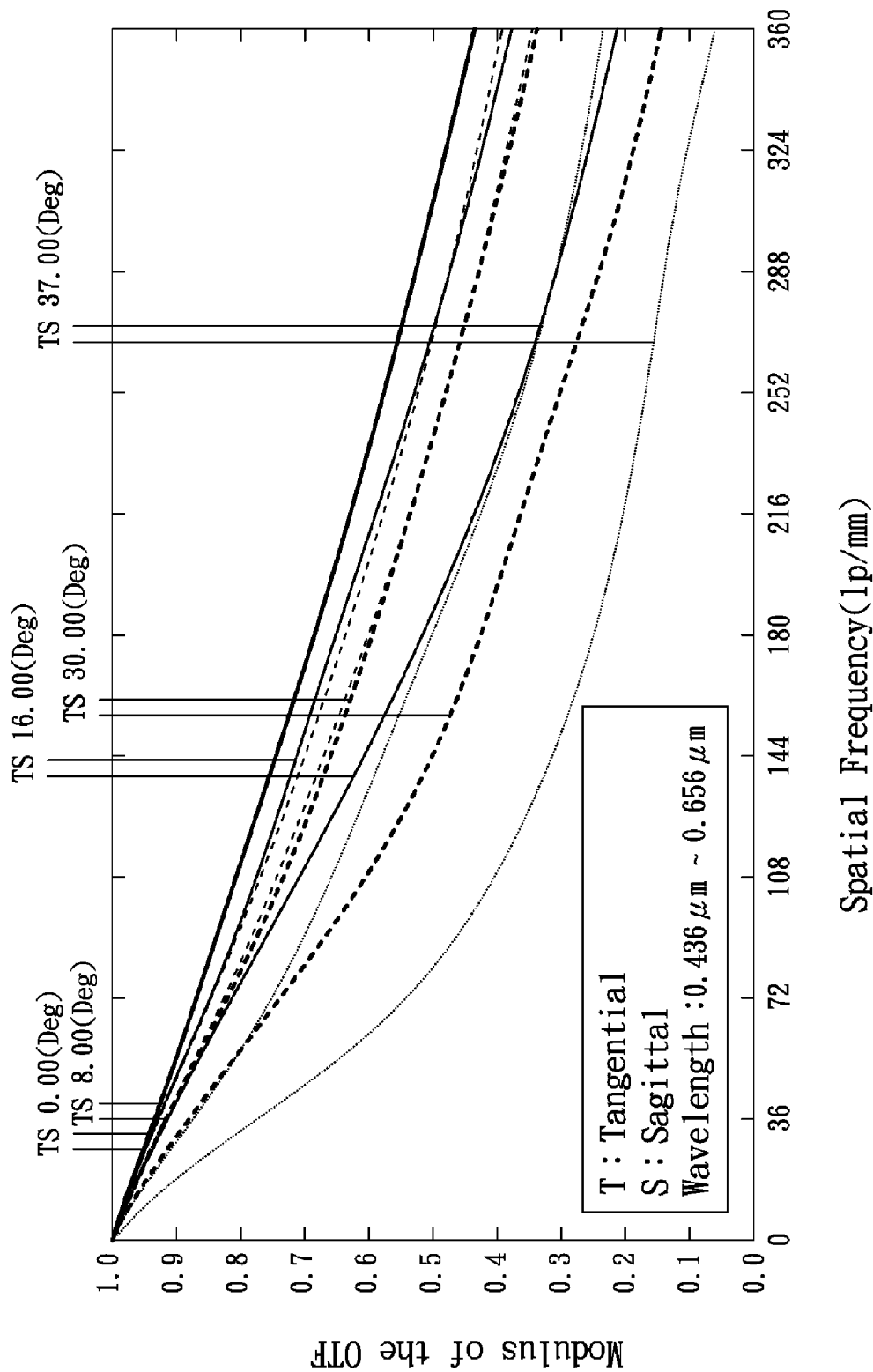
FIG. 14C is a modulation transfer function diagram of the lens assembly in accordance with the seventh embodiment of the invention.

By the above arrangements of the lenses and stop ST7, the lens assembly 7 of the seventh embodiment can meet the requirements of optical performance as seen in FIGS. 14A-14C, wherein FIG. 14A shows a field curvature diagram of the lens assembly 7 in accordance with the seventh embodiment of the invention, FIG. 14B shows a distortion diagram of the lens assembly 7 in accordance with the seventh embodiment of the invention and FIG. 14C shows a modulation transfer function diagram of the lens assembly 7 in accordance with the seventh embodiment of the invention.

It can be seen from FIG. 14A that the field curvature of tangential direction and sagittal direction in the lens assembly 7 of the seventh embodiment ranges between −0.04 mm and 0.10 mm for the wavelength of 0.436 µm, 0.546 µm and 0.656 nm. It can be seen from FIG. 14B that the distortion in the lens assembly 7 of the seventh embodiment ranges between −0.5% and 2.8% for the wavelength of 0.436 µm, 0.546 µm and 0.656 µm. It can be seen from FIG. 14C that the modulation transfer function of tangential direction and sagittal direction in the lens assembly 7 of the seventh embodiment ranges between 0.06 and 1.0 wherein the wavelength ranges between 0.436 µm and 0.656 µm, each field is 0.00 degree, 8.00 degrees, 16.00 degrees, 30.00 degrees and 37.00 degrees, spatial frequency ranges between 0 lp/mm and 360 lp/mm. It is obvious that the field curvature and the distortion of the lens assembly 7 of the seventh embodiment can be corrected effectively, and the resolution of the lens assembly 7 of the seventh embodiment can meet the requirement. Therefore, the lens assembly 7 of the seventh embodiment is capable of good optical performance.

Figure 15:
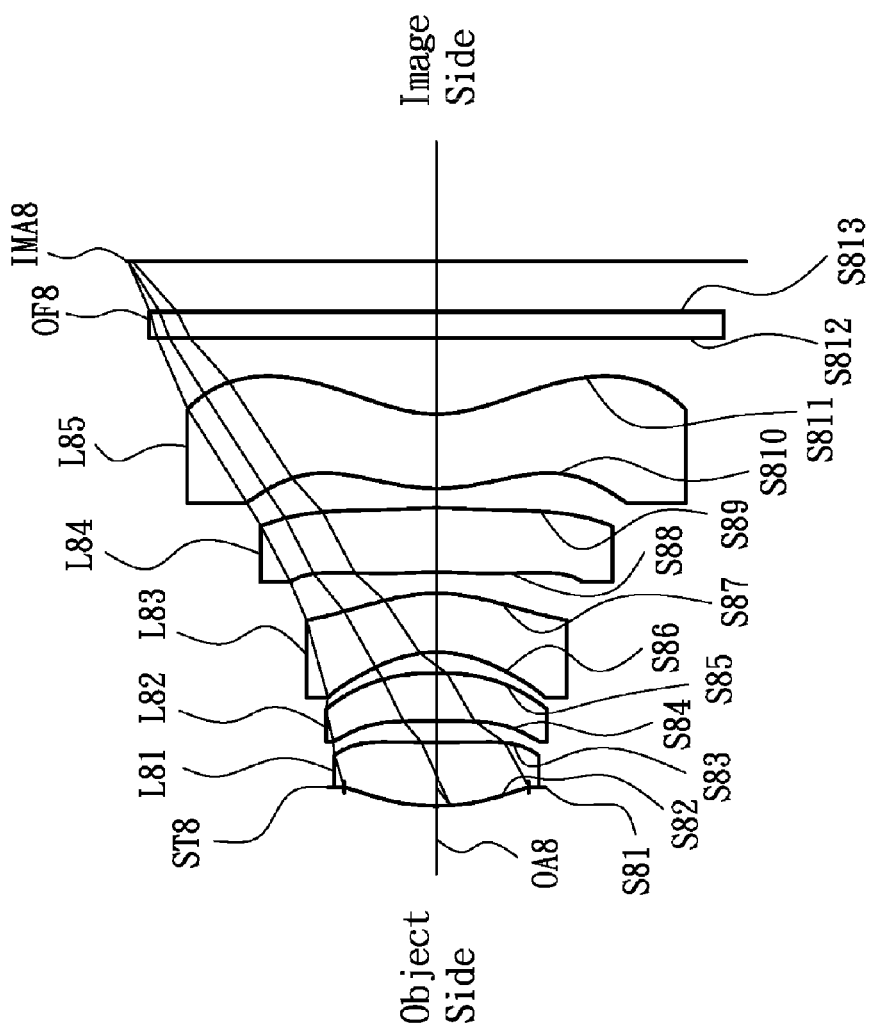
FIG. 15 is a lens layout and optical path diagram of a lens assembly in accordance with an eighth embodiment of the invention.

Referring to FIG. 15, FIG. 15 is a lens layout and optical path diagram of a lens assembly in accordance with an eighth embodiment of the invention. The lens assembly 8 includes a stop ST8, a first lens L81, a second lens L82, a third lens L83, a fourth lens L84, a fifth lens L85 and an Optical filter OF8, all of which are arranged in sequence from an object side to an image side along an optical axis OA8. In operation, an image of light rays from the object side is formed on an image plane IMA8. The first lens L81 is a meniscus lens, made of plastic material and with positive refractive power, wherein the object side surface S82 is a convex surface, the image side surface S83 is a concave surface and both of the object side surface S82 and image side surface S83 are aspheric surfaces. The second lens L82 is a concave-convex lens, made of plastic material and with positive refractive power, wherein the object side surface S84 is a concave surface, the image side surface S85 is a convex surface and both of the object side surface S84 and image side surface S85 are aspheric surfaces. The third lens L83 is a meniscus lens, made of plastic material and with negative refractive power, wherein the object side surface S86 is a concave surface, the image side surface S87 is a convex surface and both of the object side surface S86 and image side surface S87 are aspheric surfaces. The fourth lens L84 is a concave-convex lens, made of plastic material and with positive refractive power, wherein the object side surface S88 is a concave surface, the image side surface S89 is a convex surface and both of the object side surface S88 and image side surface S89 are aspheric surfaces. The fifth lens L85 is a convex-concave lens, made of plastic material and with positive refractive power, wherein the object side surface S810 is a convex surface, the image side surface S811 is a concave surface and both of the object side surface S810 and image side surface S811 are aspheric surfaces. Both of the object side surface S812 and image side surface S813 of the optical filter OF8 are plane surfaces.

In order to maintain excellent optical performance of the lens assembly in accordance with the eighth embodiment of the invention, the lens assembly 8 must satisfies the following ten conditions:

$$0 \leq f8_1/f8_2 \leq 6 \tag{71}$$

$$(Vd8_1 - Vd8_2)/2 > 40 \tag{72}$$

$$Vd8_1 \geq Vd8_3 \tag{73}$$

$$Vd8_2 \geq Vd8_3 \tag{74}$$

$$Vd8_5 \geq Vd8_3 \tag{75}$$

$$(Vd8_3 + Vd8_4)/2 \leq 45 \tag{76}$$

$$Vd8_1 > 40 \tag{77}$$

$$Vd8_2 > 40 \tag{78}$$

$$|Vd8_1 - Vd8_2| < 25 \tag{79}$$

$$(Nd8_1 + Nd8_2)/Nd8_3 \geq 1.8 \tag{80}$$

wherein $f8_1$ is an effective focal length of the first lens L81, $f8_2$ is an effective focal length of the second lens L82, $Vd8_1$ is an Abbe number of the first lens L81, $Vd8_2$ is an Abbe number of the second lens L82, $Vd8_3$ is an Abbe number of the third lens L83, $Vd8_4$ is an Abbe number of the fourth lens L84, $Vd8_5$ is an Abbe number of the fifth lens L85, $Nd8_1$ is an index of refraction of the first lens L81, $Nd8_2$ is an index of refraction of the second lens L82, and $Nd8_3$ is an index of refraction of the third lens L83.

By the above design of the lenses and stop ST8, the lens assembly 8 is provided with a shortened total lens length, an effective corrected aberration, a good optical performance and a satisfied resolution.

In order to achieve the above purposes and effectively enhance the optical performance, the lens assembly 8 in accordance with the eighth embodiment of the invention is provided with the optical specifications shown in Table 15 which include the effective focal length, F-number, field of view, radius of curvature of each lens surface, thickness between adjacent surface, refractive index of each lens and Abbe number of each lens. Table 15 shows that the effective focal length is equal to 3.2 mm, F-number is equal to 2.2 and field of view is equal to 74° for the lens assembly 8 of the eighth embodiment of the invention.

TABLE 15

Effective Focal Length = 3.2 mm F-number = 2.2 Field of View = 74°

| Surface Number | Radius of Curvature (mm) | Thickness (mm) | Nd | Vd | Remark |
|---|---|---|---|---|---|
| S81 | ∞ | −0.14731 | | | Stop ST8 |
| S82 | 1.611984 | 0.50196 | 1.54 | 56.1 | The First Lens L81 |
| S83 | 8.992254 | 0.169745 | | | |
| S84 | −16.7571 | 0.377688 | 1.54 | 56.1 | The Second Lens L82 |
| S85 | −2.23527 | 0.163974 | | | |
| S86 | −0.98934 | 0.464122 | 1.63 | 23.8 | The Third Lens L83 |
| S87 | −1.35792 | 0.168812 | | | |
| S88 | −3.42004 | 0.506624 | 1.54 | 56.1 | The Fourth Lens L84 |
| S89 | −4.19577 | 0.151229 | | | |
| S810 | 1.410481 | 0.588032 | 1.54 | 56.1 | The Fifth Lens L85 |
| S811 | 0.983214 | 0.6 | | | |
| S812 | ∞ | 0.21 | 1.5168 | 64.1673 | Optical Filter OF8 |
| S813 | ∞ | 0.397368 | | | |

The aspheric surface sag z of each lens in table 15 can be calculated by the following formula:

$$z = ch^2/\{1+[1-(k+1)c^2h^2]^{1/2}\} + Ah^4 + Bh^6 + Ch^8 + Dh^{10} + Eh^{12} + Fh^{14} + Gh^{16} + Hh^{18} + Ih^{20}$$

where c is curvature, h is the vertical distance from the lens surface to the optical axis, k is conic constant and A, B, C, D, E, F, G, H and I are aspheric coefficients.

In the eighth embodiment, the conic constant k and the aspheric coefficients A, B, C, D, E, F, G, H, I of each surface are shown in Table 16.

TABLE 16

| Surface Number | k / E | A / F | B / G | C / H | D / I |
|---|---|---|---|---|---|
| S82 | −0.00744 / −0.69878674 | −0.043565232 / −0.35230802 | 0.10564861 / −0.020502496 | −0.608156 / −0.020502496 | 0.9052572 / −0.020502496 |
| S83 | 0 / −6.5387828 | −0.19439192 / 3.1779955 | 0.25176909 / 0.05785576 | −2.4259922 / 0.05785576 | 5.5303148 / 0.05785576 |
| S84 | 0 / −1.3126951 | −0.32060155 / −0.63584984 | 0.26004913 / 0.20793119 | −2.3017996 / 0.20793119 | 3.9392926 / 0.20793119 |
| S85 | 1.231148 / −0.43296416 | −0.28718483 / −0.08667419 | 0.029261172 / 0.063052374 | 0.23883556 / 0.063052374 | 0.24673016 / 0.063052374 |
| S86 | −0.00443 / −0.94116305 | −0.024479166 / 0.84460916 | 0.61928643 / −0.010687459 | −0.14645908 / −0.010687459 | −0.010778973 / −0.010687459 |
| S87 | 0 / 0.45531965 | 0.36885962 / −0.03586346 | −0.547848 / −0.002188258 | 1.0596097 / −0.002188258 | −1.0641295 / −0.002188258 |
| S88 | 0 / 0.76620585 | 0.71315522 / −0.14725852 | −1.5895634 / −0.000338107 | 2.1077902 / −0.000338107 | −1.718001 / −0.000338107 |
| S89 | −12.0558 / 0.092767671 | 0.32490103 / −0.011373909 | −0.59362444 / 3.37289E−05 | 0.55999707 / 3.37289E−05 | −0.31140672 / 3.37289E−05 |
| S810 | −3.12628 / 0.004904817 | −0.21554871 / −8.66E−04 | 0.045573535 / 9.63826E−06 | −0.001717379 / 9.63826E−06 | −0.007736364 / 9.63826E−06 |
| S811 | −3.84714 / −3.10E−05 | −0.11426917 / −1.38E−05 | 0.042467426 / −1.85554E−07 | −0.012486369 / −1.85554E−07 | 0.001736531 / −1.85554E−07 |

For the lens assembly 8 of the eighth embodiment, the effective focal length $f8_1$ of the first lens L81 is equal to 3.50956 mm, the effective focal length $f8_2$ of the second lens L82 is equal to 4.67674 mm, the Abbe number $Vd8_1$ of the first lens L81 is equal to 56.1, the Abbe number $Vd8_2$ of the second lens L82 is equal to 56.1, the Abbe number $Vd8_3$ of the third lens L83 is equal to 23.8, the Abbe number $Vd8_4$ of the fourth lens L84 is equal to 56.1, the Abbe number $Vd8_5$ of the fifth lens L85 is equal to 56.1, the index of refraction $Nd8_1$ of the first lens L81 is equal to 1.54, the index of refraction $Nd8_2$ of the second lens L82 is equal to 1.54, and the index of refraction $Nd8_3$ of the third lens L83 is equal to 1.63. According to the above data, the following values can be obtained:

$$f8_1/f8_2 = 0.75,$$

$$(Vd8_1 + Vd8_2)/2 = 56.1,$$

$$(Vd8_3 + Vd8_4)/2 = 39.95,$$

$$|Vd8_1 - Vd8_2| = 0,$$

$$(Nd8_1 + Nd8_2)/Nd8_3 = 1.89$$

which respectively satisfy the above conditions (71)-(80).

Figure 16A:
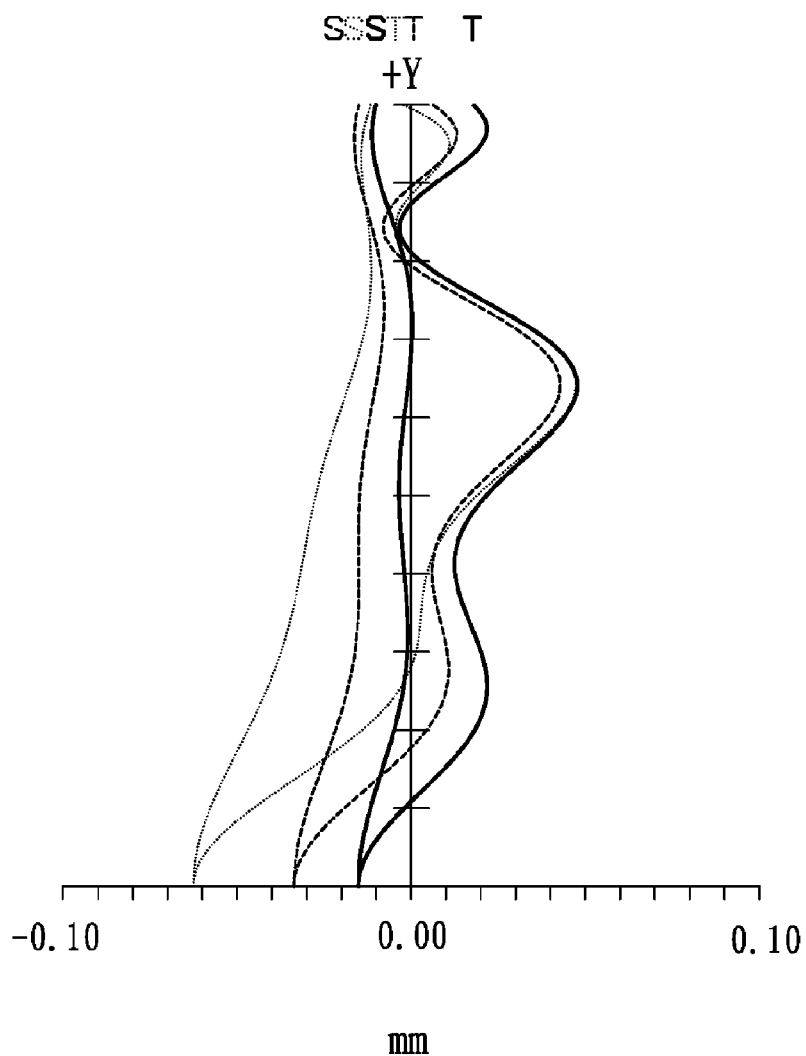
FIG. 16A depicts a field curvature diagram of the lens assembly in accordance with the eighth embodiment of the invention.
Figure 16B:
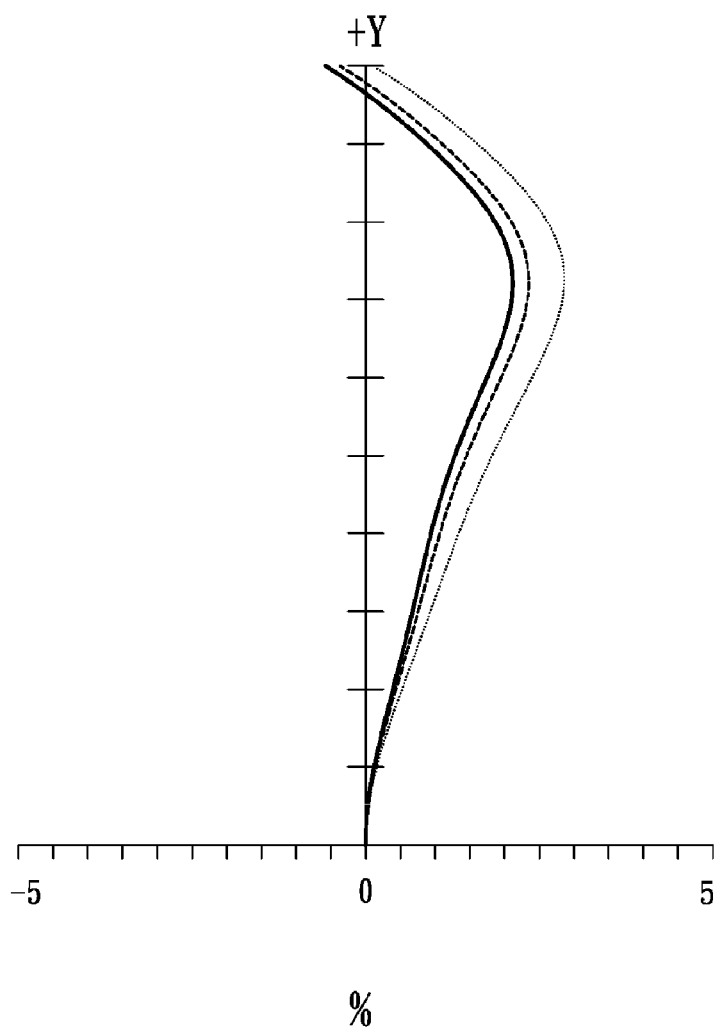
FIG. 16B is a distortion diagram of the lens assembly in accordance with the eighth embodiment of the invention.
Figure 16C:
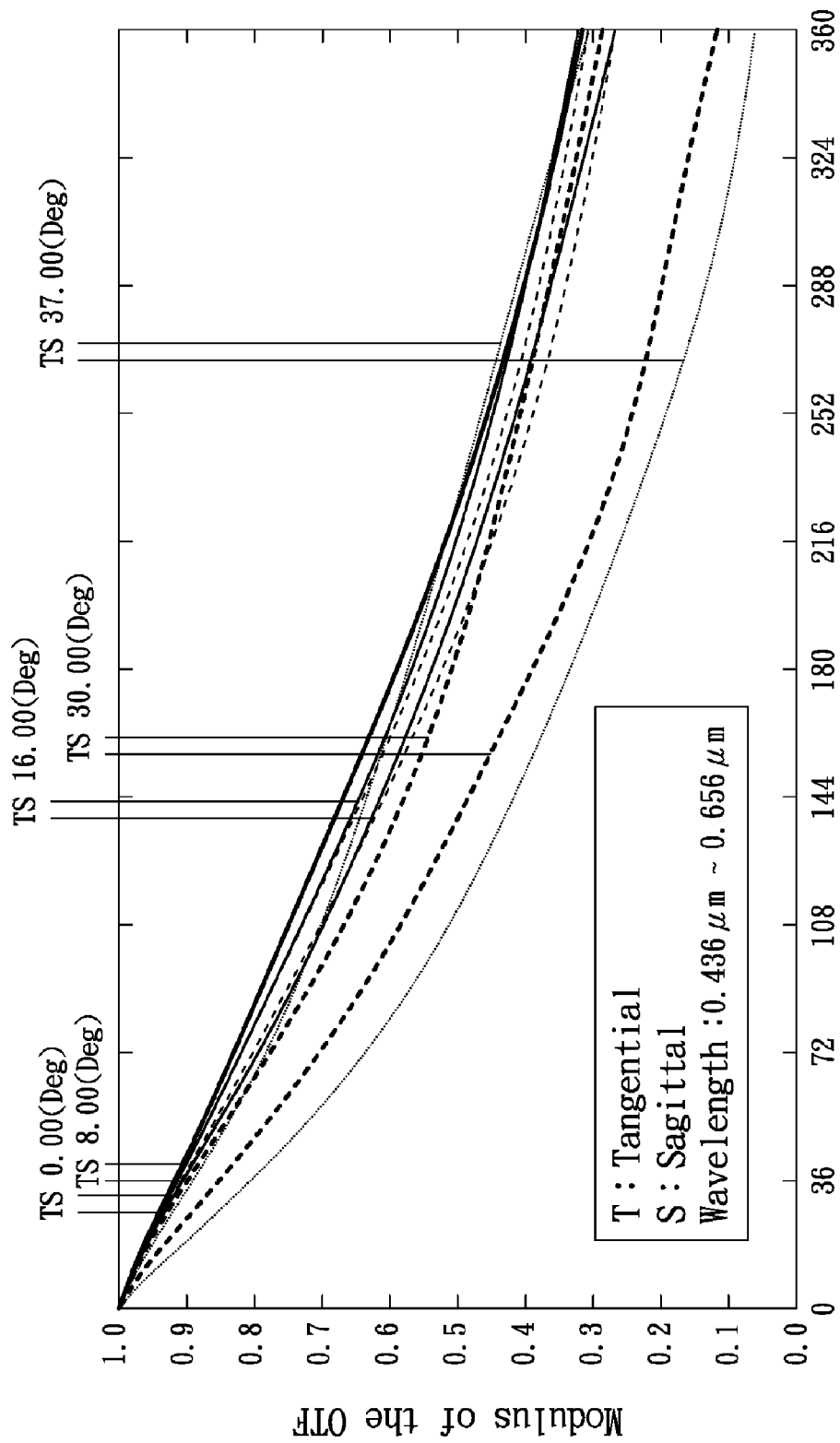
FIG. 16C is a modulation transfer function diagram of the lens assembly in accordance with the eighth embodiment of the invention.

By the above arrangements of the lenses and stop ST8, the lens assembly 8 of the eighth embodiment can meet the requirements of optical performance as seen in FIGS. 16A-16C, wherein FIG. 16A shows a field curvature diagram of the lens assembly 8 in accordance with the eighth embodiment of the invention, FIG. 16B shows a distortion diagram of the lens assembly 8 in accordance with the eighth embodiment of the invention and FIG. 16C shows a modulation transfer function diagram of the lens assembly 8 in accordance with the eighth embodiment of the invention.

It can be seen from FIG. 16A that the field curvature of tangential direction and sagittal direction in the lens assembly 8 of the eighth embodiment ranges between −0.07 mm and 0.05 mm for the wavelength of 0.436 μm, 0.546 μm and 0.656 μm. It can be seen from FIG. 16B that the distortion in the lens assembly 8 of the eighth embodiment ranges between −0.5% and 3.0% for the wavelength of 0.436 μm, 0.546 μm and 0.656 μm. It can be seen from FIG. 16C that the modulation transfer function of tangential direction and sagittal direction in the lens assembly 8 of the eighth embodiment ranges between 0.06 and 1.0 wherein the wavelength ranges between 0.436 μm and 0.656 μm, each field is 0.00 degree, 8.00 degrees, 16.00 degrees, 30.00 degrees and 37.00 degrees, spatial frequency ranges between 0 lp/mm and 360 lp/mm. It is obvious that the field curvature and the distortion of the lens assembly 8 of the eighth embodiment can be corrected effectively, and the resolution of the lens assembly 8 of the eighth embodiment can meet the requirement. Therefore, the lens assembly 8 of the eighth embodiment is capable of good optical performance.

Figure 17:
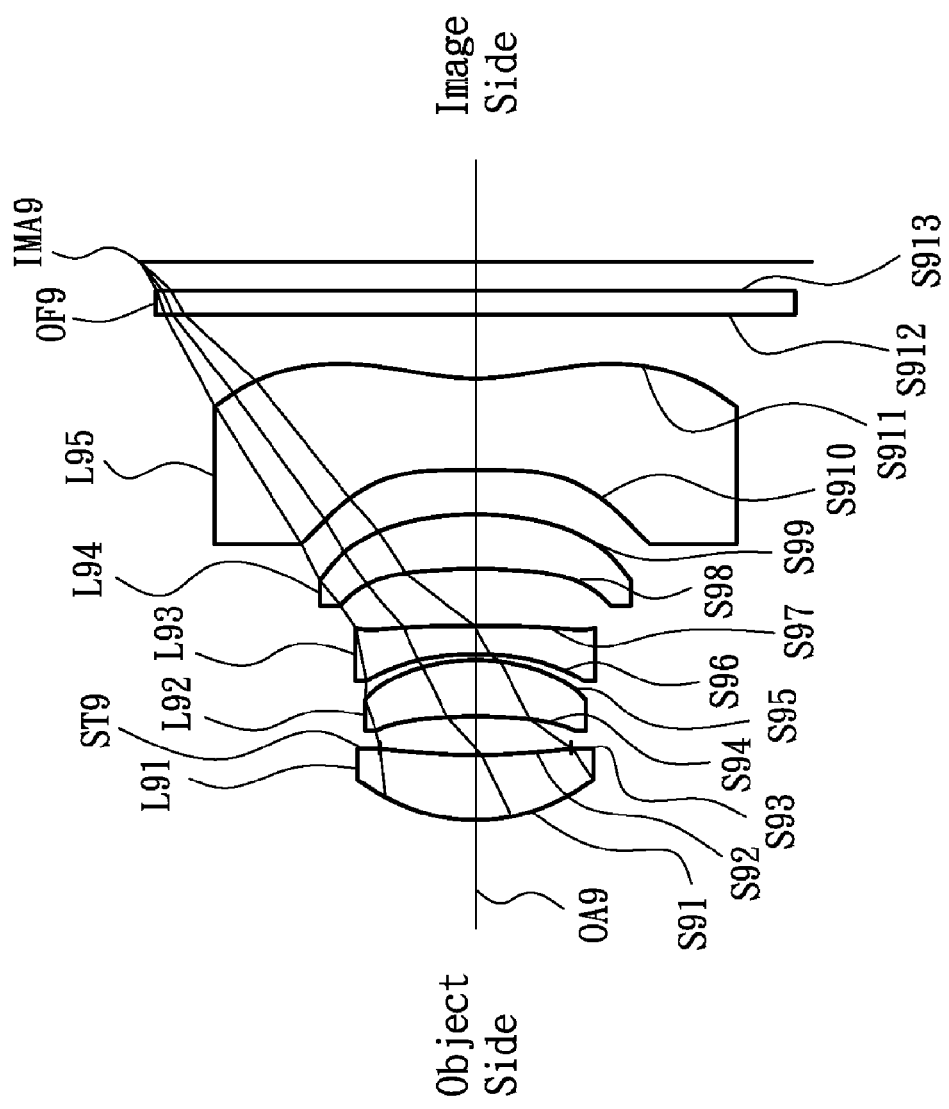
FIG. 17 is a lens layout and optical path diagram of a lens assembly in accordance with a ninth embodiment of the invention.

Referring to FIG. 17, FIG. 17 is a lens layout and optical path diagram of a lens assembly in accordance with a ninth embodiment of the invention. The lens assembly 9 includes a first lens L91, a stop ST9, a second lens L92, a third lens L93, a fourth lens L94, a fifth lens L95 and an Optical filter OF9, all of which are arranged in sequence from an object side to an image side along an optical axis OA9. In operation, an image of light rays from the object side is formed on an image plane IMA9. The first lens L91 is a convex-concave lens, made of glass material and with positive refractive power, wherein the object side surface S91 is a convex surface, the image side surface S92 is a concave surface and both of the object side surface S91 and image side surface S92 are aspheric surfaces. The second lens L92 is a concave-convex lens, made of glass material and with positive refractive power, wherein the object side surface S94 is a concave surface, the image side surface S95 is a convex surface and both of the object side surface S94 and image side surface S95 are aspheric surfaces. The third lens L93 is a biconcave lens, made of plastic material and with negative refractive power, wherein both of the object side surface S96 and image side surface S97 are aspheric surfaces. The fourth lens L94 is a concave-convex lens, made of plastic material and with positive refractive power, wherein the object side surface S98 is a concave surface, the image side surface S99 is a convex surface and both of the object side surface S98 and image side surface S99 are aspheric surfaces. The fifth lens L95 is a biconcave lens, made of plastic material and with negative refractive power, wherein both of the object side surface S910 and image side surface S911 are aspheric surfaces. Both of the object side surface S912 and image side surface S913 of the optical filter OF9 are plane surfaces.

In order to maintain excellent optical performance of the lens assembly in accordance with the ninth embodiment of the invention, the lens assembly 9 must satisfies the following ten conditions:

$$0 \leq f9_1/f9_2 \leq 6 \tag{81}$$

$$(Vd9_1 + Vd9_2)/2 > 40 \tag{82}$$

$$Vd9_1 \geq Vd9_3 \tag{83}$$

$$Vd9_2 \geq Vd9_3 \tag{84}$$

$$Vd9_5 \geq Vd9_3 \tag{85}$$

$$(Vd9_3 + Vd9_4)/2 \leq 45 \tag{86}$$

$$Vd9_1 > 40 \tag{87}$$

$$Vd9_2 > 40 \tag{88}$$

$$|Vd9_1 - Vd9_2| < 25 \tag{89}$$

$$(Nd9_1 + Nd9_2)/Nd9_3 \geq 1.9 \tag{90}$$

wherein $f9_1$ is an effective focal length of the first lens L91, $f9_2$ is an effective focal length of the second lens L92, $Vd9_1$ is an Abbe number of the first lens L91, $Vd9_2$ is an Abbe number of the second lens L92, $Vd9_3$ is an Abbe number of the third lens L93, $Vd9_4$ is an Abbe number of the fourth lens L94, $Vd9_5$ is an Abbe number of the fifth lens L95, $Nd9_1$ is an index of refraction of the first lens L91, $Nd9_2$ is an index of refraction of the second lens L92, and $Nd9_3$ is an index of refraction of the third lens L93.

By the above design of the lenses and stop ST9, the lens assembly 9 is provided with a shortened total lens length, an effective corrected aberration, a good optical performance and a satisfied resolution.

In order to achieve the above purposes and effectively enhance the optical performance, the lens assembly 9 in accordance with the ninth embodiment of the invention is provided with the optical specifications shown in Table 17 which include the effective focal length, F-number, field of view, radius of curvature of each lens surface, thickness between adjacent surface, refractive index of each lens and Abbe number of each lens. Table 17 shows that the effective focal length is equal to 3.43 mm, F-number is equal to 2.2 and field of view is equal to 68.6° for the lens assembly 9 of the ninth embodiment of the invention.

TABLE 17

| Effective Focal Length = 3.43 mm F-number = 2.2 Field of View = 68.6° | | | | | |
|---|---|---|---|---|---|
| Surface Number | Radius of Curvature (mm) | Thickness (mm) | Nd | Vd | Remark |
| S91 | 1.641802 | 0.5728332 | 1.563839 | 60.695914 | The First Lens L91 |
| S92 | 5.761811 | 0.06318108 | | | |
| S93 | ∞ | 0.275825 | | | Stop ST9 |
| S94 | −4.925762 | 0.4984227 | 1.58913 | 61.182174 | The Second Lens L92 |
| S95 | −1.740215 | 0.04923725 | | | |
| S96 | −2.954757 | 0.2498381 | 1.64 | 22.4 | The Third Lens L93 |
| S97 | 64.23641 | 0.5063604 | | | |
| S98 | −5.115471 | 0.4777748 | 1.64 | 22.4 | The Fourth Lens L94 |
| S99 | −2.701072 | 0.3924235 | | | |
| S910 | −36.17969 | 0.8040009 | 1.54 | 56.1 | The Fifth Lens L95 |
| S911 | 1.980553 | 0.5626672 | | | |
| S912 | ∞ | 0.21 | 1.5168 | 64.1673 | Optical Filter OF9 |
| S913 | ∞ | 0.259193 | | | |

The aspheric surface sag z of each lens in table 17 can be calculated by the following formula:

$$z = ch^2 / \{1 + [1-(k+1)c^2h^2]^{1/2}\} + Ah^4 + Bh^6 + Ch^8 + Dh^{10} + Eh^{12} + Fh^{14} + Gh^{16} + Hh^{18} + Ih^{20}$$

where c is curvature, h is the vertical distance from the lens surface to the optical axis, k is conic constant and A, B, C, D, E, F, G, H and I are aspheric coefficients.

In the ninth embodiment, the conic constant k and the aspheric coefficients A, B, C, D, E, F, G, H, I of each surface are shown in Table 18.

TABLE 18

| Surface Number | k / E | A / F | B / G | C / H | D / I |
|---|---|---|---|---|---|
| S91 | 0.204584 | −0.005071186 | −0.022755789 | 0.032905132 | −0.025249371 |
|  | −0.002124863 | 0.000852784 | 0.000716376 | 0.000716376 | 0.000716376 |
| S92 | 0 | −0.010059747 | −0.003371668 | −0.006735066 | −0.012644178 |
|  | −0.01348385 | 0.02415806 | 0.000951426 | 0.000951426 | 0.000951426 |
| S94 | 0 | −0.034068383 | −0.009167239 | −0.051749139 | −0.00240193 |
|  | 0.012707853 | −0.006033598 | −0.053480628 | −0.053480628 | −0.053480628 |
| S95 | 0 | 0.056975072 | −0.22806657 | 0.22381799 | −0.096852713 |
|  | −0.008507721 | −0.004219425 | −0.009819654 | −0.009819654 | −0.009819654 |
| S96 | 0 | −0.066700754 | −0.23102277 | 0.35438076 | −0.091169579 |
|  | −0.046702815 | −0.005094144 | 0.000907875 | 0.000907875 | 0.000907875 |
| S97 | 0 | −0.098247595 | −0.037028968 | 0.15422043 | −0.085183476 |
|  | 0.02661809 | 0.007953298 | −0.004610687 | −0.004610687 | −0.004610687 |
| S98 | −3.69105 | 0.01818474 | −0.1034154 | 0.013632312 | 0.027979908 |
|  | −0.0410194 | 0.015718607 | 0.000282896 | 0.000282896 | 0.000282896 |
| S99 | 1.465305 | 0.010033807 | −0.030574994 | 0.001680085 | 7.51016E−05 |
|  | −0.00171113 | 0.000574406 | 0.000130902 | 0.000130902 | 0.000130902 |
| S910 | −2076.56 | −0.2282398 | 0.071643829 | −0.012140572 | −0.002402523 |
|  | 0.001256038 | 2.37E−04 | −6.45195E−05 | −6.45195E−05 | −6.45195E−05 |
| S911 | −9.3956 | −0.076840363 | 0.022798056 | −0.004460702 | 0.000193637 |
|  | 1.09E−04 | −2.29E−05 | 1.44535E−06 | 1.44535E−06 | 1.44535E−06 |

For the lens assembly 9 of the ninth embodiment, the effective focal length $f9_1$ of the first lens L91 is equal to 3.86212 mm, the effective focal length $f9_2$ of the second lens L92 is equal to 4.29975 mm, the Abbe number $Vd9_1$ of the first lens L91 is equal to 60.69591, the Abbe number $Vd9_2$ of the second lens L92 is equal to 61.18217, the Abbe number $Vd9_3$ of the third lens L93 is equal to 22.4, the Abbe number $Vd9_4$ of the fourth lens L94 is equal to 22.4, the Abbe number $Vd9_5$ of the fifth lens L95 is equal to 56.1, the index of refraction $Nd9_1$ of the first lens L91 is equal to 1.563839, the index of refraction $Nd9_2$ of the second lens L92 is equal to 1.58913, and the index of refraction $Nd9_3$ of the third lens L93 is equal to 1.64. According to the above data, the following values can be obtained:

$f9_1/f9_2 = 0.898$, $(Vd9_1 + Vd9_2)/2 = 60.94$, $(Vd9_3 + Vd9_4)/2 = 22.4$, $|Vd9_1 - Vd9_2| = 0.49$, $(Nd9_1 + Nd9_2)/Nd9_3 = 1.92$ which respectively satisfy the above conditions (81)-(90).

Figure 18A:
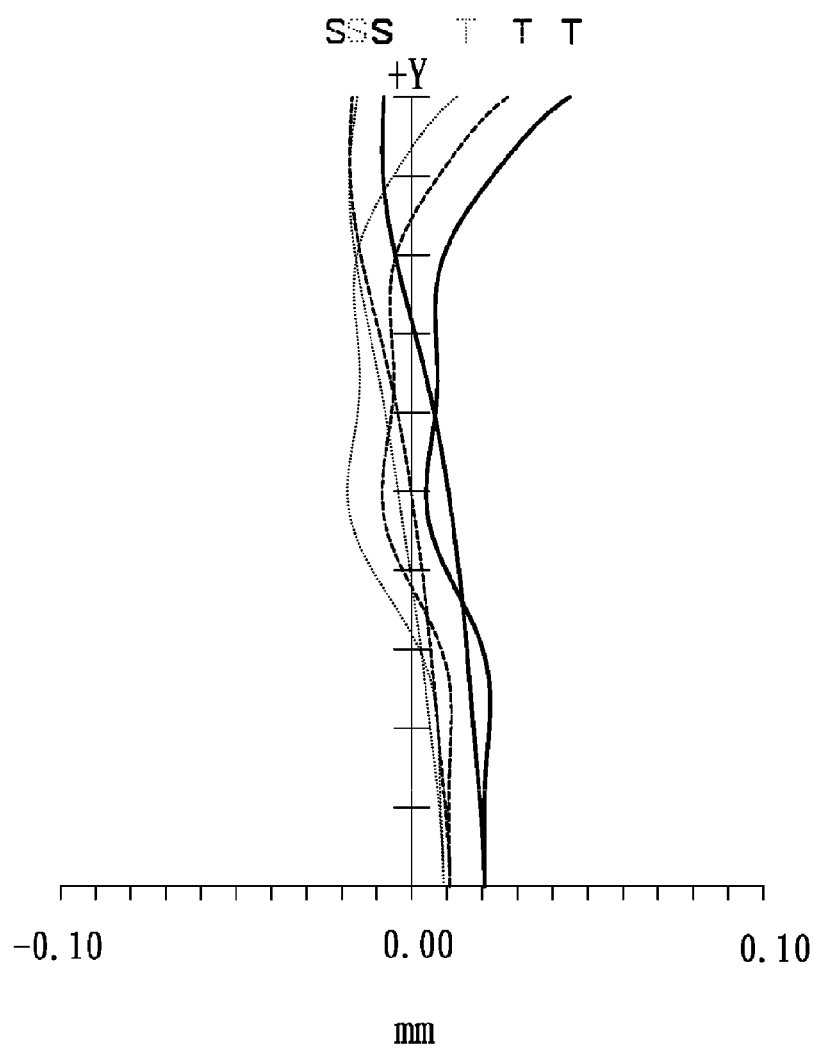
FIG. 18A depicts a field curvature diagram of the lens assembly in accordance with the ninth embodiment of the invention.
Figure 18B:
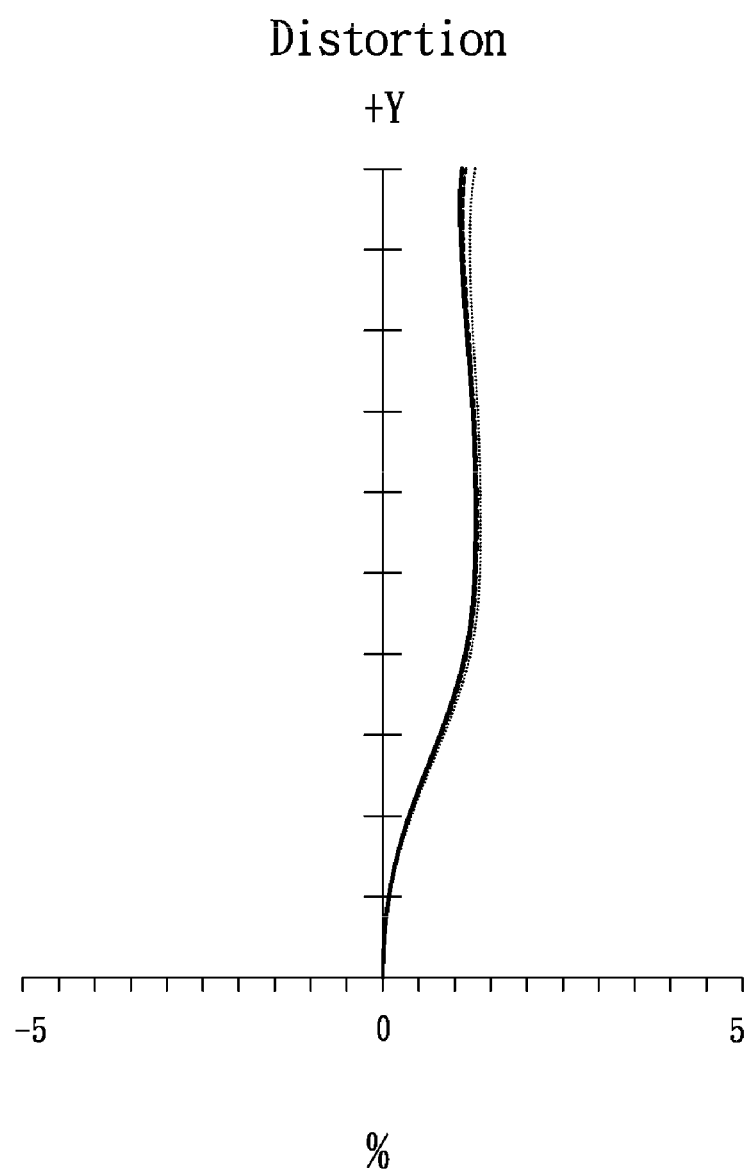
FIG. 18B is a distortion diagram of the lens assembly in accordance with the ninth embodiment of the invention.
Figure 18C:
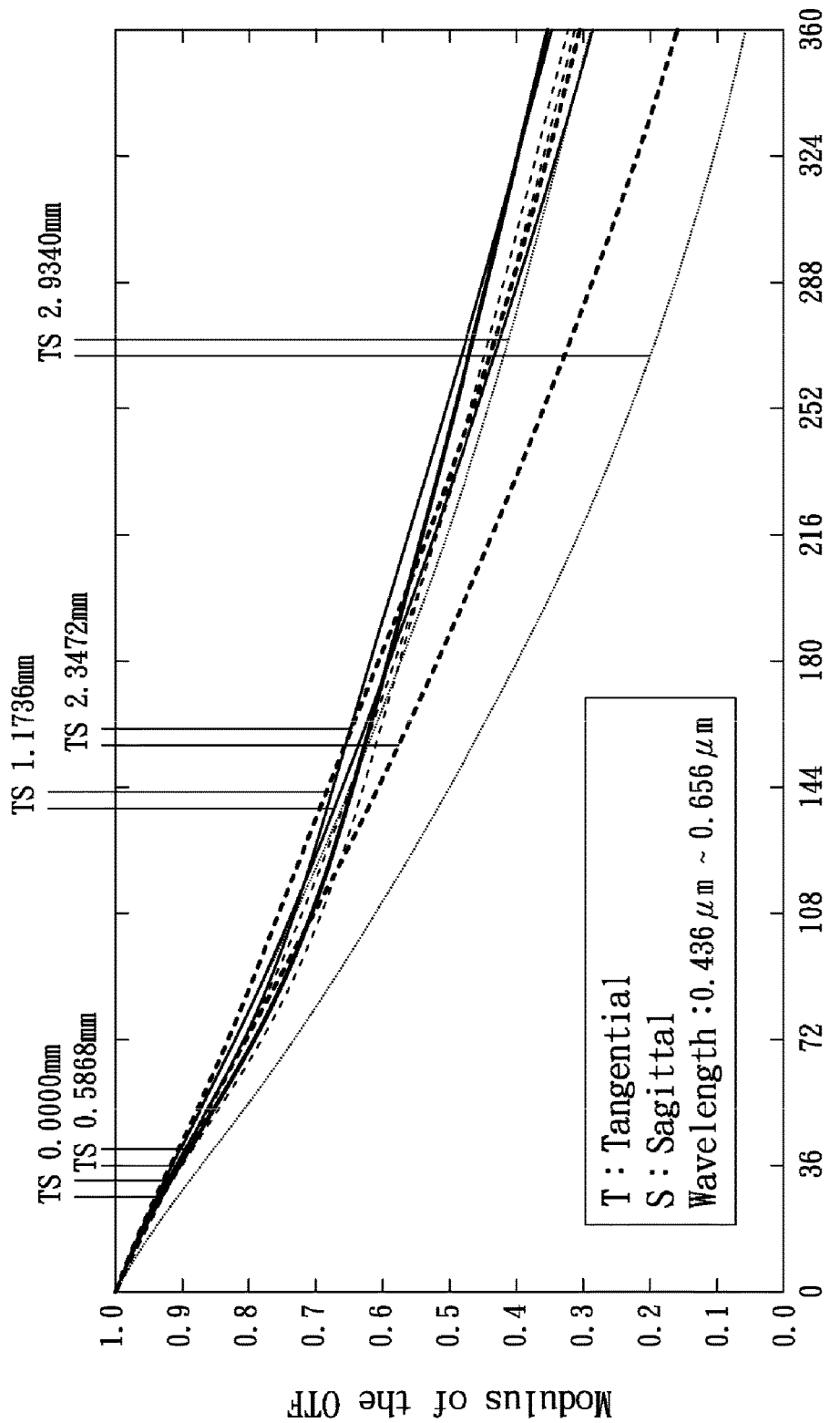
FIG. 18C is a modulation transfer function diagram of the lens assembly in accordance with the ninth embodiment of the invention.

By the above arrangements of the lenses and stop ST9, the lens assembly 9 of the ninth embodiment can meet the requirements of optical performance as seen in FIGS. 18A-18C, wherein FIG. 18A shows a field curvature diagram of the lens assembly 9 in accordance with the ninth embodiment of the invention, FIG. 18B shows a distortion diagram of the lens assembly 9 in accordance with the ninth embodiment of the invention and FIG. 18C shows a modulation transfer function diagram of the lens assembly 9 in accordance with the ninth embodiment of the invention.

It can be seen from FIG. 18A that the field curvature of tangential direction and sagittal direction in the lens assembly 9 of the ninth embodiment ranges between −0.02 mm and 0.05 mm for the wavelength of 0.436 μm, 0.546 μm and 0.656 μm. It can be seen from FIG. 18B that the distortion in the lens assembly 9 of the ninth embodiment ranges between 0.0% and 1.5% for the wavelength of 0.436 μm, 0.546 μm and 0.656 μm. It can be seen from FIG. 18C that the modulation transfer function of tangential direction and sagittal direction in the lens assembly 9 of the ninth embodiment ranges between 0.05 and 1.0 wherein the wavelength ranges between 0.436 μm and 0.656 μm, each field is 0.0000 mm, 0.5868 mm, 1.1736 mm, 2.3472 mm and 2.9340 mm, spatial frequency ranges between 0 lp/mm and 360 lp/mm. It is obvious that the field curvature and the distortion of the lens assembly 9 of the ninth embodiment can be corrected effectively, and the resolution of the lens assembly 9 of the ninth embodiment can meet the requirement. Therefore, the lens assembly 9 of the ninth embodiment is capable of good optical performance.

Referring to Table 19, 20, 21, 22, 23, 24, 25, 26, 27, 28, 29 and 30, Table 19 provides optical specifications in accordance with a tenth embodiment of the invention, Table 20 provides aspheric coefficients of each surface in Table 19, Table 21 provides optical specifications in accordance with an eleventh embodiment of the invention, Table 22 provides aspheric coefficients of each surface in Table 21, Table 23 provides optical specifications in accordance with a twelfth embodiment of the invention, Table 24 provides aspheric coefficients of each surface in Table 23, Table 25 provides optical specifications in accordance with a thirteenth embodiment of the invention, Table 26 provides aspheric coefficients of each surface in Table 25, Table 27 provides optical specifications in accordance with a fourteenth embodiment of the invention, Table 28 provides aspheric coefficients of each surface in Table 27, Table 29 provides optical specifications in accordance with a fifteenth embodiment of the invention and Table 30 provides aspheric coefficients of each surface in Table 29, wherein the aspheric surface sag z of each lens in table 19, 21, 23, 25, 27 and 29 can be calculated by the following formula: $z = ch^2/\{1+[1-(k+1)c^2h^2]^{1/2}\} + Ah^4 + Bh^6 + Ch^8 + Dh^{10} + Eh^{12} + Fh^{14} + Gh^{16} +$ $Hh^{18}+Ih^{20}$ in where c is curvature, h is the vertical distance from the lens surface to the optical axis, k is conic constant and A, B, C, D, E, F, G, H and I are aspheric coefficients. Due to the similarity, the figures which depict the lens layout and optical path diagram of the lens assembly in accordance with the tenth, eleventh, twelfth, thirteenth, fourteenth and fifteenth embodiment of the invention, are omitted.

TABLE 19

Effective Focal Length = 4.03 mm F-number = 2.2 Field of View = 72°

| Surface Number | Radius of Curvature (mm) | Thickness (mm) | Nd | Vd | Remark |
|---|---|---|---|---|---|
| S101 | 1.633629 | 0.488378 | 1.58913 | 61.18217 | The First Lens L101 |
| S102 | 5.644855 | 0.064326 | | | |
| S103 | ∞ | 0.267738 | | | Stop ST10 |
| S104 | −5.62804 | 0.471125 | 1.54 | 56.1 | The Second Lens L102 |
| S105 | −1.77299 | 0.034953 | | | |
| S106 | −2.71582 | 0.229862 | 1.64 | 22.4 | The Third Lens L103 |
| S107 | 333.2641 | 0.514913 | | | |
| S108 | −9.08272 | 0.582727 | 1.64 | 22.4 | The Fourth Lens L104 |
| S109 | −3.64702 | 0.352935 | | | |
| S1010 | 4.831662 | 0.69113 | 1.54 | 56.1 | The Fifth Lens L105 |
| S1011 | 1.490044 | 0.562667 | | | |
| S1012 | ∞ | 0.21 | 1.5168 | 64.1673 | Optical Filter OF10 |
| S1013 | ∞ | 0.248459 | | | |

TABLE 20

| Surface Number | k E | A F | B G | C H | D I |
|---|---|---|---|---|---|
| S101 | 0.4139267 | −0.004760953 | −0.030234235 | 0.041752614 | −0.023824893 |
| | −0.004378696 | −0.003204472 | −0.000207772 | −0.000207772 | −0.000207772 |
| S102 | 0 | −0.002263237 | −0.004979951 | −0.004121347 | −0.003556519 |
| | −0.00418128 | −0.006035553 | −0.009932081 | −0.009932081 | −0.009932081 |
| S104 | 0 | −0.033905132 | 0.006568731 | −0.071143781 | −0.016702757 |
| | −0.012961604 | −0.014751628 | −0.018591145 | −0.018591145 | −0.018591145 |
| S105 | 0 | 0.055033504 | −0.2369588 | 0.22066308 | −0.09565672 |
| | −3.52606E−05 | −0.00503866 | −0.009926784 | −0.009926784 | −0.009926784 |
| S106 | 0 | −0.068978924 | −0.22341904 | 0.36029027 | −0.083907746 |
| | −0.039703691 | 0.000540962 | −0.000442111 | −0.000442111 | −0.000442111 |
| S107 | −0.1293818 | −0.095133317 | −0.034457887 | 0.15920834 | −0.085079802 |
| | 0.027265366 | 0.000511394 | 0.002157482 | 0.002157482 | 0.002157482 |
| S108 | −252.5343 | 0.02668159 | −0.10337207 | 0.022321675 | 0.031842946 |
| | −0.042864787 | 0.013588472 | 0.000382001 | 0.000382001 | 0.000382001 |
| S109 | −0.8127861 | 0.036232162 | −0.042118422 | 0.005657655 | 0.000924255 |
| | −0.001858142 | 0.00065469 | 2.51551E−05 | 2.51551E−05 | 2.51551E−05 |
| S1010 | −33.4763 | −0.2093055 | 0.068254832 | −0.013412585 | −0.002693474 |
| | 0.001117928 | 2.23E−04 | −5.38413E−05 | −5.38413E−05 | −5.38413E−05 |
| S1011 | −6.249947 | −0.084858947 | 0.026268674 | −0.005514068 | 0.000204269 |
| | 1.23E−04 | −2.21E−05 | 1.10704E−06 | 1.10704E−06 | 1.10704E−06 |

TABLE 21

Effective Focal Length = 4.14 mm F-number = 2.2 Field of View = 70.6°

| Surface Number | Radius of Curvature (mm) | Thickness (mm) | Nd | Vd | Remark |
|---|---|---|---|---|---|
| S111 | 1.609482 | 0.5084902 | 1.54 | 56.1 | The First Lens L111 |
| S112 | 6.181298 | 0.0635501 | | | |
| S113 | ∞ | 0.2804573 | | | Stop ST11 |
| S114 | −5.418266 | 0.4747573 | 1.58913 | 61.182174 | The Second Lens L112 |
| S115 | −1.759624 | 0.02937333 | | | |
| S116 | −2.681421 | 0.2478888 | 1.64 | 22.4 | The Third Lens L113 |
| S117 | 31665.29 | 0.4898333 | | | |
| S118 | −8.423134 | 0.6001875 | 1.64 | 22.4 | The Fourth Lens L114 |
| S119 | −3.599413 | 0.3462198 | | | |
| S1110 | 7.243481 | 0.7579995 | 1.54 | 56.1 | The Fifth Lens L115 |
| S1111 | 1.612149 | 0.5626672 | | | |
| S1112 | ∞ | 0.21 | 1.5168 | 64.1673 | Optical Filter OF11 |
| S1113 | ∞ | 0.2817886 | | | |

TABLE 22

| Surface Number | k / E | A / F | B / G | C / H | D / I |
|---|---|---|---|---|---|
| S111 | 0.405514 | −0.004140895 | −0.032214126 | 0.041167889 | −0.022619255 |
|  | −0.002256668 | −0.001989262 | −0.001267052 | −0.001267052 | −0.001267052 |
| S112 | 0 | −0.00067707 | −0.002270586 | −0.0023984 | −0.002405346 |
|  | −0.003334624 | −0.004812668 | −0.007571985 | −0.007571985 | −0.007571985 |
| S114 | 0 | −0.029155435 | 0.007477099 | −0.07225833 | −0.015743121 |
|  | −0.009288526 | −0.004643928 | −0.006126234 | −0.006126234 | −0.006126234 |
| S115 | 0 | 0.05515802 | −0.23312582 | 0.22360564 | −0.094763663 |
|  | −0.002054615 | −0.003558273 | −0.005337863 | −0.005337863 | −0.005337863 |
| S116 | 0 | −0.069967321 | −0.22517981 | 0.36041881 | −0.082815539 |
|  | −0.038974971 | −0.000598272 | −0.001785754 | −0.001785754 | −0.001785754 |
| S117 | 0 | −0.097231358 | −0.037794668 | 0.15668792 | −0.085997071 |
|  | 0.027354513 | 0.000417398 | 0.001140221 | 0.001140221 | 0.001140221 |
| S118 | −146.6859 | 0.032721171 | −0.10923716 | 0.0233747 | 0.033080809 |
|  | −0.04260402 | 0.013429961 | 0.000324006 | 0.000324006 | 0.000324006 |
| S119 | −0.5726199 | 0.034691416 | −0.041468483 | 0.005783116 | 0.000804099 |
|  | −0.001917423 | 0.000630121 | 1.73162E−05 | 1.73162E−05 | 1.73162E−05 |
| S1110 | −46.39809 | −0.21287537 | 0.068268075 | −0.013512631 | −0.002686266 |
|  | 0.001133847 | 2.23E−04 | −5.35439E−05 | −5.35439E−05 | −5.35439E−05 |
| S1111 | −6.681913 | −0.08152258 | 0.025332406 | −0.005158103 | 0.000197758 |
|  | 1.21E−04 | −2.21E−05 | 1.16639E−06 | 1.16639E−06 | 1.16639E−06 |

TABLE 23

Effective Focal Length = 3.34 mm F-number = 2.3 Field of View = 68°

| Surface Number | Radius of Curvature (mm) | Thickness (mm) | Nd | Vd | Remark |
|---|---|---|---|---|---|
| S121 | 1.439915 | 0.45984 | 1.583126 | 59.37379 | The First Lens L121 |
| S122 | −69.0274 | −0.02004 |  |  |  |
| S123 | ∞ | 0.18119 |  |  | Stop ST12 |
| S124 | −2.66199 | 0.355499 | 1.54 | 56.1 | The Second Lens L122 |
| S125 | −1.5192 | 0.039101 |  |  |  |
| S126 | −4.62225 | 0.255102 | 1.6355 | 23.8914 | The Third Lens L123 |
| S127 | 3.589377 | 0.355435 |  |  |  |
| S128 | −2.4033 | 0.382745 | 1.6355 | 23.8914 | The Fourth Lens L124 |
| S129 | −1.67772 | 0.335997 |  |  |  |
| S1210 | 3.747521 | 0.51142 | 1.54 | 56.1 | The Fifth Lens L125 |
| S1211 | 1.376912 | 0.514613 |  |  |  |
| S1212 | ∞ | 0.21 | 1.5168 | 64.1673 | Optical Filter OF12 |
| S1213 | ∞ | 0.280767 |  |  |  |

TABLE 24

| Surface Number | k / E | A / F | B / G | C / H | D / I |
|---|---|---|---|---|---|
| S121 | 0.2916797 | −0.009112436 | −0.40219961 | 0.90502036 | −1.2252398 |
|  | 0.031212156 | 0.17124104 | 0.21205969 | 0.21205969 | 0.21205969 |
| S122 | 0 | −0.039071871 | −0.15030295 | −0.2286282 | 0.35756482 |
|  | 0.086512506 | 0.12992214 | −1.1293392 | −1.1293392 | −1.1293392 |
| S124 | 0 | 0.14298921 | −0.06103153 | −0.45382169 | 0.98748815 |
|  | −0.1434718 | −0.36073989 | −1.2723136 | −1.2723136 | −1.2723136 |
| S125 | 0 | 0.25483755 | −0.79319845 | 1.3655305 | −0.69292718 |
|  | −0.15840733 | −0.18098947 | −1.1302995 | −1.1302995 | −1.1302995 |
| S126 | 0 | −0.26225828 | −0.22374191 | 1.1105438 | −0.49385224 |
|  | −0.1396083 | 0.012182217 | −1.4241178 | −1.4241178 | −1.4241178 |
| S127 | −49.86863 | −0.14511951 | 0.2121237 | 0.011867363 | 0.050985952 |
|  | 0.092224119 | 0.029552707 | −0.020000748 | −0.020000748 | −0.020000748 |
| S128 | −37.44077 | −0.22964514 | 0.14485241 | −0.27936328 | −0.27031499 |
|  | 0.26206614 | −0.16338045 | 0.040113048 | 0.040113048 | 0.040113048 |
| S129 | −3.973508 | −0.097435487 | −0.099144026 | 0.17370153 | −0.14307315 |
|  | −0.12533827 | 0.13892024 | 0.00920884 | 0.00920884 | 0.00920884 |
| S1210 | −31.43207 | −0.39794728 | 0.14914598 | −0.013216832 | −0.009843352 |
|  | 0.001477601 | 3.01E−03 | −0.000718452 | −0.000718452 | −0.000718452 |
| S1211 | −5.904675 | −0.21209468 | 0.10932211 | −0.039803211 | 0.00377325 |
|  | 2.29E−03 | −7.91E−04 | 6.28956E−05 | 6.28956E−05 | 6.28956E−05 |

TABLE 25

Effective Focal Length = 3.18 mm F-number = 2.25 Field of View = 71.0°

| Surface Number | Radius of Curvature (mm) | Thickness (mm) | Nd | Vd | Remark |
|---|---|---|---|---|---|
| S131 | 1.414037 | 0.454 | 1.54 | 56.1 | The First Lens L131 |
| S132 | −95.4353 | −0.01717 | | | |
| S133 | ∞ | 0.197883 | | | Stop ST13 |
| S134 | −3.05518 | 0.301276 | 1.6779 | 55.33759 | The Second Lens L132 |
| S135 | −1.64309 | 0.018627 | | | |
| S136 | −4.6631 | 0.261035 | 1.6355 | 23.8914 | The Third Lens L133 |
| S137 | 3.596148 | 0.409116 | | | |
| S138 | −2.4016 | 0.401474 | 1.6355 | 23.8914 | The Fourth Lens L134 |
| S139 | −1.75574 | 0.302295 | | | |
| S1310 | 2.077861 | 0.471596 | 1.54 | 56.1 | The Fifth Lens L135 |
| S1311 | 1.109934 | 0.514613 | | | |
| S1312 | ∞ | 0.21 | 1.5168 | 64.1673 | Optical Filter OF13 |
| S1313 | ∞ | 0.258555 | | | |

TABLE 26

| Surface Number | k | A | B | C | D |
|---|---|---|---|---|---|
| | E | F | G | H | I |
| S131 | 0.2893631 | −0.009900582 | −0.40811613 | 0.86253829 | −1.2530812 |
| | 0.033694976 | 0.21804844 | 0.12305852 | 0.12305852 | 0.12305852 |
| S132 | 0 | −0.063395824 | −0.13167498 | −0.20966252 | 0.24972704 |
| | −0.17490914 | −0.15500618 | 0.35780339 | 0.35780339 | 0.35780339 |
| S134 | 0 | 0.14662927 | −0.087665105 | −0.53215181 | 1.006768 |
| | 0.00873491 | −0.018039566 | −1.1243264 | −1.1243264 | −1.1243264 |
| S135 | 0 | 0.23857044 | −0.80796336 | 1.3526007 | −0.75277791 |
| | −0.12968004 | 0.14406978 | 0.066827316 | 0.066827316 | 0.066827316 |
| S136 | 0 | −0.25695691 | −0.27221015 | 1.122663 | −0.47007181 |
| | −0.10740804 | −0.063811447 | −0.079014305 | −0.079014305 | −0.079014305 |
| S137 | −55.49101 | −0.12523768 | 0.1978648 | 0.008604425 | 0.016305252 |
| | 0.049893633 | 0.047754167 | 0.092212102 | 0.092212102 | 0.092212102 |
| S138 | −43.55859 | −0.24399419 | 0.21778657 | −0.33477851 | −0.20580395 |
| | 0.28007607 | −0.16570121 | −0.029196848 | −0.029196848 | −0.029196848 |
| S139 | −3.448262 | −0.088300104 | −0.081787715 | 0.18049751 | −0.14257056 |
| | −0.12338296 | 0.13895497 | 9.60185E−05 | 9.60185E−05 | 9.60185E−05 |
| S1310 | −13.43398 | −0.37839056 | 0.14073567 | −0.011024069 | −0.010323248 |
| | 0.001409581 | 2.91E−03 | −0.000796535 | −0.000796535 | −0.000796535 |
| S1311 | −4.440984 | −0.21917427 | 0.11721827 | −0.041767409 | 0.003518376 |
| | 2.38E−03 | −7.76E−04 | 6.10635E−05 | 6.10635E−05 | 6.10635E−05 |

TABLE 27

Effective Focal Length = 3.92 mm F-number = 2.3 Field of View = 72.0°

| Surface Number | Radius of Curvature (mm) | Thickness (mm) | Nd | Vd | Remark |
|---|---|---|---|---|---|
| S141 | 2.104364 | 0.413476 | 1.610351 | 57.92815 | The First Lens L141 |
| S142 | 6.760578 | 0.043729 | | | |
| S143 | ∞ | 0.15219 | | | Stop ST14 |
| S144 | 24.27578 | 0.432424 | 1.61336 | 44.49367 | The Second Lens L142 |
| S145 | −3.75081 | 0.043361 | | | |
| S146 | −4.90893 | 0.34507 | 1.64 | 22.4 | The Third Lens L143 |
| S147 | 13.31795 | 0.524548 | | | |
| S148 | −5.04195 | 0.782805 | 1.534611 | 56.07215 | The Fourth Lens L144 |
| S149 | −1.56353 | 0.412841 | | | |
| S1410 | 170.4282 | 0.721875 | 1.54 | 56.1 | The Fifth Lens L145 |
| S1411 | 1.511926 | 0.636654 | | | |
| S1412 | ∞ | 0.21 | 1.5168 | 64.1673 | Optical Filter OF14 |
| S1413 | ∞ | 0.198952 | | | |

TABLE 29

Effective Focal Length = 4.1 mm F-number = 2.15 Field of View = 71.0°

| Surface Number | Radius of Curvature (mm) | Thickness (mm) | Nd | Vd | Remark |
|---|---|---|---|---|---|
| S151 | 1.868965 | 0.460957 | 1.61336 | 44.49367 | The First Lens L151 |
| S152 | 6.989044 | 0.030292 | | | |
| S153 | ∞ | 0.280342 | | | Stop ST15 |
| S154 | −27.0019 | 0.52462 | 1.61336 | 44.49367 | The Second Lens L152 |
| S155 | −2.03475 | 0.036017 | | | |
| S156 | −2.26302 | 0.306447 | 1.64 | 22.4 | The Third Lens L153 |
| S157 | 64.23641 | 0.487728 | | | |
| S158 | −11.5963 | 0.73409 | 1.64 | 22.4 | The Fourth Lens L154 |
| S159 | −3.6274 | 0.365135 | | | |
| S1510 | 7.294979 | 0.669503 | 1.534611 | 56.07215 | The Fifth Lens L155 |
| S1511 | 1.580289 | 0.562667 | | | |
| S1512 | ∞ | 0.21 | 1.5168 | 64.1673 | Optical Filter OF15 |
| S1513 | ∞ | 0.246904 | | | |

TABLE 28

| Surface Number | k | A | B | C | D |
|---|---|---|---|---|---|
| | E | F | G | H | I |
| S141 | 0.1627354 | −0.007284519 | −0.016775743 | 0.015094565 | −0.038786709 |
| | 0.018382031 | 0.01632651 | −0.040534029 | −0.040534029 | −0.040534029 |
| S142 | 0 | −0.004026272 | −0.009056923 | −0.024220448 | −0.030201069 |
| | −0.037970001 | 7.67125E−05 | 6.71579E−05 | 6.71579E−05 | 6.71579E−05 |
| S144 | 0 | 0.021634541 | −0.028062649 | −0.06165702 | −0.026768416 |
| | −0.015067349 | −0.041527698 | −0.088978666 | −0.088978666 | −0.088978666 |
| S145 | 0 | 0.013956372 | −0.24054159 | 0.22947623 | −0.10012151 |
| | −0.025034978 | −0.019663264 | −0.003628494 | −0.003628494 | −0.003628494 |
| S146 | 0 | −0.061128921 | −0.22853307 | 0.35153807 | −0.090447026 |
| | −0.035895926 | 0.00349489 | −0.005986598 | −0.005986598 | −0.005986598 |
| S147 | 0 | −0.052798395 | −0.046011851 | 0.14036539 | −0.088755836 |
| | 0.026876535 | 0.006995953 | −0.003901968 | −0.003901968 | −0.003901968 |
| S148 | 16.55165 | −0.013821047 | −0.071333485 | 0.02647859 | 0.030985359 |
| | −0.038457602 | 0.018134813 | 0.002318141 | 0.002318141 | 0.002318141 |
| S149 | 0.08363881 | 0.011919857 | −0.008106106 | 0.009767166 | 0.00284994 |
| | −0.001082212 | 0.000799474 | 0.000291817 | 0.000291817 | 0.000291817 |
| S1410 | 11852.49 | −0.23632299 | 0.0848307 | −0.009543115 | −0.002483167 |
| | 0.000753452 | −8.82E−05 | −5.21359E−05 | −5.21359E−05 | −5.21359E−05 |
| S1411 | −6.993041 | −0.077476827 | 0.023170427 | −0.004098268 | 6.9434E−05 |
| | 9.75E−05 | −1.64E−05 | 7.95682E−07 | 7.95682E−07 | 7.95682E−07 |

TABLE 30

| Surface Number | k / E | A / F | B / G | C / H | D / I |
|---|---|---|---|---|---|
| S151 | −0.08688547 | −0.015618483 | −0.032130488 | 0.021472087 | −0.033921711 |
|  | −0.006014848 | −0.000298508 | 0.006981844 | 0.006981844 | 0.006981844 |
| S152 | 0 | −0.033727667 | −0.024669394 | −0.011122107 | −0.008782878 |
|  | −0.009434081 | 0.023797426 | 0.002295752 | 0.002295752 | 0.002295752 |
| S154 | 0 | −0.002554142 | 0.005733978 | −0.041379234 | −0.002665825 |
|  | 0.009019988 | 6.39629E−05 | −0.017710959 | −0.017710959 | −0.017710959 |
| S155 | 0 | 0.025210469 | −0.23937558 | 0.22483602 | −0.085225196 |
|  | 0.002180251 | 0.000321193 | −0.008835626 | −0.008835626 | −0.008835626 |
| S156 | 0 | −0.063805533 | −0.22860203 | 0.35532909 | −0.088924149 |
|  |  | −0.045598003 | 0.003434307 | 0.009036355 | 0.009036355 |
| S157 | 0 | −0.062872426 | −0.023383393 | 0.14842992 | −0.091048667 |
|  | 0.025848137 | 0.009891228 | −0.002840005 | −0.002840005 | −0.002840005 |
| S158 | 34.3431 | 0.012204403 | −0.088717483 | 0.018401368 | 0.026622819 |
|  | −0.042511141 | 0.01555936 | 0.001174915 | 0.001174915 | 0.001174915 |
| S159 | 1.231736 | 0.020140986 | −0.029171938 | 0.003034275 | 0.001041868 |
|  | −0.001520592 | 0.000486841 | 4.6407E−05 | 4.6407E−05 | 4.6407E−05 |
| S1510 | 14.45874 | −0.21558282 | 0.068382748 | −0.012430867 | −0.002409933 |
|  | 0.001227042 | 2.14E−04 | −8.03146E−05 | −8.03146E−05 | −8.03146E−05 |
| S1511 | −6.507785 | −0.076139585 | 0.023454438 | −0.004617656 | 0.000215953 |
|  | 1.11E−04 | −2.32E−05 | 1.42631E−06 | 1.42631E−06 | 1.42631E−06 |

In the tenth embodiment, the first lens is made of glass material, the second, third, fourth and fifth lens are made of plastic material. In the eleventh embodiment, the second lens is made of glass material, the first, third, fourth and fifth lens are made of plastic material. In the twelfth embodiment, the first lens is made of glass material, the second, third, fourth and fifth lens are made of plastic material. In the thirteenth embodiment, the second lens is made of glass material, the first, third, fourth and fifth lens are made of plastic material. In the fourteenth embodiment, the first and second lens are made of glass material, the third, fourth and fifth lens are made of plastic material. In the fifteenth embodiment, the first and second lens are made of glass material, the third, fourth and fifth lens are made of plastic material. The Abbe number of each lens and the index of refraction of the first, second and third lens for the tenth, eleventh, twelfth, thirteenth, fourteenth and fifteenth embodiment can satisfy the requirements, the field curvature and the distortion can be corrected effectively, and the resolution of the lens assembly can meet the requirement. Therefore, the lens assemblies of the tenth to fifteenth embodiment are capable of good optical performance. Due to the similarity, the figures which depict the field curvature and the distortion of the tenth to fifteenth embodiment, are omitted.

In the above five to fifteenth embodiments, the lens assemblies include five lenses. However, it has the same effect and falls into the scope of the invention that a sixth lens is disposed between the fifth lens and the image side.

What is claimed is:

1. A lens assembly consisting essentially of a first lens, a second lens, a third lens, a fourth lens and a fifth lens, all of which are arranged in sequence from an object side to an image side along an optical axis, wherein:

the first lens with a positive refractive power and comprises a convex surface facing the object side;

the second lens with a positive refractive power;

the third lens with a negative refractive power and comprises a concave surface facing the object side;

the fourth lens with a positive refractive power and comprises a convex surface facing the image side;

the fifth lens is with negative refractive power; and the lens assembly satisfies:

$0 \leq f_1/f_2 \leq 6$, $(Vd_1+Vd_2)/2 > 40$, $Vd_1 \geq Vd_3$, $Vd_2 \geq Vd_3$, $Vd_5 \geq Vd_3$, $(Vd_3+Vd_4)/2 \leq 22.4$, wherein $f_1$ is an effective focal length of the first lens, $f_2$ is an effective focal length of the second lens, $Vd_1$ is an Abbe number of the first lens, $Vd_2$ is an Abbe number of the second lens, $Vd_3$ is an Abbe number of the third lens and $Vd_5$ is an Abbe number of the fifth lens.

2. The lens assembly as claimed in claim 1, wherein the lens assembly satisfies:

$Vd_4 < Vd_1$, $Vd_4 < Vd_2$, $Vd_5 < Vd_1$, $Vd_5 < Vd_2$, wherein $Vd_1$ is an Abbe number of the first lens, $Vd_2$ is an Abbe number of the second lens, $Vd_3$ is an Abbe number of the third lens, $Vd_4$ is an Abbe number of the fourth lens and $Vd_5$ is an Abbe number of the fifth lens.

3. The lens assembly as claimed in claim 1, wherein the lens assembly satisfies:

$Vd_1 > 40$, $Vd_2 > 40$ wherein $Vd_1$ is an Abbe number of the first lens and $Vd_2$ is an Abbe number of the second lens.

4. The lens assembly as claimed in claim 1, wherein the lens assembly satisfies:

$|Vd_1-Vd_2| < 25$ wherein $Vd_1$ is an Abbe number of the first lens and $Vd_2$ is an Abbe number of the second lens.

5. The lens assembly as claimed in claim 1, wherein the first lens is a meniscus lens.

6. The lens assembly as claimed in claim 1, wherein the third lens is a biconcave lens.

7. The lens assembly as claimed in claim 1, further comprising a stop disposed between the object side and the second lens.

8. The lens assembly as claimed in claim 1, wherein the fifth lens comprises a concave surface facing the object side.

9. The lens assembly as claimed in claim 1, wherein the fifth lens comprises a concave surface facing the image side.

* * * * *